(12) United States Patent
Terada et al.

(10) Patent No.: US 10,681,380 B2
(45) Date of Patent: Jun. 9, 2020

(54) IMAGE ENCODING METHOD, IMAGE DECODING METHOD, IMAGE ENCODING APPARATUS, AND IMAGE DECODING APPARATUS

(71) Applicant: Panasonic Intellectual Property Management Co., Ltd., Osaka (JP)

(72) Inventors: Kengo Terada, Osaka (JP); Takahiro Nishi, Nara (JP); Tadamasa Toma, Osaka (JP); Satoshi Yoshikawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 16 days.

(21) Appl. No.: 15/735,427

(22) PCT Filed: Mar. 18, 2016

(86) PCT No.: PCT/JP2016/001582
§ 371 (c)(1),
(2) Date: Dec. 11, 2017

(87) PCT Pub. No.: WO2016/199330
PCT Pub. Date: Dec. 15, 2016

(65) Prior Publication Data
US 2018/0184123 A1    Jun. 28, 2018

Related U.S. Application Data

(60) Provisional application No. 62/175,583, filed on Jun. 15, 2015, provisional application No. 62/174,864, (Continued)

(30) Foreign Application Priority Data

Feb. 5, 2016 (JP) ................................ 2016-021372

(51) Int. Cl.
*H04N 19/61* (2014.01)
*H04N 19/80* (2014.01)
(Continued)

(52) U.S. Cl.
CPC ............. *H04N 19/61* (2014.11); *G06T 9/002* (2013.01); *H04N 19/109* (2014.11);
(Continued)

(58) Field of Classification Search
CPC ...... G06T 9/002; H04N 19/109; H04N 19/11; H04N 19/117; H04N 19/147;
(Continued)

(56) References Cited

U.S. PATENT DOCUMENTS 5,041,916 A * 8/1991 Yoshida .................. G06T 9/002
                                                            358/426.12
5,208,670 A * 5/1993 Sugimori ............... H04N 7/007
                                                            348/431.1
(Continued)

FOREIGN PATENT DOCUMENTS

JP    2008-527932    7/2008
JP    2013-12895     1/2013
(Continued)

OTHER PUBLICATIONS

Extended European Search Report dated May 17, 2018 in European Application No. 16807050.6.
(Continued)

*Primary Examiner* — Peter D Le
(74) *Attorney, Agent, or Firm* — Wenderoth, Lind & Ponack, L.L.P.

(57) ABSTRACT

The image encoding method includes: encoding an image including a block by performing, in at least one of intra prediction, inter prediction, and an in-loop filter, a non-linear process by which the input-output relationship becomes
(Continued)

non-linear; and encoding an operation parameter of a non-linear filter to be used in the non-linear process.

25 Claims, 80 Drawing Sheets

Related U.S. Application Data filed on Jun. 12, 2015, provisional application No. 62/174,789, filed on Jun. 12, 2015.

(51) Int. Cl.

| | | |
|---|---|---|
| H04N 19/109 | (2014.01) | |
| H04N 19/82 | (2014.01) | |
| H04N 19/70 | (2014.01) | |
| G06T 9/00 | (2006.01) | |
| H04N 19/593 | (2014.01) | |
| H04N 19/156 | (2014.01) | |
| H04N 19/17 | (2014.01) | |
| H04N 19/117 | (2014.01) | |
| H04N 19/11 | (2014.01) | |
| H04N 19/51 | (2014.01) | |
| H04N 19/147 | (2014.01) | |
| H04N 19/85 | (2014.01) | |

(52) U.S. Cl.
CPC ........... *H04N 19/11* (2014.11); *H04N 19/117* (2014.11); *H04N 19/147* (2014.11); *H04N 19/156* (2014.11); *H04N 19/17* (2014.11); *H04N 19/51* (2014.11); *H04N 19/593* (2014.11); *H04N 19/70* (2014.11); *H04N 19/80* (2014.11); *H04N 19/82* (2014.11); *H04N 19/85* (2014.11)

(58) Field of Classification Search
CPC ...... H04N 19/156; H04N 19/17; H04N 19/51; H04N 19/593; H04N 19/61; H04N 19/70; H04N 19/80; H04N 19/82; H04N 19/85
See application file for complete search history.

(56) References Cited

U.S. PATENT DOCUMENTS

| | | | | |
|---|---|---|---|---|
| 5,598,354 A * | 1/1997 | Fang | .................... | G06N 3/0454 |
| | | | | 708/203 |
| 5,638,125 A * | 6/1997 | Jeong | .................. | H04N 19/105 |
| | | | | 375/240.03 |
| 8,311,111 B2 * | 11/2012 | Xu | .......................... | H04N 19/51 |
| | | | | 375/240.13 |
| 8,819,525 B1 * | 8/2014 | Holmer | ................. | H03M 13/33 |
| | | | | 714/775 |
| 9,479,786 B2 * | 10/2016 | Lu | ......................... | H04N 19/176 |
| 2006/0153301 A1 | 7/2006 | Guleryuz | | |
| 2006/0251330 A1 * | 11/2006 | Toth | ....................... | H04N 19/52 |
| | | | | 382/236 |
| 2007/0286287 A1 * | 12/2007 | Kim | ....................... | H04N 19/51 |
| | | | | 375/240.16 |
| 2008/0212887 A1 * | 9/2008 | Gori | ..................... | G06K 9/4619 |
| | | | | 382/248 |
| 2009/0034622 A1 | 2/2009 | Huchet et al. | | |
| 2009/0110070 A1 * | 4/2009 | Takahashi | ............ | H04N 19/176 |
| | | | | 375/240.12 |
| 2010/0322319 A1 * | 12/2010 | Xie | ...................... | H04N 17/004 |
| | | | | 375/240.26 |
| 2014/0044369 A1 * | 2/2014 | Sekiguchi | ............ | H04N 19/159 |
| | | | | 382/236 |
| 2016/0261863 A1 * | 9/2016 | Chen | .................... | H04N 19/176 |
| 2016/0360202 A1 * | 12/2016 | Xu | ........................ | H04N 19/176 |
| 2016/0366422 A1 * | 12/2016 | Yin | ...................... | H04N 19/117 |

FOREIGN PATENT DOCUMENTS

| | | |
|---|---|---|
| WO | 2006/076602 | 7/2006 |
| WO | 2013/001727 | 1/2013 |

OTHER PUBLICATIONS

C. N. Manikopoulos, "Neural network approach to DPCM system design for image coding", IEE Proceedings-I, vol. 139, No. 5, Part I, pp. 501-507, Oct. 1992.
S. Carrato et al., "Parallel Structure Based on Neural Networks for Image Compression", Electronics Letters, vol. 28, No. 12, pp. 1152-1153, Jun. 1992.
International Search Report (ISR) dated Jun. 21, 2016 in International (PCT) Application No. PCT/JP2016/001582.
Joint Collaborative Team on Video Coding (JCT-VC) of ITU-T SG16 WP3 and ISO/IEC JTC1/SC29/WG11, 12th Meeting: Geneva, CH, Jan. 14-23, 2013, JCTVC-L1003_v34.doc, "High Efficiency Video Coding (HEVC) text specification draft 10 (for FDIS & Last Call)", http://phenix.it-sudparis.eu/jct/doc_end_user/documents/12_Geneva/wg11/JCTVC-L1003-v34.zip.
Office Action dated Feb. 18, 2020 in corresponding European Application No. 16807050.6.
Yule Yuan et al., "Edge Information Based Effective Intra Mode Decision Algorithm", Signal Processing, Communication and Computing (ICSPCC), 2012 IEEE International Conference ON, IEEE, Aug. 12, 2012, pp. 628-633, XP032256608.

* cited by examiner

FIG. 15

SYNTAX OF SPS

| seq_parameter_set_rbsp(){ | Descriptor |
|---|---|
| ... | |
| nn_intra_pred_enabled_flag | ae(v) |
| nn_inter_pred_enabled_flag | ae(v) |
| nn_ilf_enabled_flag | ae(v) |
| ... | |
| } | |

FIG. 16

SYNTAX OF NN PARAMETER

| nn_parameter_set_rbsp(){ | Descriptor |
|---|---|
| nps_id | ae(v) |
| nps_nn_intra_pred_data_present_flag | ae(v) |
| nps_nn_inter_pred_data_present_flag | ae(v) |
| nps_nn_ilf_data_present_flag | ae(v) |
| if(nps_nn_intra_pred_data_present_flag) | |
| nn_intra_pred_parameter_data() | |
| if(nps_nn_inter_pred_data_present_flag) | |
| nn_inter_pred_parameter_data() | |
| if(nps_nn_ilf_data_present_flag) | |
| nn_ilf_parameter_data() | |
| } | |

FIG. 17

SYNTAX OF PPS

| pic_parameter_set_rbsp(){ | Descriptor |
|---|---|
| ... | |
| if(nn_intra_pred_enabled_flag \|\| nn_intra_pred_enabled_flag \|\| | |
| nn_intra_pred_enabled_flag) | |
| pps_nps_id | ae(v) |
| ... | |
| } | |

FIG. 18

SYNTAX OF SLICE HEADER

| slice_segment_header(){ | Descriptor |
|---|---|
| ... | |
| if(nn_intra_pred_enabled_flag \|\| nn_intra_pred_enabled_flag \|\| | |
| nn_intra_pred_enabled_flag) | |
| slice_nps_id | ae(v) |
| ... | |
| } | |

FIG. 19

SYNTAX OF PARAMETER DATA IN NN INTRA PREDICTION

| nn_intra_pred_parameter_data(){ | Descriptor |
|---|---|
| nn_intra_mode_num | ae(v) |
| for(k=0;k<nn_intra_mode_num;k++){ | |
| nn_intra_layer_num[k] | ae(v) |
| for(i=0;i<nn_intra_layer_num[k];i++){ | |
| if(i==0)input_node_num =intra_pred_ref_pixel_num | |
| else    input_node_num =nn_intra_node_num[k][i-1] | |
| if(i<nn_intra_layer_num[k] -1) | |
| nn_intra_node_num[k][i] | ae(v) |
| else | |
| nn_intra_node_num[k][i] =intra_pred_pixel_num | |
| for(j=0;i<nn_intra_node_num[k][i];j++){ | |
| nn_intra_bias[k][i][j] | ae(v) |
| for(m=0;m<input_node_num;m++){ | |
| nn_inter_w[k][i][j][m] | ae(v) |
| } | |
| } | |
| } | |
| } | |
| } | |

FIG. 20

SYNTAX OF PARAMETER DATA IN NN INTER PREDICTION

| nn_inter_pred_parameter_data(){ | Descriptor |
|---|---|
| nn_inter_mode_num | ae(v) |
| for(k=0;k<nn_inter_mode_num;k++){ | |
| nn_inter_layer_num[k] | ae(v) |
| for(i=0;i<nn_inter_layer_num[k];i++){ | |
| if(i==0)input_node_num =inter_pred_reference_pixel_num | |
| else    input_node_num =nn_inter_node_num[k][i-1] | |
| if(i<nn_inter_layer_num[k] -1) | |
| nn_inter_node_num[k][i] | ae(v) |
| else | |
| nn_inter_node_num[k][i] = 1 | |
| for(j=0;i<nn_inter_node_num[k][i];j++){ | |
| nn_inter_bias[k][i][j] | ae(v) |
| for(m=0;m<input_node_num;m++){ | |
| nn_inter_w[k][i][j][m] | ae(v) |
| } | |
| } | |
| } | |
| } | |
| } | |

FIG. 21

SYNTAX OF PARAMETER DATA IN NN IN-LOOP FILTER

| nn_ilf_parameter_data(){ | Descriptor |
|---|---|
| nn_ilf_mode_num | ae(v) |
| for(k=0;k<nn_ilf_mode_num;k++){ | |
| nn_ilf_layer_num[k] | ae(v) |
| for(i=0;i<nn_ilf_layer_num[k];i++){ | |
| if(i==0)input_node_num =ilf_reference_pixel_num | |
| else    input_node_num =nn_ilf_node_num[k][i-1] | |
| if(i<nn_ilf_layer_num[k]-1) | |
| nn_ilf_node_num[k][i] | ae(v) |
| else | |
| nn_ilf_node_num[k][i] = 1 | |
| for(j=0;i<nn_ilf_node_num[k][i];j++){ | |
| nn_ilf_bias[k][i][j] | ae(v) |
| for(m=0;m<input_node_num;m++){ | |
| nn_ilf_w[k][i][j][m] | ae(v) |
| } | |
| } | |
| } | |
| } | |
| } | |

FIG. 22

SYNTAX OF CU

| coding_unit(x0,y0,log2CbSize) | Descriptor |
|---|---|
| ... | |
| if(pred_mode ==MODE_INTRA){ | |
| if(nn_intra_pred_enabled_flag) | |
| intra_pred_type | ae(v) |
| else | |
| intra_pred_type =FIXED_INTRA_PRED | |
| if(intra_pred_type ==NN_INTRA_PRED) | |
| nn_intra_pred_mode | ae(v) |
| else | |
| fixed_intra_pred_mode | ae(v) |
| }else{ | |
| if(nn_inter_pred_enabled_flag) | |
| inter_pred_type | ae(v) |
| else | |
| inter_pred_type =FIXED_INTRA_PRED | |
| if(inter_pred_type ==NN_INTER_PRED){ | |
| nn_inter_pred_mode | ae(v) |
| prediction_unit(x0,y0,nCbS,nCbS) | |
| } | |
| if(nn_ilf_enabled_flag) | |
| ilf_type | ae(v) |
| else | |
| ilf_type =FIXED_ILF | |
| if(ilf_type ==NN_ILF) | |
| nn_ilf_mode | ae(v) |
| ... | |
| } | |

FIG. 23

VARIATION OF SYNTAX OF CU

| coding_unit(x0,y0,log2CbSize) | Descriptor |
|---|---|
| ... | |
| if(pred_mode ==MODE_INTRA){ | |
|   intra_pred_mode | ae(v) |
|   if(nn_intra_pred_enabled_flag) | |
|     if(intra_pred_mode > 34 ){ | |
|       intra_pred_type = NN_INTRA_PRED | |
|       nn_intra_pred_mode = intra_pred_mode - 35 | |
|     }else{ | |
|       intra_pred_type = FIXED_INTRA_PRED | |
|       fixed_intra_pred_mode = intra_pred_mode | |
|     } | |
|   }else{ | |
|     intra_pred_type = FIXED_INTRA_PRED) | |
|     fixed_intra_pred_mode = intra_pred_mode | |
|   } | |
| }else{ | |
|   if(nn_inter_pred_enabled_flag) | |
|     inter_pred_type | ae(v) |
|   else | |
|     inter_pred_type = FIXED_INTRA_PRED | |
|   if(inter_pred_type == NN_INTER_PRED){ | |
|     nn_inter_pred_mode | ae(v) |
|     prediction_unit(x0,y0,nCbS,nCbS) | |
|   } | |
| if(nn_ilf_enabled_flag) | |
|   ilf_type | ae(v) |
| else | |
|   ilf_type = FIXED_ILF | |
| if(ilf_type == NN_ILF) | |
|   nn_ilf_mode | ae(v) |
| ... | |
| } | |

FIG. 24

RELATIONSHIP BETWEEN intra_pred_mode, PREDICTION TYPE, AND PREDICTION MODES IN VARIATION OF SYNTAX OF CU

| intra_pred_mode | intra_pred_type | fixed_intra_pred_mode | nn_intra_pred_mode |
|---|---|---|---|
| 0 | FIXED_INTRA_PRED | 0 | — |
| 1 | FIXED_INTRA_PRED | 1 | — |
| 2 | FIXED_INTRA_PRED | 2 | — |
| ... | ... | ... | ... |
| 34 | FIXED_INTRA_PRED | 34 | — |
| 35 | NN_INTRA_PRED | — | 0 |
| 36 | NN_INTRA_PRED | — | 1 |
| 37 | NN_INTRA_PRED | — | 2 |

FIG. 25

RELATIONSHIP BETWEEN intra_pred_mode, PREDICTION TYPE, AND PREDICTION MODES IN VARIATION OF SYNTAX OF CU

| intra_pred_mode | intra_pred_type | fixed_intra_pred_mode | nn_intra_pred_mode |
|---|---|---|---|
| 0 | FIXED_INTRA_PRED | 0 | — |
| 1 | NN_INTRA_PRED | — | 0 |
| 2 | FIXED_INTRA_PRED | 2 | — |
| 3 | FIXED_INTRA_PRED | 3 | — |
| ... | ... | ... | ... |
| 34 | FIXED_INTRA_PRED | 34 | — |

FIG. 26

VARIATION OF SYNTAX OF CU

| coding_unit(x0,y0,log2CbSize) | Descriptor |
|---|---|
| ... | |
| if(pred_mode ==MODE_INTRA){ | |
|   if(nn_intra_pred_enabled_flag) | |
|     *inter_pred_type* | ae(v) |
|   else | |
|     intra_pred_type =FIXED_INTRA_PRED | |
|   if(intra_pred_type ==NN_INTRA_PRED) | |
|     *nn_intra_pred_mode* | ae(v) |
|   else | |
|     *fixed_intra_pred_mode* | ae(v) |
| }else{ | |
|   if(nn_inter_pred_enabled_flag) | |
|     *inter_pred_type* | ae(v) |
|   else | |
|     intra_pred_type =FIXED_INTRA_PRED | |
| prediction_unit(x0,y0,nCbS,nCbS) | |
| if (inter_pred_type ==NN_INTRA_PRED){ | |
|   if ((mv_y & 0x11)==0){ | |
|     if((mv_x & 0x11)==0)     nn_inter_pred_mode =0 | |
|     else if((mv_x & 0x11)==1)nn_inter_pred_mode = 1 | |
|     else if((mv_x & 0x11)==2)nn_inter_pred_mode = 2 | |
|     else     nn_inter_pred_mode = 3 | |
|   }else if ((mv_y & 0x11)==1){ | |
|     if ((mv_y & 0x11)==0)     nn_inter_pred_mode = 4 | |
|     else if((mv_x & 0x11)==1 )nn_inter_pred_mode = 5 | |
|     else if((mv_x & 0x11)==2 )nn_inter_pred_mode = 6 | |
|     else     nn_inter_pred_mode = 7 | |
|   }else if ((mv_y & 0x11)==2){ | |
|     if((mv_x & 0x11)==0)     nn_inter_pred_mode = 8 | |
|     else if((mv_x & 0x11)==1 )nn_inter_pred_mode = 9 | |
|     else if((mv_x & 0x11)==2 )nn_inter_pred_mode = 10 | |
|     else     nn_inter_pred_mode = 11 | |
|   }else{ | |
|     if((mv_x & 0x11)==0)     nn_inter_pred_mode =12 | |
|     else if((mv_x & 0x11)==1)nn_inter_pred_mode =13 | |
|     else if((mv_x & 0x11)==2)nn_inter_pred_mode =14 | |
|     else     nn_inter_pred_mode = 15 | |
|   } | |
| } | |
| } | |
| if(nn_ilf_enabled_flag) | |
|   *ilf_type* | ae(v) |
| else | |
|   ilf_type = FIXED_ILF | |
| if(ilf_type == NN_ILF) | |
|   *nn_ilf_mode* | ae(v) |
| ... | |
| } | |

FIG. 43

SYNTAX OF CU

| coding_unit(x0,y0,log2CbSize) | Descriptor |
|---|---|
| ... | |
| if(pred_mode ==MODE_INTRA){ | |
| if(nn_intra_pred_enabled_flag && pred_size ==PREDSIZE_4x4) | |
|   *intra_pred_type* | ae(v) |
| else | |
|   intra_pred_type =FIXED_INTRA_PRED | |
| if(intra_pred_type ==NN_INTRA_PRED) | |
|   *nn_intra_pred_mode* | ae(v) |
| else | |
|   *fixed_intra_pred_mode* | ae(v) |
|   *fixed_intra_pred_mode_chroma* | ae(v) |
| }else{ | |
| if(nn_inter_pred_enabled_flag) | |
|   *inter_pred_type* | ae(v) |
| else | |
|   inter_pred_type = FIXED_INTRA_PRED | |
| if(inter_pred_type ==NN_INTER_PRED){ | |
|   *nn_inter_pred_mode* | ae(v) |
| prediction_unit(x0,y0,nCbS,nCbS) | |
| } | |
| if(nn_ilf_enabled_flag) | |
|   *ilf_type* | ae(v) |
| else | |
|   ilf_type =FIXED_ILF | |
| if(ilf_type ==NN_ILF) | |
|   *nn_ilf_mode* | ae(v) |
| ... | |
| } | |

FIG. 57

SYNTAX OF PARAMETER DATA
IN NN INTRA PREDICTION

| nn_intra_pred_parameter_data(){ | | Descriptor |
|---|---|---|
| nn_intra_mode_num | | ae(v) |
| for(k=0;k<nn_intra_mode_num;k++){ | | |
| nn_intra_param_ref_type[k] | | ae(v) |
| if(nn_intra_param_ref_type[k] ==NN_INTRA_PARAM_NO_REF){ | | |
| for(k=0;k<nn_intra_mode_num;k++){ | | |
| nn_intra_layer_num[k] | | ae(v) |
| for(i=0;i<nn_intra_layer_num[k];i++){ | | |
| if(i==0)input_node_num =intra_pred_ref_pixel_num | | |
| else   input_node_num =nn_intra_node_num[k][i-1] | | |
| if(i<nn_intra_layer_num[k]-1) | | |
| nn_intra_node_num[k][i] | ENCODE VALUE ITSELF | ae(v) |
| else | | |
| nn_intra_node_num[k][i] =intra_pred_pixel_num | | |
| for(j=0;i<nn_intra_node_num[k][i];j++){ | | |
| nn_intra_bias[k][i][j] | | ae(v) |
| for(m=0;m<input_node_num;m++){ | | |
| nn_intra_w[k][i][j][m] | | ae(v) |
| } | | |
| } | | |
| } | | |
| }else{ | | |
| if(nn_intra_param_ref_type[k] ==NN_INTRA_PARAM_REF_MODE ){ | | |
| nn_intra_param_ref_mode_delta[k] | | ae(v) |
| if(nn_intra_param_ref_mode_delta[k] ==0 )ref_preset_flag = 1 | | |
| else                              ref_preset_flag = 0 | | |
| if(copy_preset_flag) | | |
| nn_intra_param_ref_preset_id[k] | | ae(v) |
| else | | |
| nn_intra_param_ref_mode =k-nn_intra_param_ref_mode_delta[k] | ENCODE DIFFERENCE FROM REFERENCE VALUE | |
| } | | |
| if(nn_intra_param_ref_type[k] ==NN_INTRA_PARAM_REF_MODE ){ | | |
| if(copy_preset_flag) | | |
| nn_intra_layer_num[k] =nn_intra_layer_num_preset[nn_intra_param_ref_preset_id[k]] | | |
| else | | |
| nn_intra_layer_num[k] =nn_intra_layer_num[nn_intra_param_ref_mode] | | |
| }else{ | | |
| nn_intra_layer_num_minus1[k] | | ae(v) |
| nn_intra_layer_num[k] =nn_intra_layer_num_minus1[k] +1 | | |
| } | | |

FIG. 58

SYNTAX OF PARAMETER DATA IN NN INTRA PREDICTION (CONTINUED)

| | |
|---|---|
| for(i=0;i<nn_intra_layer_num[k];i++){ | |
|   if(i==0)input_node_num =intra_pred_ref_pixel_num | |
|   else    input_node_num =nn_intra_node_num[k][i-1] | |
|   if(i<nn_intra_layer_num[k] -1){ | |
|    if(nn_intra_param_ref_type[k] ==NN_INTRA_PARAM_REF_MODE){ | |
|     if(copy_preset_flag) | |
|      nn_intra_node_num[k][i] =nn_intra_node_num_preset[ nn_intra_param_ref_preset_id[k]][i] | |
|     else | |
|      nn_intra_node_num[k][i] =nn_intra_node_num[ nn_intra_param_ref_mode][i] | |
|    }else{ | |
|     *nn_intra_node_num_delta[k][i]* | ae(v) |
|     if(i==0) | |
|      nn_intra_node_num[k][i] =intra_pred_ref_pixel_num-nn_intra_node_num_delta[k][i] | |
|     else | |
|      nn_intra_node_num[k][i] =nn_intra_node_num[k][i-1] - nn_intra_node_num_delta[k][i] | |
|    } | |
|   }else{ | |
|    nn_intra_node_num[k][i] =nn_intra_pred_pixel_num | |
|   } | |
|   for(j=0;j<nn_intra_node_num[k][i];j++){ | |
|    *nn_intra_bias_delta[k][i][j]* | ae(v) |
|    if(nn_intra_param_ref_type[k] ==NN_INTRA_PARAM_REF_MODE){ | |
|     if(copy_preset_flag) | |
|      nn_intra_bias_ref =nn_intra_bias_preset[ nn_intra_param_ref_preset_id[k]][i][j] | ENCODE DIFFERENCE FROM REFERENCE VALUE |
|     else | |
|      nn_intra_bias_ref =nn_intra_bias[ nn_intra_param_ref_mode][i][j] | |
|    }else{ | |
|     if(j==0) | |
|      nn_intra_bias_ref =nn_intra_bias_default[k][i] | |
|     else | |
|      nn_intra_bias_ref =nn_intra_bias[k][i][j-1] | |
|    } | |
|    nn_intra_bias[k][i][j] =nn_intra_bias_ref -nn_intra_bias_delta[k][i][j] | |
|    for(m=0;m<input_node_num;m++){ | |
|     *nn_intra_w_delta[k][i][j][m]* | ae(v) |
|     if(nn_intra_param_ref_type[k] ==NN_INTRA_PARAM_REF_MODE){ | |
|      if(copy_preset_flag) | |
|       nn_intra_w_ref =nn_intra_w_preset[nn_intra_param_ref_preset_id[k]][i][j][m] | |
|      else | |
|       nn_intra_w_ref =nn_intra_w[ nn_intra_param_ref_mode][i][j][m] | |
|     }else{ | |
|      if(m==0) | |
|       nn_intra_w_ref =nn_intra_w_default[k][i][j] | |
|      else | |
|       nn_intra_w_ref =nn_intra_w[k][i][j][m-1] | |
|     } | |
|     nn_intra_w[k][i][j][m] =nn_intra_w_ref -nn_intra_w_delta[k][i][j][m] | |
|    } | |
|   } | |
| } | |
| } | |
| } | |

FIG. 77

| VIDEO STREAM (PID = 0x1011, PRIMARY VIDEO) |
| --- |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00, SECONDARY VIDEO) |
| VIDEO STREAM (PID = 0x1B01, SECONDARY VIDEO) |

DATA STRUCTURE OF PMT

FIG. 88
| CORRESPONDING STANDARD | DRIVING FREQUENCY |
|---|---|
| MPEG-4 AVC | 500 MHz |
| MPEG-2 | 350 MHz |
| ⋮ | ⋮ |
FIG. 89A
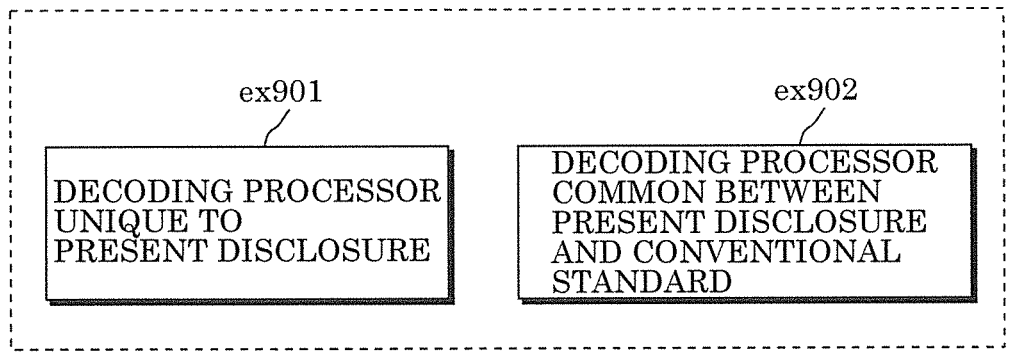
FIG. 89B
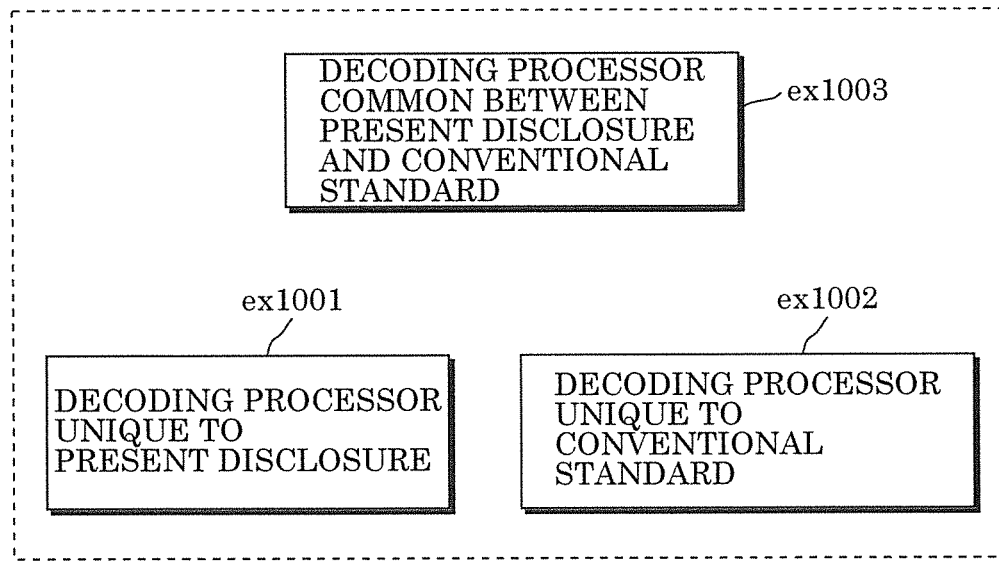

IMAGE ENCODING METHOD, IMAGE DECODING METHOD, IMAGE ENCODING APPARATUS, AND IMAGE DECODING APPARATUS

TECHNICAL FIELD

The present disclosure relates to image encoding methods and image decoding methods.

BACKGROUND ART

Non-Patent Literature (NPL) 1 discloses a technique relating to an image encoding method of encoding an image (including a moving picture) and an image decoding method of decoding an image.

CITATION LIST

Non-Patent Literature

NPL 1: Joint Collaborative Team on Video Coding (JCT-VC) of ITU-T SG16 WP3 and ISO/IEC JTC1/SC29/WG11 12th Meeting: Geneva, CH, 14-23 Jan. 2013 JCTVC-L1003_v34.doc, High Efficiency Video Coding (HEVC) text specification draft 10 (for FDIS & Last Call) http://phenix.it-sudparis.eu/jct/doc_end_user/documents/12_Geneva/wg11/JCT VC-L1003-v34.zip

SUMMARY OF THE INVENTION

However, some conventional image encoding methods and image decoding methods include inefficient processes.

Thus, the present disclosure provides an image encoding method of efficiently encoding an image, and an image decoding method of efficiently decoding an image.

The image encoding method according to one aspect of the present disclosure includes: transforming a picture on a block basis; reconstructing, using an in-loop filter, the block transformed; predicting the block reconstructed, using intra prediction in which a pixel in the picture is used or inter prediction in which a pixel in another picture is used; and encoding the block. The image encoding method includes: encoding an image including the block by performing, in at least one of the intra prediction, the inter prediction, and the in-loop filter, a non-linear process by which an input-output relationship becomes non-linear; and encoding an operation parameter of a non-linear filter to be used in the non-linear process.

Note that these general and specific aspects may be implemented using a system, an apparatus, an integrated circuit, a computer program, or a computer-readable recording medium such as a compact disc read-only memory (CD-ROM), or any combination of systems, apparatuses, integrated circuits, computer programs, and recording media.

An image can be efficiently encoded by the image encoding method according to the present disclosure.

BRIEF DESCRIPTION OF DRAWINGS

FIG. 15 shows the syntax of a sequence parameter set (SPS) in Embodiment 1.

FIG. 16 shows the syntax of parameter information used in NN intra prediction, NN inter prediction, and an NN in-loop filter in Embodiment 1.

FIG. 17 shows the syntax of a picture parameter set (PPS) in Embodiment 1.

FIG. 18 shows the syntax of a slice header in Embodiment 1.

FIG. 19 shows the syntax of parameter data in NN intra prediction in Embodiment 1.

FIG. 20 shows the syntax of parameter data in NN inter prediction in Embodiment 1.

FIG. 21 shows the syntax of parameter data in an NN in-loop filter in Embodiment 1.

FIG. 22 shows the syntax of a coding unit (CU) in Embodiment 1.

FIG. 23 shows a variation of the syntax of a CU in Embodiment 1 which is a syntax resulting from an NN intra prediction mode merging with a fixed intra prediction mode.

FIG. 24 shows an example of the relationship between intra_pred_mode, a prediction type, a fixed intra prediction mode, and an NN intra prediction mode in a variation of the syntax of a CU in Embodiment 1.

FIG. 25 shows another example of the relationship between intra_pred_mode, a prediction type, a fixed intra prediction mode, and an NN intra prediction mode in a variation of the syntax of a CU in Embodiment 1.

FIG. 26 shows another variation of the syntax of a CU in Embodiment 1 which shows an example in which an NN inter prediction mode is extracted with fractional MV accuracy.

FIG. 43 shows the syntax of a CU in Embodiment 3.

FIG. 57 shows the syntax of parameter data in NN intra prediction in Embodiment 5.

FIG. 58 shows the syntax of parameter data in NN intra prediction in Embodiment 5.

FIG. 77 shows a structure of multiplexed data.

FIG. 88 shows an example of a look-up table in which video data standards are associated with driving frequencies.

FIG. 89A is a diagram showing an example of a configuration for sharing a module of a signal processor.

FIG. 89B is a diagram showing another example of a configuration for sharing a module of the signal processor.

DESCRIPTION OF EXEMPLARY EMBODIMENTS

Underlying Knowledge Forming Basis of the Present Disclosure

In relation to the image encoding apparatus which encodes an image and the image decoding apparatus which decodes an image, described in the "BACKGROUND ART" section, the inventors have found the problem indicated below.

In recent years, the progress of digital video device technology has been remarkable, and opportunities for compression-coding a video signal (a plurality of pictures arranged in chronological order) input from a video camera or a television tuner, and recording the resulting data on a recording medium such as a digital versatile disc (DVD) or a hard disk has been increasing. Although H.264/AVC (MPEG-4 AVC) exists as an image coding standard, the High Efficiency Video Coding (HEVC) standard (NPL 1) has been standardized as a next generation standard.

The image encoding method in the HEVC standard (NPL 1) includes: predicting an encoded image; calculating a difference between the predicted image and a current image to be encoded; transforming a difference image into frequency coefficients; quantizing the frequency coefficients; performing an arithmetic encoding process on the frequency coefficients, prediction information, and the like; decoding the encoded image; and performing an in-loop filter in which the decoded image is filtered. The process of prediction includes intra prediction which is prediction within an image and inter prediction which is prediction between images. Each of the intra prediction, the inter prediction, and the in-loop filter uses a filter represented by a weighted linear sum of neighboring pixels, and several patterns of fixed filter coefficients are used in the filter calculation.

When the linear filter or fixed filter coefficients are used, however, there is a case where the difference between the predicted image and the current image cannot be reduced, and thus there is the problem of an increase in the amount of code or image quality deterioration in that case.

Hereinafter, embodiments will be specifically described with reference to the drawings. Note that each of the embodiments described below shows a general or specific example. The numerical values, shapes, materials, structural elements, the arrangement and connection of the structural elements, steps, the processing order of the steps etc. shown in the following embodiments are mere examples, and are not intended to limit the scope of the present disclosure.

Embodiment 1

<Overall Configuration>

Figure 1:
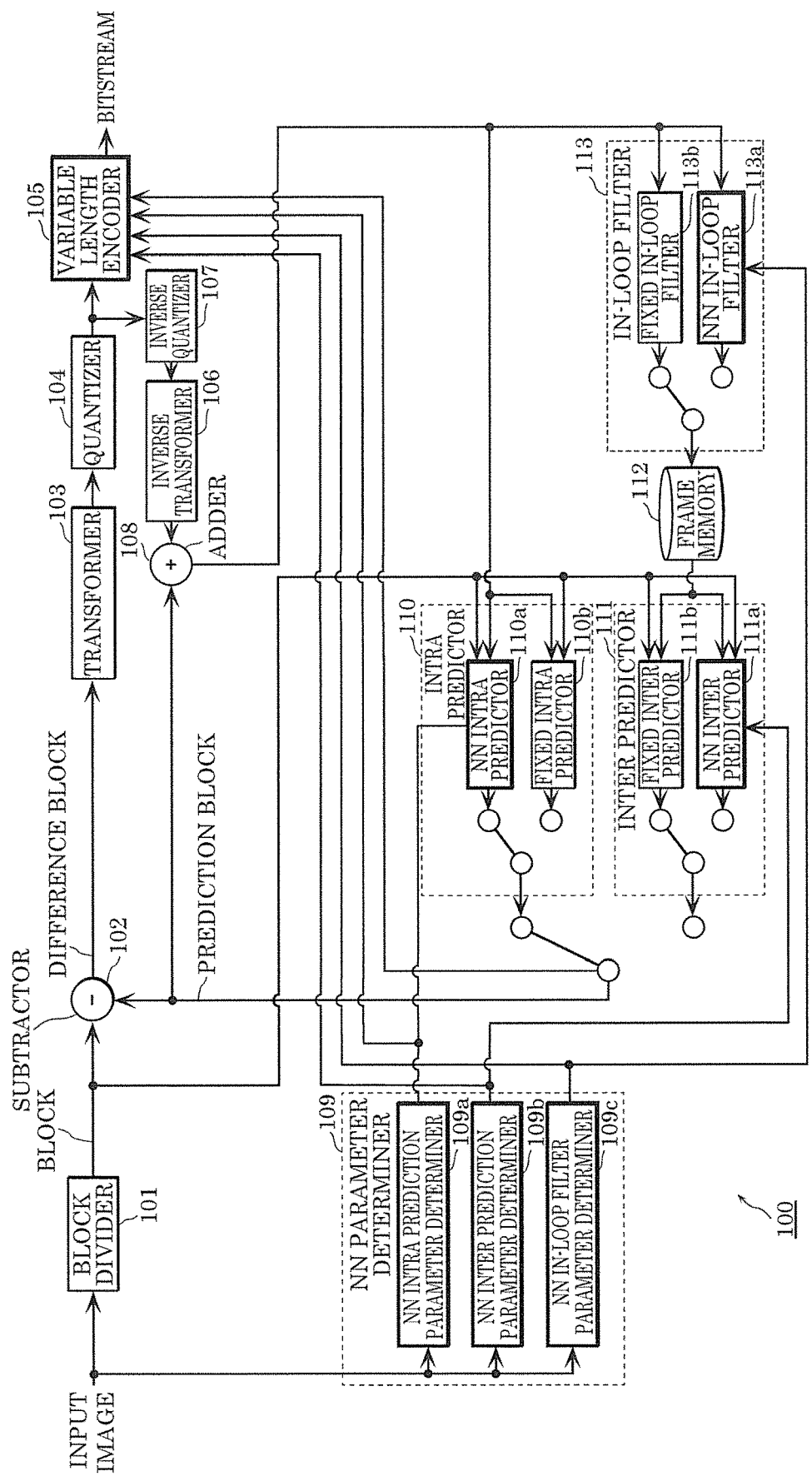
FIG. 1 is a block diagram showing a configuration of an image encoding apparatus according to Embodiment 1.

FIG. 1 is a block diagram showing a configuration of an image encoding apparatus according to the present embodiment.

Image encoding apparatus 100 according to the present embodiment includes block divider 101, subtractor 102, transformer 103, quantizer 104, variable-length encoder 105, inverse transformer 106, inverse quantizer 107, adder 108, NN parameter determiner 109, intra predictor 110, inter predictor 110, inter predictor 111, frame memory 112, and in-loop filter 113. In the present disclosure, NN stands for a neural network. Processes performed by these structural elements will be described below using flowcharts, etc.

<Operation (as a Whole)>

Figure 2:
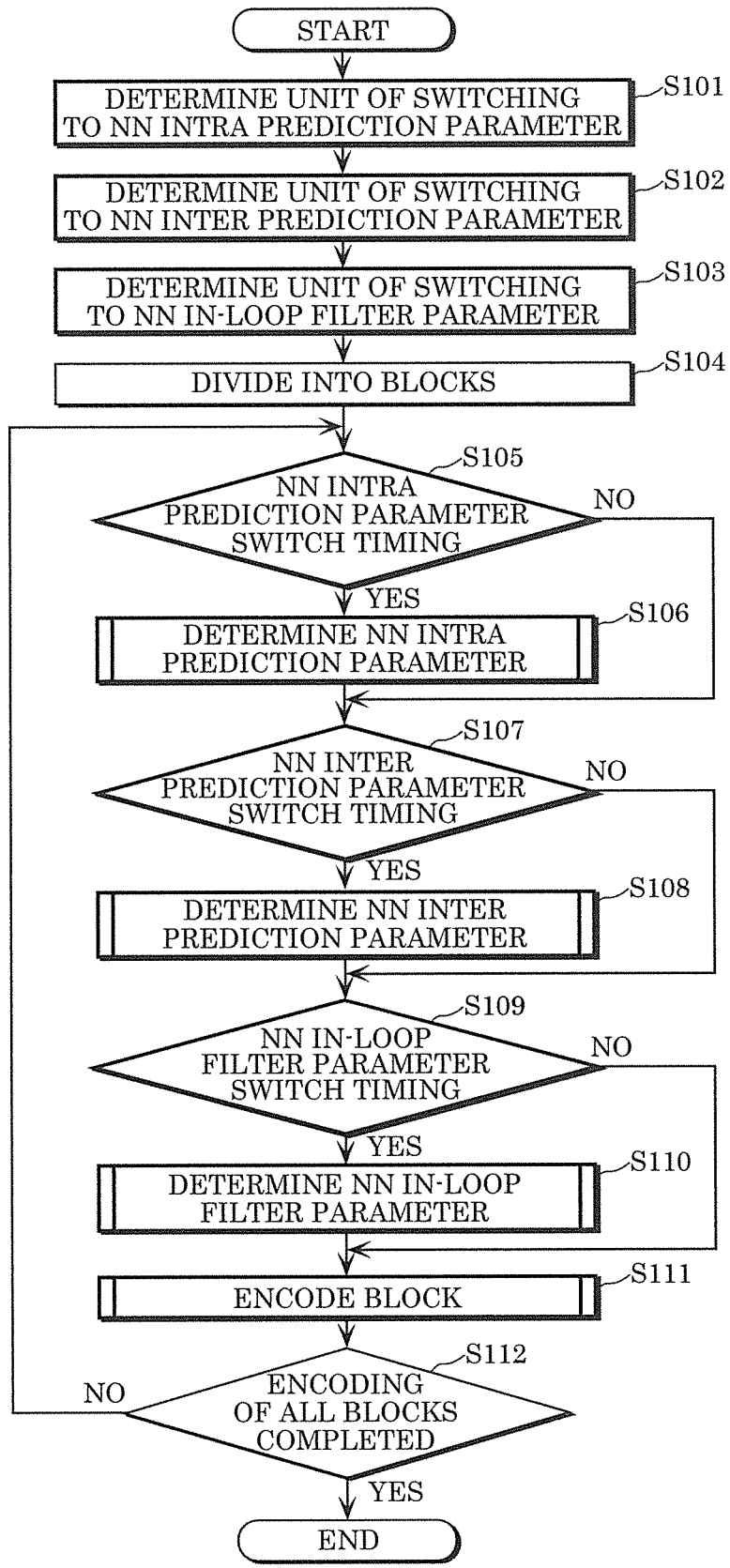
FIG. 2 is a flowchart showing the overall process of image encoding by an image encoding apparatus according to Embodiment 1.

FIG. 2 is a flowchart showing the overall process of image encoding by image encoding apparatus 100.

First, NN parameter determiner 109 parses a current image to be encoded or a current group (sequence) of images to be encoded, and determines a unit of switching to an NN intra prediction parameter, a unit of switching to an NN inter prediction parameter, and a unit of switching to an NN in-loop filter parameter (which will be hereinafter collectively referred to as a unit of NN parameter switching) (S101, S102, S103). For example, NN parameter determiner 109 calculates pixel variance, average, etc., of blocks in an image, and sets, as parameter switch timing, timing of a change in block tendency in encoding order. Examples of the unit of NN parameter switching include a coding unit (CU), a coding tree unit (CTU), a slice, a tile, a picture, or a group of pictures (GOP).

Next, block divider 101 divides an input image into blocks and sequentially outputs the blocks to subtractor 102, intra predictor 110, and inter predictor 111 (S104).

Next, NN intra prediction parameter determiner 109a determines whether or not the timing of the current block is NN intra prediction parameter switch timing, and when the timing of the current block is the NN intra prediction parameter switch timing, determines an NN intra prediction parameter (S105, S106). Likewise, NN inter prediction parameter determiner 109a determines whether or not the timing of the current block is NN inter prediction parameter switch timing, and when the timing of the current block is the NN inter prediction parameter switch timing, determines an NN inter prediction parameter (S107, S108). Likewise, NN in-loop filter parameter determiner 109c determines whether or not the timing of the current block is NN in-loop filter parameter switch timing, and when the timing of the current block is the NN in-loop filter parameter switch timing, determines an NN in-loop filter parameter (S109, S110). Details regarding the determination of each parameter will be described later. Next, image encoding apparatus 100 encodes a block (S111) and repeats Steps S105 to S111 until encoding of all the blocks in the current image is completed (S112).

Note that the unit of NN parameter switching may be the same in at least two of the NN intra prediction, the NN inter prediction, and the NN in-loop filter. For example, the unit of NN parameter switching may be a slice in the NN intra prediction and the NN inter prediction while the unit of NN parameter switching may be a picture in the NN in-loop filter.

The parameter switch timing such as the NN intra prediction parameter switch timing mentioned above is timing at which a block included in a new unit of NN parameter switching different from the unit of NN parameter switching including an immediately previously encoded block is encoded as a current block to be encoded.

<Operation (Flow of Encoding Block)>

Figure 3:
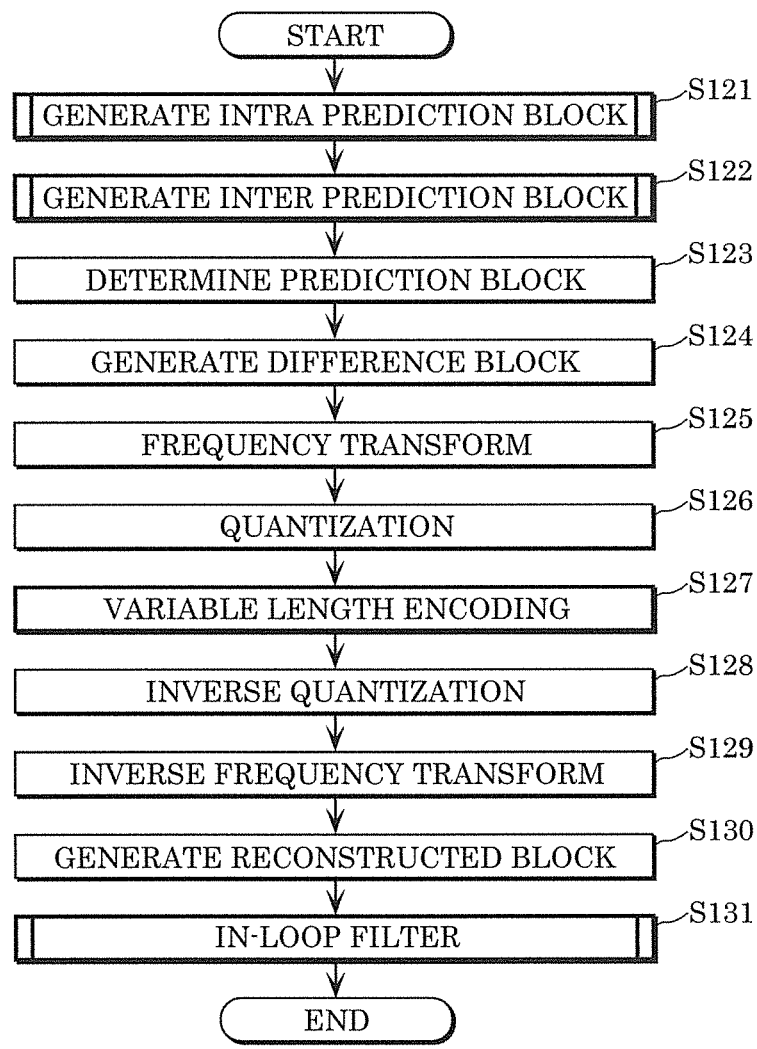
FIG. 3 is a flowchart showing the details of encoding a block in Step S111 in FIG. 2.

FIG. 3 is a flowchart showing the details of encoding a block in Step S111 in FIG. 2.

First, intra predictor 110 and inter predictor 111 generate an intra prediction block and an inter prediction block (S121, S122). Details will be described later.

Next, image encoding apparatus 100 determines a prediction block by selecting one of the intra prediction block and the inter prediction block (S123). The subtractor 102 generates a difference block by subtracting the prediction block from the current block (S124). Transformer 103 performs frequency transformation on the difference block (S125), and quantizer 104 quantizes a plurality of frequency coefficients obtained by the frequency transformation (S126). Variable-length encoder 105 generates a bitstream by variable-encoding a plurality of quantized value obtained by the quantization (S127). Furthermore, inverse quantizer 107 performs inverse quantization on the plurality of quantized values obtained by the quantization (S128), and inverse transformer 106 performs inverse frequency transformation on a plurality of frequency coefficients obtained by the inverse quantization (S129). Adder 108 generates a reconstructed block by adding a prediction block to a decoded difference block obtained by the inverse frequency transformation (S130). Furthermore, in-loop filter 113 performs an in-loop filter on the reconstructed block and stores the reconstructed block into frame memory 112 (S131). The in-loop filter will be described later.

<Operation (Flow of Generating Intra Prediction Block)>

Figure 4:
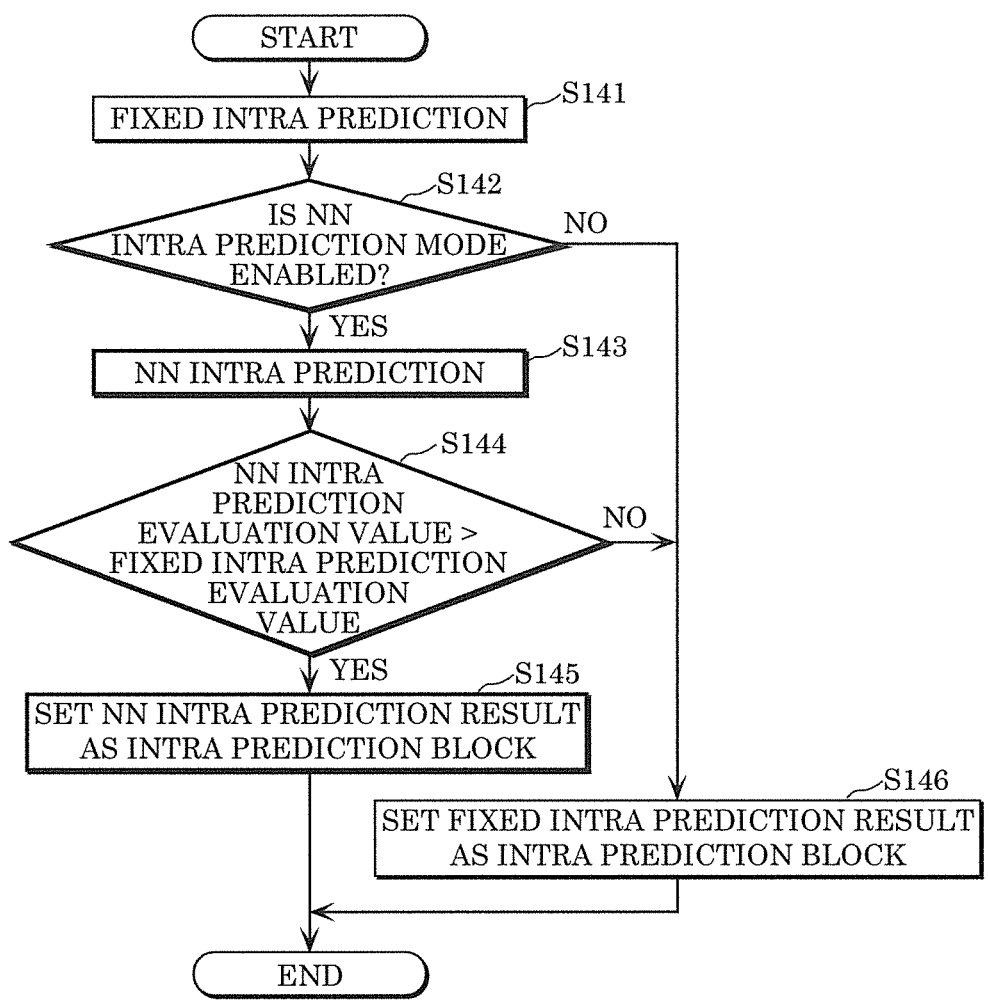
FIG. 4 is a flowchart showing the details of generating an intra prediction block in Step S121 in FIG. 3.

FIG. 4 is a flowchart showing the details of generating the intra prediction block in Step S121 in FIG. 3. Note that intra predictor 110 generates this intra prediction block.

First, fixed intra predictor 110b performs intra prediction using a fixed filter (S141). This is the same as or similar to that in the conventional HEVC and therefore, description thereof will be omitted.

Next, NN intra predictor 110a determines whether or not an NN intra prediction mode is enabled (S142), and when the NN intra prediction mode is enabled, performs intra prediction (S143). NN intra predictor 110a uses, for the intra prediction, a parameter determined by NN intra prediction parameter determiner 109Aa. Details will be described later, but the parameter exists for each class, and NN intra predictor 110a uses one class as one mode and obtains the result of the NN intra prediction by selectively using a prediction mode in which the accuracy of prediction is high (the difference between the predicted image and the current image is small) and the amount of code for a prediction mode identifier is small. Next, intra predictor 110 compares an NN intra prediction evaluation value and a fixed intra prediction evaluation value (S144). Intra predictor 110 sets the result of the NN intra prediction as the intra prediction block when the NN intra prediction evaluation value is greater (S145), and otherwise sets the result of the fixed intra prediction as the intra prediction block (S146). The evaluation value increases as the difference between the predicted image (intra prediction block) and the current image (current block to be encoded) is reduced, and increases as the amount of code for a parameter necessary for the prediction (in the case of the NN intra prediction, a necessary weighting factor, bias value, etc.) is reduced.

<Operation (Flow of Generating Inter Prediction Block)>

Figure 5:
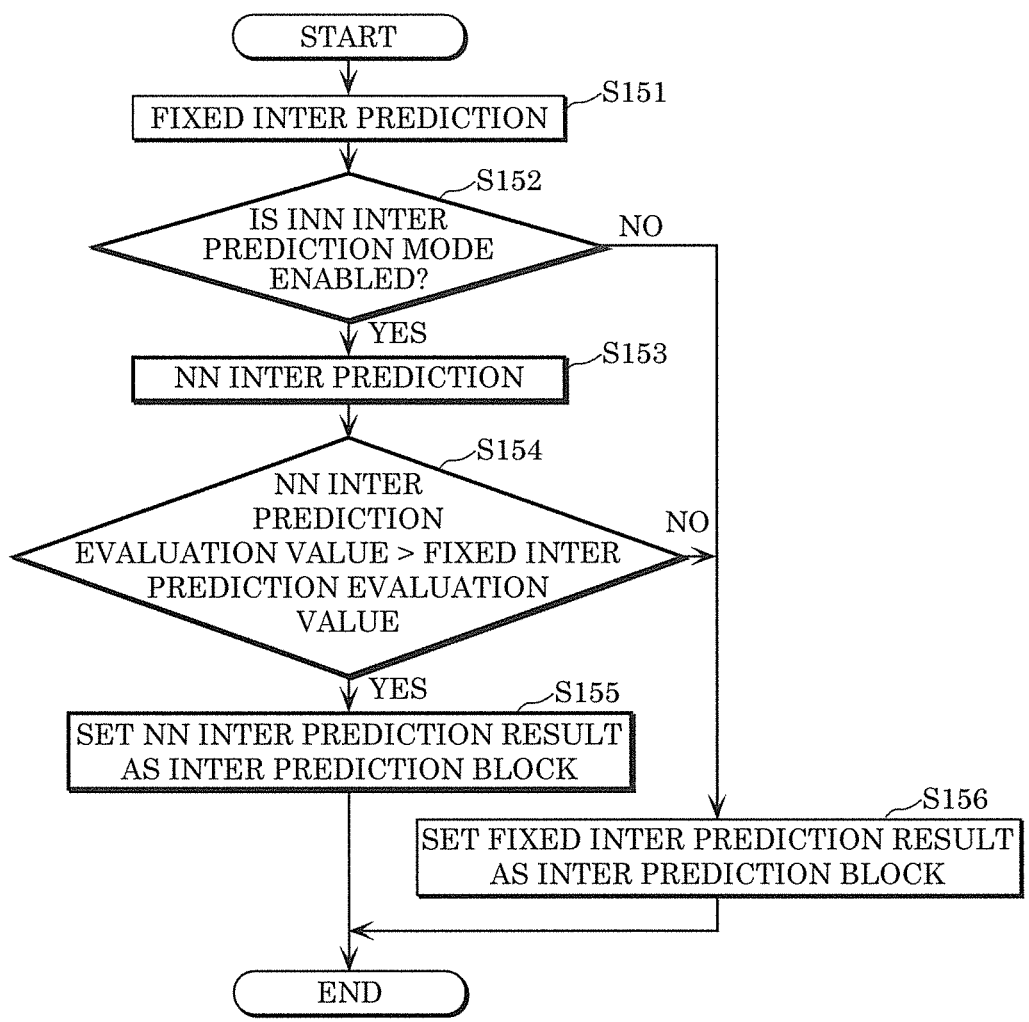
FIG. 5 is a flowchart showing the details of generating an inter prediction block in Step S122 in FIG. 3.

FIG. 5 is a flowchart showing the details of generating the inter prediction block in Step S122 in FIG. 3. Steps S151 to S156 in this flowchart in FIG. 5 are substantially the same as Steps S141 to S146 in the flowchart for generating the intra prediction block in FIG. 4; it is only necessary to replace the NN intra prediction and the fixed intra prediction by NN inter prediction and fixed inter prediction, and thus description thereof will be omitted.

<Operation (In-Loop Filter Flow)>

Figure 6:
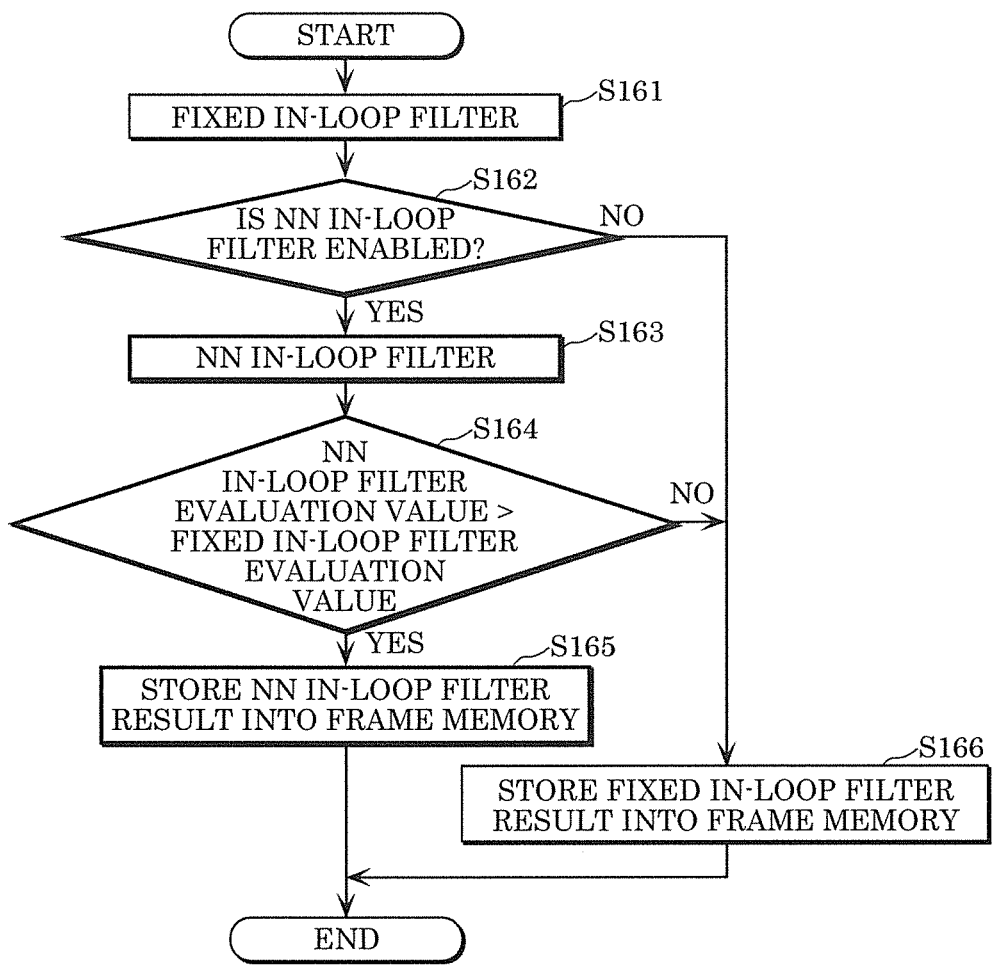
FIG. 6 is a flowchart showing the details of an in-loop filter in Step S131 in FIG. 3.

FIG. 6 is a flowchart showing the details of the in-loop filter in Step S131 in FIG. 3. Steps S161 to S164 in this flowchart in FIG. 6 are substantially the same as Steps S141 to S144 in the flowchart for generating the intra prediction block in FIG. 4; it is only necessary to replace the NN intra prediction and the fixed intra prediction by an NN in-loop filter and a fixed in-loop filter, and thus description thereof will be omitted. In Steps S165 and S166 in the flowchart in FIG. 6, in-loop filter 113 stores a filter result with a better evaluation value into frame memory 112.

<Operation (Flow of Determining NN Intra Prediction Parameter)>

Figure 7:
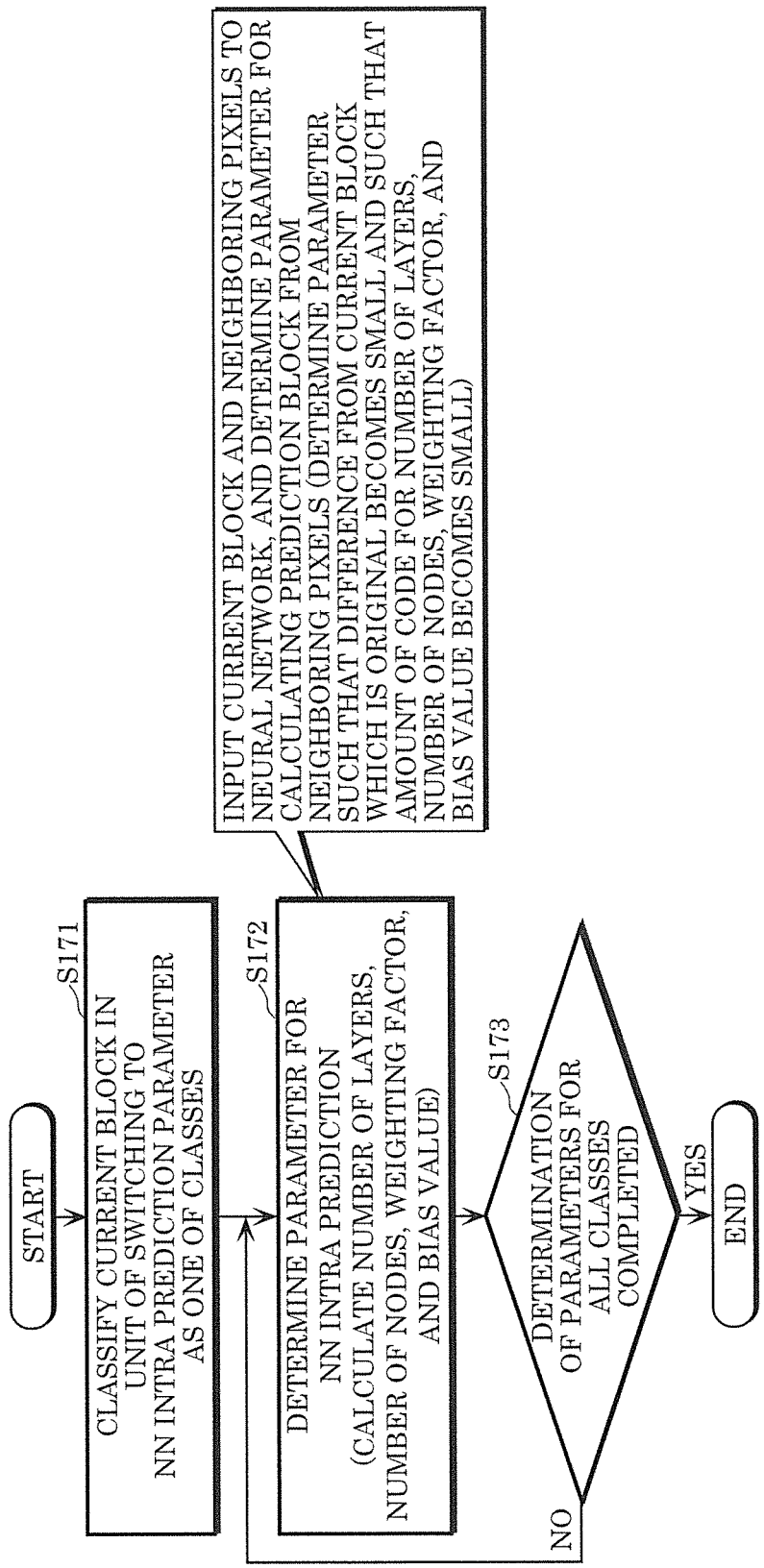
FIG. 7 is a flowchart showing the details of determining an NN intra prediction parameter in Step S106 in FIG. 2.

FIG. 7 is a flowchart showing the details of determining the NN intra prediction parameter in Step S106 in FIG. 2.

First, NN intra prediction parameter determiner 109a classifies each of the current blocks in the unit of switching to the NN intra prediction parameter as one of a plurality of classes (S171). For example, when the unit of switching to the NN intra prediction parameter is a picture, NN intra prediction parameter determiner 109a classifies the current blocks in a picture. The classification is carried out using feature information of the block. For example, the current block is classified using pixel variance or pixel distribution.

Next, NN intra prediction parameter determiner 109a determines a parameter for the NN intra prediction for each of the classes into which the current blocks are classified (S172). Details will be described with reference to FIG. 10 and FIG. 13.

Figure 10:
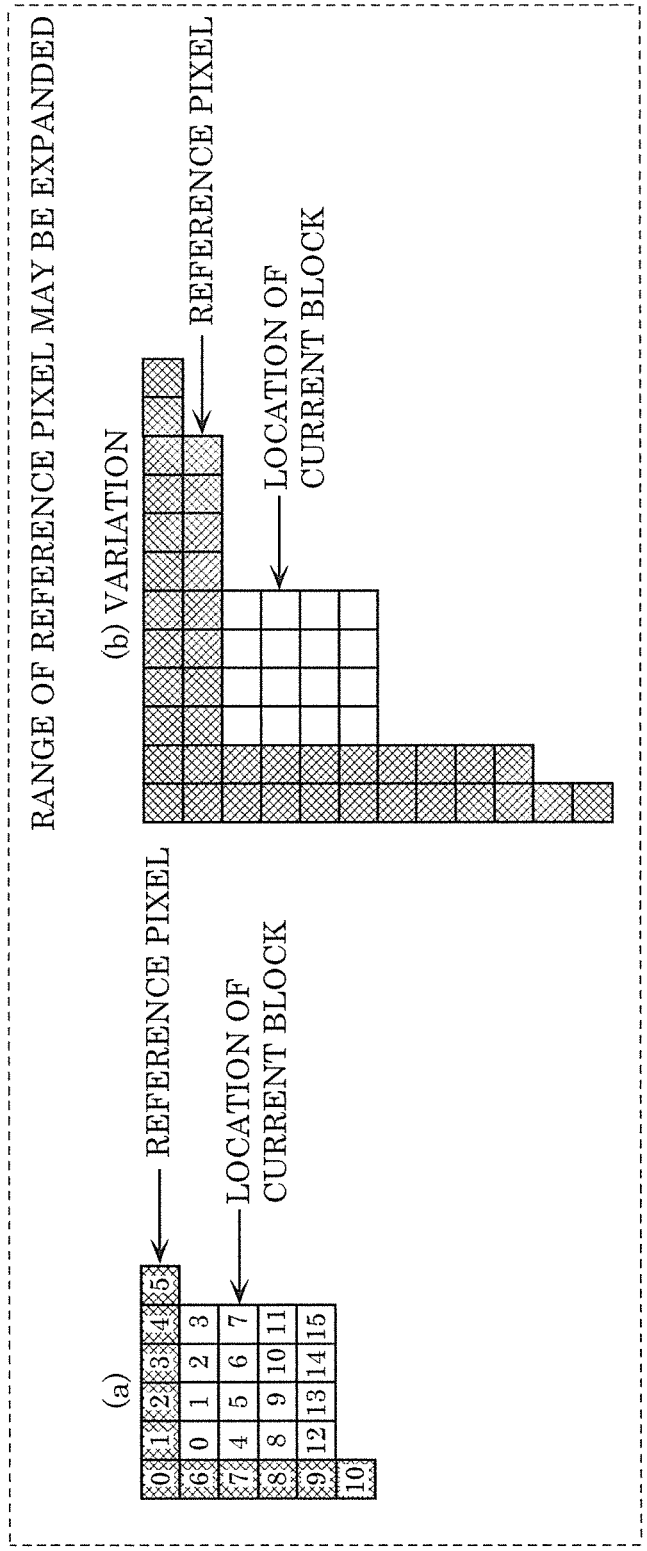
FIG. 10 shows the relationship between a reference pixel in NN intra prediction and a current block in Embodiment 1.

In FIG. 10, (a) shows the relationship between a reference pixel in the NN intra prediction and the current block. Each square represents one pixel. As illustrated in the figure, NN intra prediction parameter determiner 109a uses, as reference pixels, neighboring pixels above the current block and neighboring pixels to the left of the current block.

Figure 13:
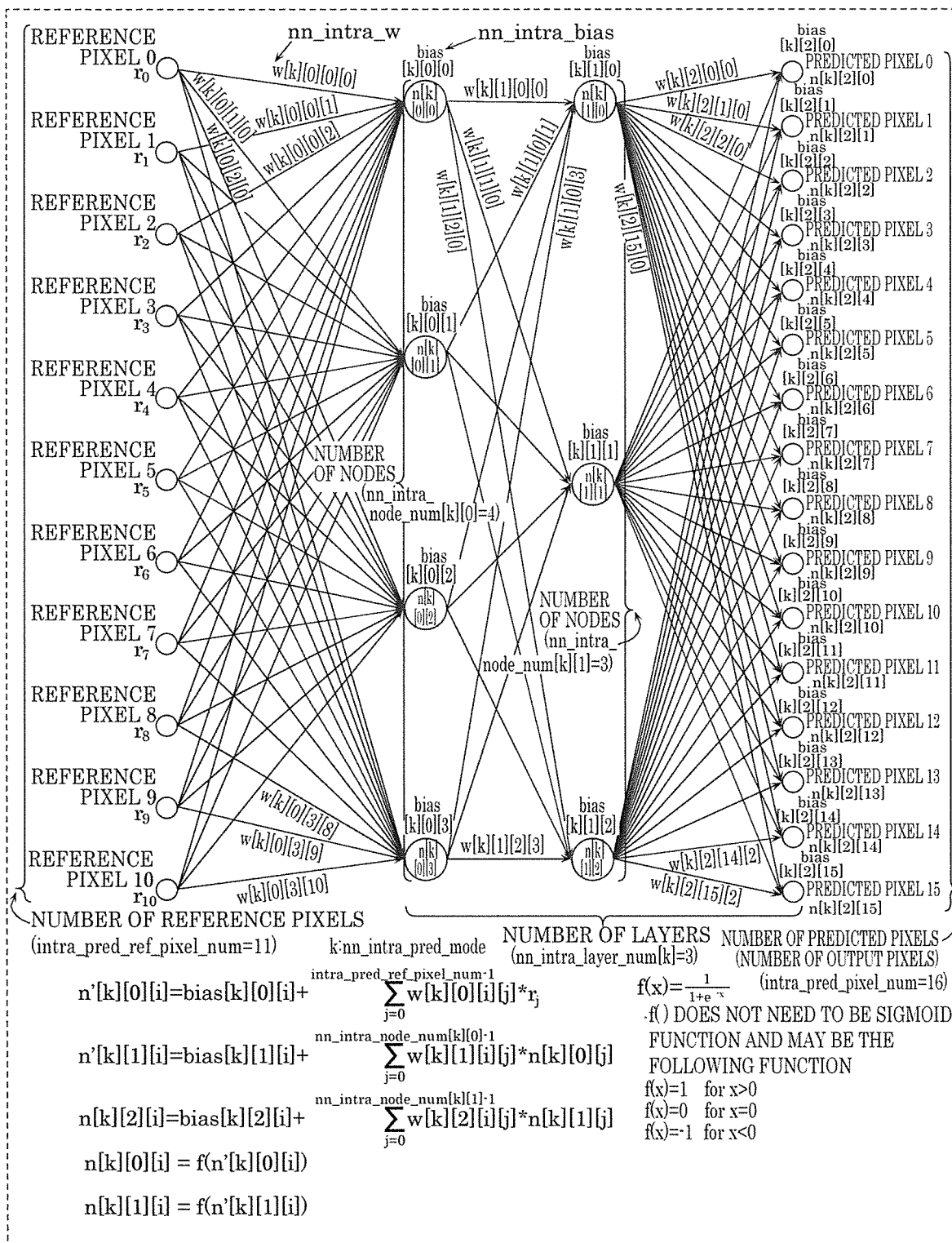
FIG. 13 shows one example of NN intra prediction in Embodiment 1.

FIG. 13 shows one example of the NN intra prediction. This NN intra prediction has a neural network structure; 11 circles at the left end represent reference pixels to be input and correspond to reference pixels 0 to 10 in (a) in FIG. 10. Meanwhile, 16 circles at the right end represent predicted pixels to be output and are predicted pixels corresponding to numbers 0 to 15 at the location of the current block in (a) in FIG. 10. In the determination of the parameter for the NN intra prediction in Step S172 in FIG. 7, NN intra prediction parameter determiner 109a determines the number of layers, the number of nodes, the weighting factor, and the bias value in the neural network shown in FIG. 13. The number of layers (nn_intra_layer_num[k]) is the number of layers in mode (class) k, that is, the number of stages in the horizontal direction in FIG. 13. The number of nodes (nn_intra_node_num[k][ ]) is the node count in each layer in the vertical direction. For example, the number of nodes (nn_intra_node_num[k][0]) is the number of nodes in the 0-th layer (in the example in FIG. 13, the number of nodes is 4) in mode (class) k. The weighting factor (nn_intra_w[k][ ][ ][ ]) is a factor to be multiplied by the input value of each node in mode (class) k. For example, the weighting factor (nn_intra_w[k][0][0][2]) is a factor to be multiplied by the second input value (the value at reference pixel 2 or input node r2) at the 0-th node in the 0-th layer in mode (class) k (n[k][0][0]). The bias value (nn_intra_bias[k][ ][ ]) is a value to be added to a weighted sum of input values. For example, the bias value (nn_intra_bias[k][1][1]) is a value to be added to a weighted sum of input values (the values at input nodes n[k][0][0] to n[k][0][3]) at the first node in the first layer in mode (class) k (n[k][1][1]). The output value of each node can be represented by the following equations.

$$n'[k][0][i] = \text{bias}[k][0][i] + \sum_{j=0}^{intra\_pred\_ref\_pixel\_num-1} w[k][0][i][j] * r_j \quad \text{[Math. 1]}$$

$$n'[k][1][i] = \text{bias}[k][1][i] + \sum_{j=0}^{nn\_intra\_node\_num[k][0]-1} w[k][1][i][j] * n[k][0][j]$$

$$n'[k][2][i] = \text{bias}[k][2][i] + \sum_{j=0}^{nn\_intra\_node\_num[k][1]-1} w[k][2][i][j] * n[k][1][j]$$

$$n[k][0][i] = f(n'[k][0][i])$$
$$n[k][1][i] = f(n'[k][1][i])$$
$$f(x) = \frac{1}{1+e^{-x}}$$

In the equations, w is a weighting factor, bias is a bias value, n is an output value of a node, n' is a temporary variable upon calculation of the output value of the node. Furthermore, intra_pred_ref_pixel_num represents the number of reference pixels, and is 11 in this example. Note that intra_pred_ref_pixel_num may be different according to the mode (k) or the number of predicted pixels. Furthermore, nn_intra_node_num represents the number of nodes, and is 4 in the first layer and 3 in the second layer in this example. Moreover, [k] represents a class (mode). When the blocks are classified into three classes in the classification in Step S171 in FIG. 7, NN intra prediction parameter determiner 109a constructs a network structure such as that shown in FIG. 13 for each of the three classes, and [k] will have a value from 0 to 2.

In the determination of the NN intra prediction parameter in Step S172 in FIG. 7, NN intra prediction parameter determiner 109a learns a pair of the current block and the reference pixels (neighboring pixels) thereof in the same class as training data, and calculates the weighting factor and the bias value for generating (predicting) the current block from the reference pixels. More specifically, NN intra prediction parameter determiner 109a inputs the reference pixel, updates the weighting factor and the bias value by backpropagation or the like so that the predicted pixel to be output approaches the current block (so that the difference is reduced), and calculates the weighting factor and the bias value such that the prediction error for input data (a group of pairs of the current block and the neighboring pixel in the same class) is smallest. NN intra prediction parameter determiner 109a performs this process in different patterns by changing the number of layers and the number of nodes to find a combination of the number of layers, the number of nodes, the weighting factor, and the bias value that offers high accuracy of prediction. Note that since the number of layers, the number of nodes, the weighting factor, and the bias value are encoded and incorporated into the bitstream, NN intra prediction parameter determiner 109a derives an optimal combination by taking not only the accuracy of prediction but also the amount of code for the number of layers, the number of nodes, the weighting factor, and the bias value into account. NN intra prediction parameter determiner 109a performs the process in Step S172 for all classes (S173).

<Operation (Flow of Determining NN Inter Prediction Parameter)>

Figure 8:
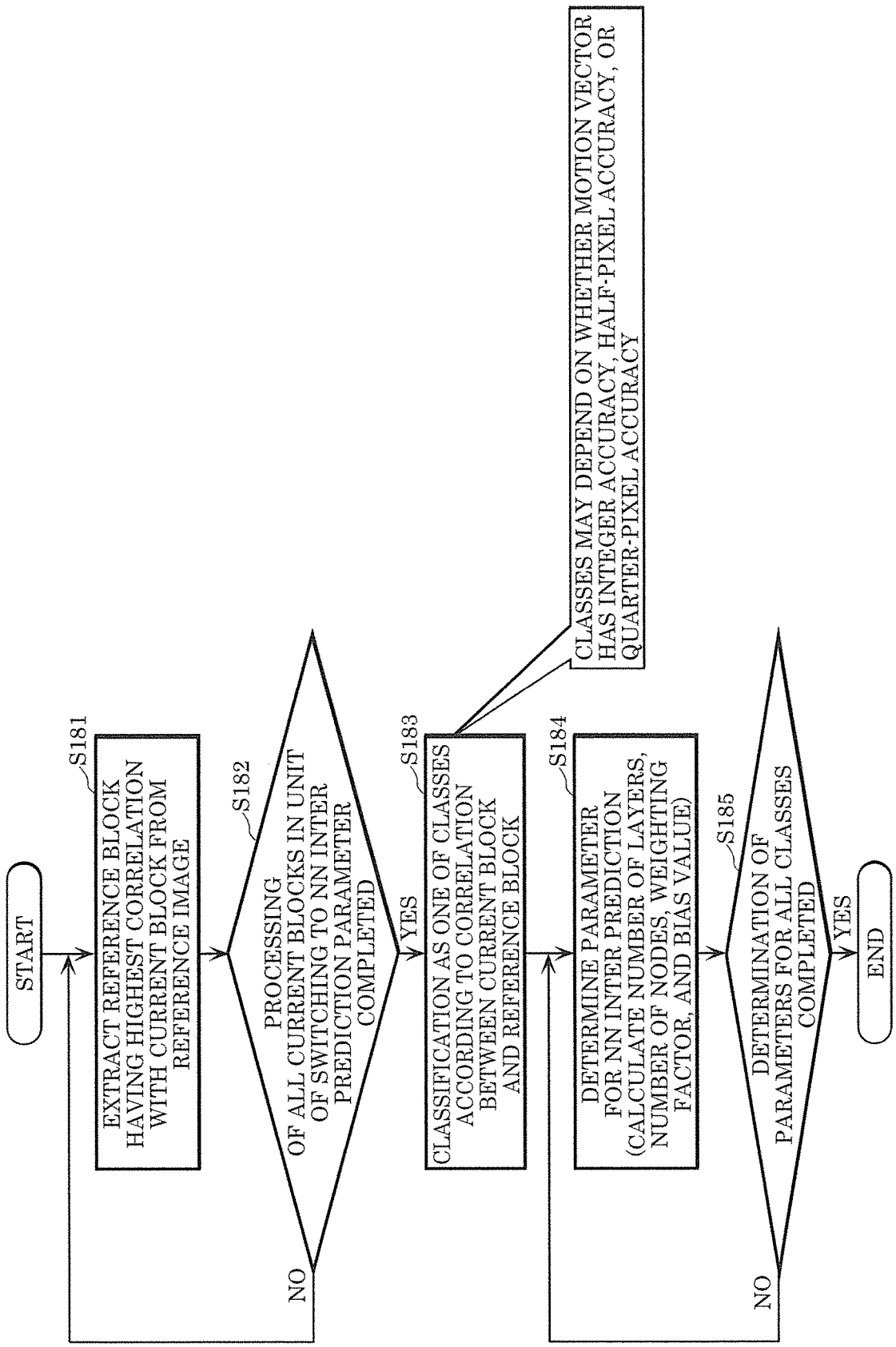
FIG. 8 is a flowchart showing the details of determining an NN inter prediction parameter in Step S108 in FIG. 2.

FIG. 8 is a flowchart showing the details of determining an NN inter prediction parameter in Step S108 in FIG. 2.

First, NN inter prediction parameter determiner 109b extracts, for each of the current blocks, a reference block having the highest correlation from the reference image, and performs this process on all the current blocks in the unit of switching to the NN inter prediction parameter (S181, S182). In the calculation of the correlation, NN inter prediction parameter determiner 109b uses a sum of absolute differences of pixels, for example, and extracts a block having a small sum of absolute differences as the block having the highest correlation.

Next, NN inter prediction parameter determiner 109b classifies each of the current blocks as one of a plurality of classes according to the correlation between the current block and the reference block thereof (S183). For example, NN inter prediction parameter determiner 109b classifies the current blocks by the magnitude of the sum of absolute differences between pixels or classifies the current blocks by using the variance, average, or the like of the differences of the pixels.

Next, NN inter prediction parameter determiner 109b determines a parameter for the NN inter prediction for each of the classes into which the current blocks are classified (S184). Details will be described with reference to FIG. 11 and FIG. 14.

Figure 11:
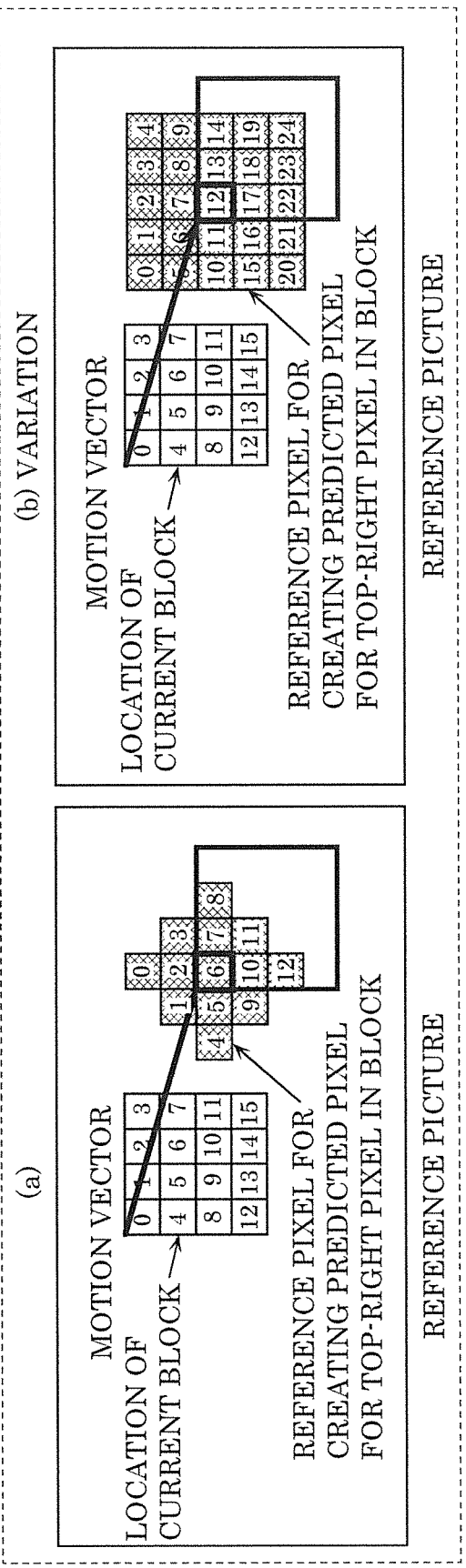
FIG. 11 shows the relationship between a reference pixel in NN inter prediction and a current block in Embodiment 1.

In FIG. 11, (a) shows the relationship between a reference pixel in the NN inter prediction and the current block. Each square represents one pixel. As shown in FIG. 11, NN inter prediction parameter determiner 109b uses a pixel included in a reference image made up of 13 pixels for prediction of one pixel in the current block. The motion vector is information for specifying the location of a block having the highest correlation in the reference image. NN inter prediction parameter determiner 109b uses, as a reference pixel, a neighboring pixel of the location of the block having the highest correlation.

Figure 14:
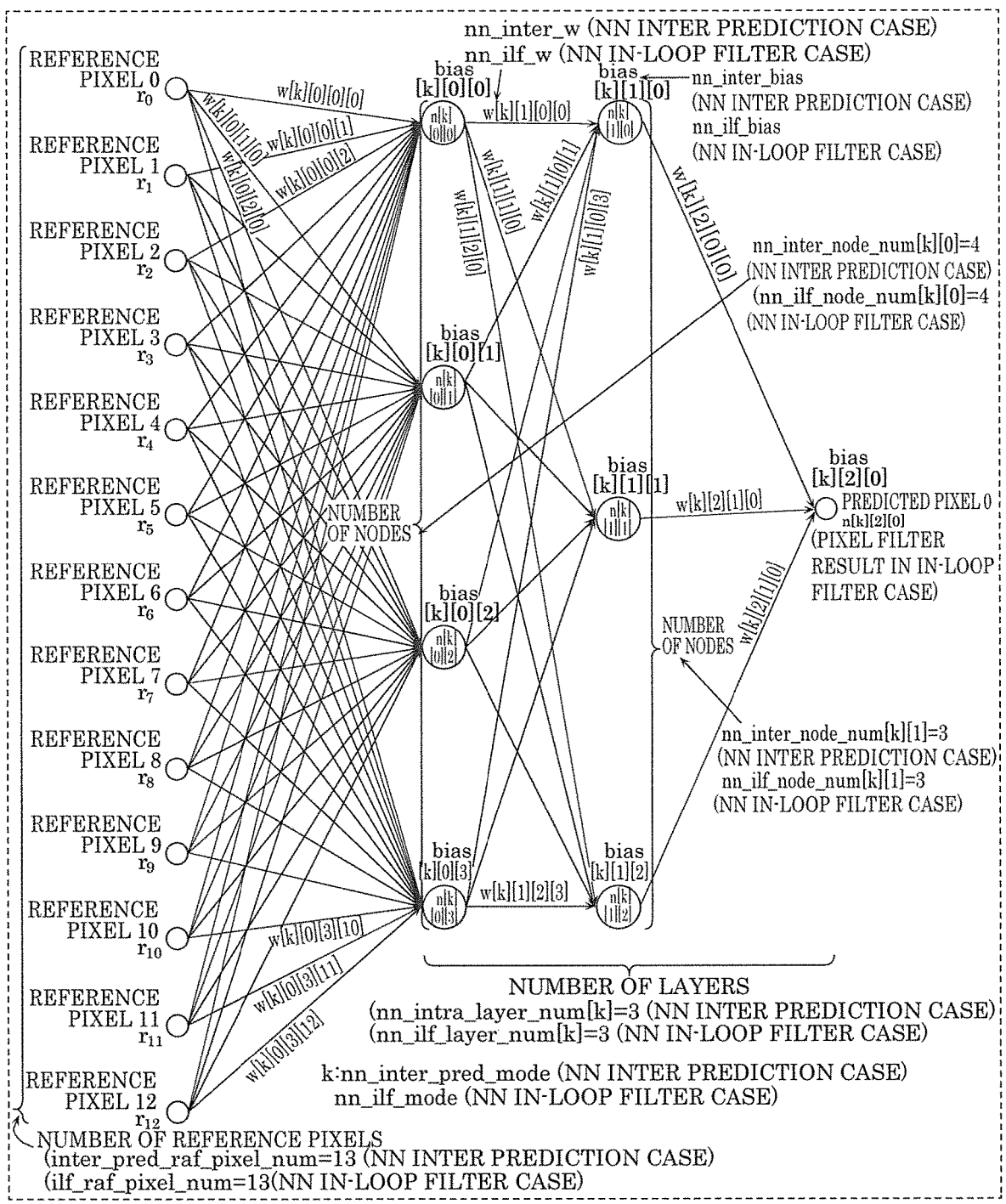
FIG. 14 shows one example of NN inter prediction in Embodiment 1.

FIG. 14 shows one example of the NN inter prediction. This NN inter prediction has a neural network structure similarly to the NN intra prediction; 13 circles at the left end represent reference pixels to be input and correspond to reference pixels 0 to 12 in (a) in FIG. 11. Meanwhile, one circle at the right end represents a predicted pixel to be output and is a predicted pixel corresponding to number 0 at the location of the current block in (a) in FIG. 11. In the determination of the parameter for the NN inter prediction in Step S184 in FIG. 8, NN inter prediction parameter determiner 109b determines the number of layers, the number of nodes, the weighting factor, and the bias value in the neural network shown in FIG. 14. The method for calculating the number of layers, the number of nodes, the weighting factor, the bias value, and the output value of each node is similar to that in FIG. 13, and thus description thereof will be omitted. A difference from the NN intra prediction is that NN inter prediction parameter determiner 109b inputs 13 reference pixels and generates a predicted pixel for one pixel. This means that, in order to generate predicted pixels in a 4×4 block, NN inter prediction parameter determiner 109b inputs the reference pixels to the neural network shown in FIG. 14 in such a manner that they are shifted by one pixel each time, and repeats this process 16 times to generate 16 predicted pixels. In the determination of the parameter for the NN inter prediction in Step S184 in FIG. 8, NN inter prediction parameter determiner 109b learns a pair of a current pixel to be encoded and the reference pixels thereof in the same class as training data, and calculates the number of layers, the number of nodes, the weighting factor, and the bias value for generating (predicting) the current pixel from the reference pixels. NN inter prediction parameter determiner 109b performs the process in Step S184 for all classes (S185).

<Operation (Flow of Determining NN In-Loop Filter Parameter)>

Figure 9:
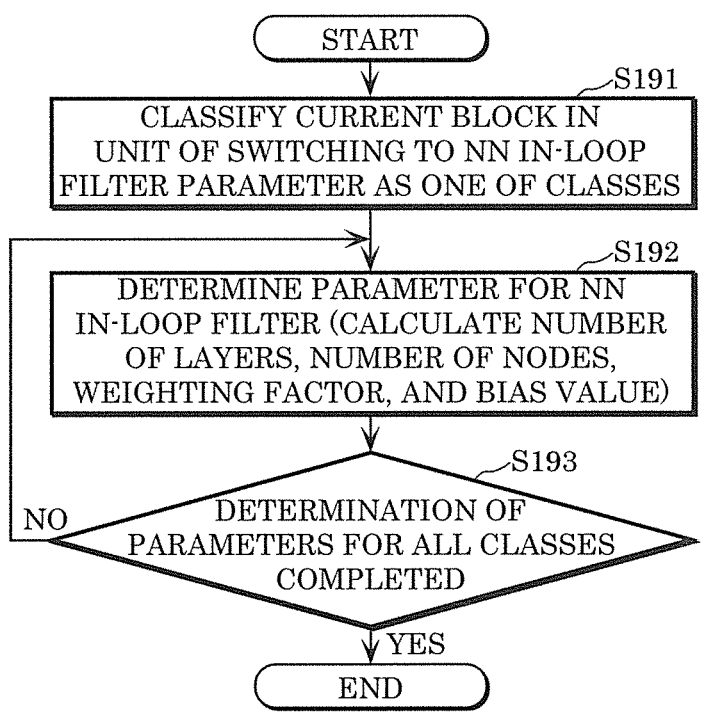
FIG. 9 is a flowchart showing the details of determining an NN in-loop filter parameter in Step S110 in FIG. 2.
Figure 12:
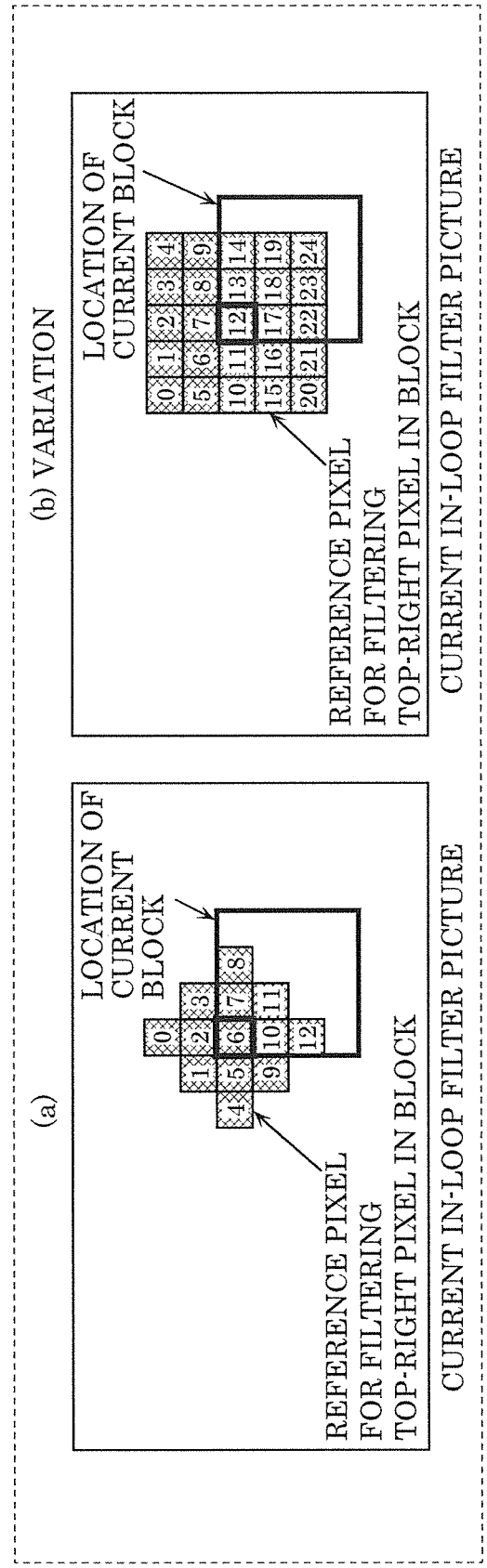
FIG. 12 shows one example of an NN in-loop filter in Embodiment 1.

FIG. 9 is a flowchart showing the details of determining an NN in-loop filter parameter in Step S110 in FIG. 2. FIG. 12 shows one example of an NN in-loop filter. Note that the processes in Steps S191 to S193 in the flowchart in FIG. 9, which NN in-loop filter parameter determiner 109c performs, are similar to the processes in Steps S171 to S173 in the flowchart for determining the NN intra prediction parameter shown in FIG. 7. Thus, description of the flowchart in FIG. 9 will be omitted. Note that, as shown in FIG. 12, NN in-loop filter parameter determiner 109c uses 13 pixels neighboring the current pixel as reference pixels. The NN in-loop filter has a network structure such as the structure shown in FIG. 14 similarly to the NN inter prediction. As in the NN inter prediction, NN in-loop filter parameter determiner 109a learns the reference pixels and the current pixel in each class as training data, and calculates the number of layers, the number of nodes, the weighting factor, and the bias value for generating the current pixel from the reference pixels.

<Syntax Structure>

Regarding the NN intra prediction, the NN inter prediction, and the NN in-loop filter, information to be encoded will be described with reference to FIG. 15 to FIG. 22.

FIG. 15 shows the syntax of a sequence parameter set (SPS). In the figure, nn_intra_pred_enabled_flag, nn_inter_pred_enabled_flag, and nn_ilf_enabled_flag are flags indicating whether or not the NN intra prediction, the NN inter prediction, and the NN in-loop filter are enabled (enabled/disabled information). Specifically, the enabled/disabled information is for determining whether or not the process in Step S142 in FIG. 4, Step S152 in FIG. 5, or Step S162 in FIG. 6 is valid. Furthermore, the enabled/disabled information may be present in the PPS or may be present in the slice header or the coding tree unit (CTU).

FIG. 16 shows the syntax of parameter information used in the NN intra prediction, the NN inter prediction, and the NN in-loop filter in Embodiment 1. In the figure, nps_id is an identifier for this data set. Image encoding apparatus 100 specifies nps_id to obtain a necessary operation parameter when performing the NN intra prediction, the NN inter prediction, or the NN in-loop filter. Furthermore, nps_nn_intra_pred_data_present_flag, nps_nn_inter_pred_data_present_flag, and nps_nn_ilf_data_present_flag are flags indicating whether this syntax includes a parameter for the NN intra prediction (nn_intra_pred_parameter_data( )), a parameter for the NN inter prediction (nn_inter_pred_parameter_data( )), and a parameter for the NN in-loop filter (nn_ilf_parameter_data( )). When these flags are 1, variable-length encoder 105 encodes information about the number of layers, the number of nodes, the weighting factor, and the bias value (operation parameters) to be used in the NN intra prediction, the NN inter prediction, and the NN in-loop filter according to nn_intra_pred_parameter_data( ), nn_inter_pred_parameter_data( ), and nn_ilf_parameter_data( ), which will be described later.

FIG. 17 shows the syntax of a picture parameter set (PPS). When any of nn_intra_pred_enabled_flag, nn_inter_pred_enabled_flag, and nn_ilf_enabled_flag is 1, that is, when any of the NN intra prediction, the NN inter prediction, and the NN in-loop filter is enabled, variable-length encoder 105 encodes pps_nps_id. For a picture using this PPS, image encoding apparatus 100 performs the NN intra prediction, the NN inter prediction, or the NN in-loop filter using the operation parameter of nps_id that matches pps_nps_id.

FIG. 18 shows the syntax of a slice header. When any of nn_intra_pred_enabled_flag, nn_inter_pred_enabled_flag, and nn_ilf_enabled_flag is 1, that is, when any of the NN intra prediction, the NN inter prediction, and the NN in-loop filter is enabled, variable-length encoder 105 encodes slice_nps_id. For a slice using this slice header, image encoding apparatus 100 performs the NN intra prediction, the NN inter prediction, or the NN in-loop filter using the operation parameter of nps_id that matches slice_nps_id. Note that when pps_nps_id and slice_nps_id have different values, image encoding apparatus 100 preferentially uses the value of slice_nps_id.

FIG. 19 shows the syntax of parameter data in the NN intra prediction. In the figure, nn_intra_mode_num indicates the number of modes of the NN intra prediction and corresponds to the number of classes in the classification in Step S171 in FIG. 7. Furthermore, nn_intra_layer_num[k] indicates the number of layers in the NN intra prediction, and [k] indicates that the mode is the k-th mode of the NN intra prediction. Furthermore, nn_intra_node_num[k][i] indicates the number of nodes in the i-th layer in the k-th mode. Furthermore, nn_intra_bias[k][i][j] indicates the bias value for the i-th node in the i-th layer in the k-th mode. Furthermore, nn_intra_w[k][i][j][m] indicates the m-th input weighting factor for the j-th node in the i-th layer in the k-th mode. In this way, variable-length encoder 105 encodes parameter information (operation parameter) for the network structure in FIG. 13 in accordance with the syntax in FIG. 19.

FIG. 20 shows the syntax of parameter data in the NN inter prediction. FIG. 21 shows the syntax of parameter data in the NN in-loop filter. Variable-length encoder 105 encodes parameter information for the network structure in FIG. 14 as in the NN intra prediction in FIG. 19.

FIG. 22 shows the syntax of a coding unit (CU). In the figure, intra_pred_type is information indicating which of the NN intra prediction and the fixed intra prediction is used. In S144 in FIG. 4, when the NN intra prediction evaluation value is greater, variable-length encoder 105 encodes intra_pred_type indicating NN_INTRA_PRED, and when the fixed intra prediction evaluation value is greater, variable-length encoder 105 encodes intra_pred_type indicating FIXED_INTRA_PRED. Note that when nn_intra_pred_enabled_flag indicates that the NN intra prediction is disabled, variable-length encoder 105 does not encode intra_pred_type. In this case, the decoder side operates to always perform the fixed intra prediction. When the NN intra prediction is used, variable-length encoder 105 encodes a mode of the NN intra prediction as nn_intra_pred_mode. When the fixed intra prediction is used, variable-length encoder 105 encodes a mode of the fixed intra prediction as fixed_intra_pred_mode. Note that nn_intrapred_mode is information indicating which of the classes (modes) the operation parameter selected in the NN intra prediction in S143 in FIG. 4 belongs to, and corresponds to [k] in FIG. 13. Furthermore, fixed_intra_pred_mode corresponds to a prediction direction in the HEVC intra prediction, and fixed intra predictor 110b switches plural sets of filter coefficients therebetween according to fixed_intra_pred_mode.

Furthermore, inter_pred_type is information indicating which of the NN inter prediction and the fixed inter prediction is used. In S154 in FIG. 5, when the NN intra prediction evaluation value is greater, variable-length encoder 105 encodes inter_pred_type indicating NN_INTER_PRED, and when the fixed intra prediction evaluation value is greater, variable-length encoder 105 encodes inter_pred_type indicating FIXED_INTRA_PRED. Note that when nn_inter_pred_enabled_flag indicates that the NN inter prediction is not enabled, variable-length encoder 105 does not encode inter_pred_type. In this case, the decoder side operates to always perform the fixed inter prediction. When the NN inter prediction is used, variable-length encoder 105 encodes a mode of the NN inter prediction as nn_inter_pred_mode. Note that nn_nter_pred_mode is information indicating which of the classes (modes) the operation parameter selected in the NN inter prediction in S153 in FIG. 5 belongs to, and corresponds to [k] in FIG. 14. Furthermore, at prediction_unit ( ), variable-length encoder 105 encodes a motion vector, a reference image index, etc., as in the HEVC.

Furthermore, ilf_type is information indicating which of the NN in-loop filter and the fixed in-loop filter is used. In S164 in FIG. 6, when the NN in-loop filter evaluation value is greater, variable-length encoder 105 encodes ilf_type indicating NN_ILF, and when the fixed in-loop filter evaluation value is greater, variable-length encoder 105 encodes ilf_type indicating FIXED_ILF. Note that when nn_ilf_enabled_flag indicates that the NN in-loop filter is not enabled, variable-length encoder 105 does not encode ilf type. In this case, the decoder side operates to always perform the fixed in-loop filter. When the NN in-loop filter is used, variable-length encoder 105 encodes a mode of the NN in-loop filter as nn_ilf mode. Note that nn_ilf mode is information indicating which of the classes (modes) the operation parameter selected in the NN in-loop filter in S163 in FIG. 6 belongs to, and corresponds to [k] in FIG. 14.

Advantageous Effects

As described above, according to the present embodiment, the specialized predicted pixel can be generated or the specialized in-loop filter can be performed for the current image; the prediction error can be reduced or the in-loop filter process that makes the subject more similar to the current image becomes available, and thus the encoding efficiency can be improved. More specifically, the current pixel can be accurately generated from the reference pixels as a result of learning the relationship between the current pixel and the reference pixels using the neural network, and thus the accuracy of prediction can be improved and noise can be reduced. In the intra prediction, when an object not present in the neighboring pixels appears in the current block, prediction is difficult in the conventional HEVC, but in the NN intra prediction, prediction is possible because even such data is learned as training data in advance. In the inter prediction, in the HEVC sub-pel generation method which uses a general-purpose filter process to deal with any input image, there is a case where the accuracy of sub-pel prediction is low depending on the input image. In contrast, according to the present embodiment, a filter process appropriate for the input image can be used as a result of learning using the input image in the NN inter prediction, and thus the accuracy of prediction can be improved. Likewise, in the in-loop filter, a specialized filter operation for the input image can be constructed in the NN in-loop filter, and thus it is possible to generate an image similar to the original image at a further reduced noise level.

Note that as indicated in FIG. 2, the unit of NN parameter switching can be set separately in the NN intra prediction, the NN inter prediction, and the NN in-loop filter, but may all be the same or may be partially the same. For example, the unit of NN parameter switching may be set to a unit of slice in the NN intra prediction and the NN inter prediction while the unit of NN parameter switching may be a unit of picture in the NN in-loop filter. This setting allows the determination of switch timing to be unified, resulting in a reduction in the information (the amount of code) for the switching.

Alternatively, the unit of NN parameter switching may be, for example, the GOP which ranges over more than one picture. Such an increase in the size of the unit of NN parameter switching allows for a reduction in the amount of code for identifier information for the switching and furthermore, allows for a reduction in the number of types of the NN parameter needed to be encoded, resulting in a reduction in the amount of code for the NN parameter. Furthermore, in the case of switching in the unit of GOP, NN parameter determiner 109 may input a plurality of pictures and learn from blocks in these pictures to determine the NN parameter or determine a parameter using only blocks in a representative image. This allows for a reduction in the length of learning time (the amount of processing for determining a parameter); when a parameter is determined through learning using only the leading picture, it is possible to start the encoding process without the need to wait for succeeding pictures to be input. As a result, the delay of the output of a bitstream can be reduced.

The enabled/disabled state of the neural network (NN) such as the NN intra prediction mode, the NN inter prediction mode, or the NN in-loop filter may be changed according to the profile or may be specified by a user. Alternatively, the enabled/disabled state may be changed according to a request from an application in use.

Figure 27:
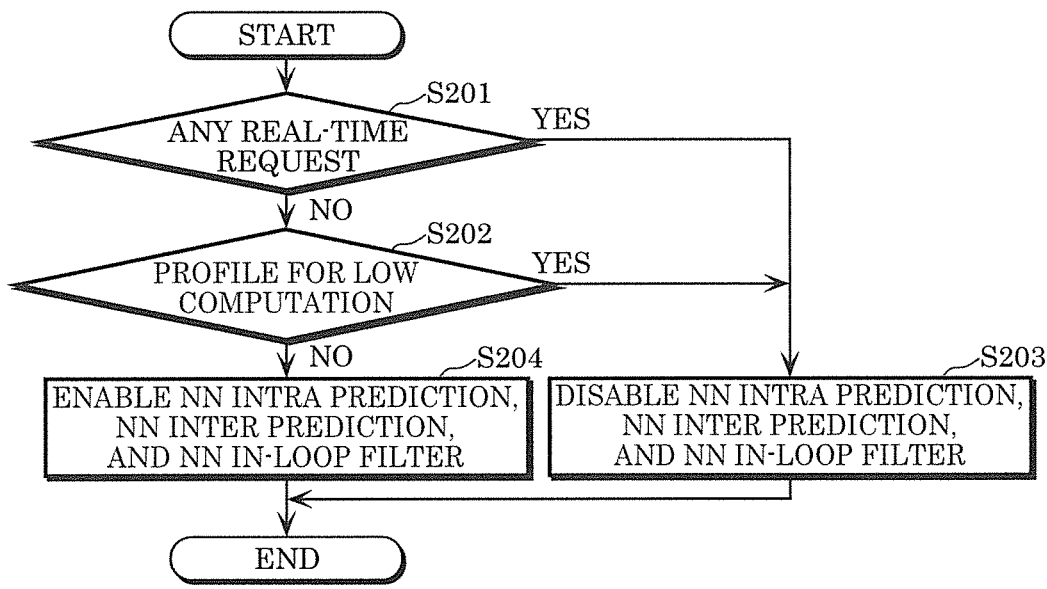
FIG. 27 is a flowchart showing a process of switching between enable and disabled states of NN according to a profile and a request in Embodiment 1.

FIG. 27 is a flowchart showing a process of switching between the enabled and disabled states of the NN according to the profile and the request.

For example, as shown in Steps S201 to S204 in FIG. 27, image encoding apparatus 100 may disable the NN intra prediction, the NN inter prediction, and the NN in-loop filter when there is a real-time request and when the profile is for low computation. Examples of the application in which there is a real-time request include videotelephony, while, examples of the application in which there is no real-time request include compression of movie content that is used in the distribution over the Internet. In the NN prediction and in-loop filter, since current data to be encoded needs to be learned in advance, it is necessary to scan the input image before the encoding process as with the 2-pass encoding. Therefore, the delay occurring between the input of an image and the output of a bitstream is more than that with the fixed filter. Thus, for example, in the case of the application or profile in which real-timeliness is important, the NN is disabled to reduce the delay, while, when enhanced compression capability is required, the NN is enabled to increase the compression ratio; as such, it is possible to switch between the enabled and disabled states of the NN according to the situation.

In the determination of the NN inter prediction parameter shown in FIG. 8, NN inter prediction parameter determiner 109b classifies the current block as one of the plurality of classes according to the correlation between the current block and the reference block thereof. However, NN inter prediction parameter determiner 109*b* may classify the current block using fractional motion vector accuracy information which is information for specifying the location of a block having high correlation in the reference image. For example, NN inter prediction parameter determiner 109*b* may classify the current block as class 0 when both the x component and the y component of the motion vector for the current block have integer pixel accuracy, and may classify the current block as class 1 when both the x component and the y component have half-pixel accuracy.

Furthermore, in the present embodiment, learning data is classified into a plurality of classes, and a parameter for the neural network is determined in each of the classes so that the neural network in each of the classes can be selected as one mode. However, the present disclosure is not limited to this example; there may only be a single mode. Specifically, each of the NN intra prediction, the NN inter prediction, and the NN in-loop filter may have a neural network in one mode without the classification into a plurality of groups. In this case, it goes without saying that nn_intra_pred_mode, nn_inter_pred_mode, and nn_ilf_mode in the syntax of the CU shown in FIG. 22 always have fixed numerical values and are thus no longer needed.

Furthermore, although NN parameter determiner 109 determines the number of layers, the number of nodes, the weighting factor, and the bias value as the operation parameters, the maximum number of layers or nodes may be set according to the request from the application or the profile, or they may be fixed values.

Figure 28:
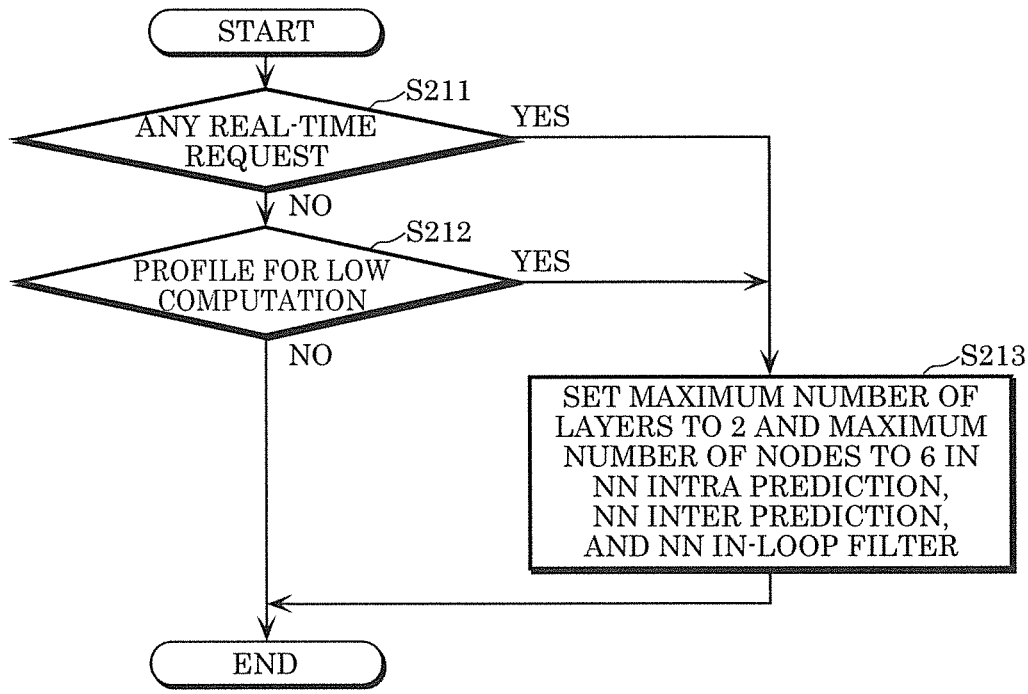
FIG. 28 is a flowchart showing a process of setting a parameter, etc., according to a profile and a request in Embodiment 1.

FIG. 28 is a flowchart showing a process of setting a parameter, etc., according to the profile and the request.

For example, as shown in Steps S211 to S213 in FIG. 28, NN parameter determiner 109 sets the maximum number of layers and the maximum number of nodes in the neural network to 2 and 6, respectively, for an application requiring real-timeliness and a profile for low computation. Limiting the number of layers and the number of nodes allows for a reduction in the amount of calculation for determining a parameter in image encoding apparatus 100 and a reduction in the amount of calculation for processing in the NN intra prediction, the NN inter prediction, and the NN in-loop filter in image encoding apparatus 100 and the image decoding apparatus. As a result, this is advantageous for an application requiring low delay or a low-specification image decoding apparatus. Furthermore, a user operating image encoding apparatus 100 may set a limit value. This allows the user to control the encoding throughput or the delay of the output of the bitstream.

Furthermore, the neural network has more than one layer in the structure examples shown in FIG. 13 and FIG. 14, but may be structured to have a single layer; for example, the neural network may have a structure of a mere weighted linear sum. This allows for a reduction in the throughput with a simplified structure and moreover allows for a reduction in the parameter information to be encoded; this may be efficient depending on the input image. In the minimum structure, it is sufficient that only the weighting factor to be multiplied by each reference pixel be encoded.

Image encoding apparatus 100 may perform pre-processing on the reference pixels to be used at the time of determining the parameter or the reference pixel to be used in the NN intra prediction, the NN inter prediction, or the NN in-loop filter before inputting the reference pixels to the neural network. Examples of the pre-processing include low-pass filtering, convolution operation, pooling, and sampling. This makes the reference pixels more generalized data and may improve the accuracy of prediction or in-loop filter performance. Furthermore, an operation parameter necessary for the pre-processing may be additionally included in the bitstream.

Image encoding apparatus 100 may use, as the learning data to be used at the time of determining the parameter, only a region in which the prediction error or encoding noise is likely to be large. For example, only an edge region or a highly complex region in the current image may be used as the learning data. In a region in which the prediction error or the encoding noise is small, the performance in the fixed intra prediction, the fixed inter prediction, or the fixed in-loop filter is often sufficient. Therefore, in that region, the fixed intra prediction, the fixed inter prediction, or the fixed in-loop filter may be used, and it is sufficient that the NN process be applied only to the other region in which the prediction error or the encoding noise is likely to be large. Accordingly, when only the region in which the prediction error or the encoding noise is likely to be large is used as the learning data, the accuracy of prediction and the in-loop filter performance in such a case are likely to improve. Furthermore, by narrowing down the tendency of the learning data, it is possible to achieve high-performance prediction or in-loop filter with a smaller number of modes, and thus the amount of the NN parameter to be encoded can be reduced.

Furthermore, the reference pixels used in the NN intra prediction are not limited to 11 pixels in (a) in FIG. 10. For example, more reference pixels may be used as in (b) in FIG. 10, and conversely, the reference pixels used in the NN intra prediction may be less than 11 pixels. There is a case where the accuracy of prediction improves when more reference pixels are used (the range is expanded). Note that since the amount of parameters necessary for the NN intra prediction tends to increase, switching may be made possible according to the mode of the NN intra prediction. Furthermore, although the prediction and in-loop filter which use a block size of 4×4 are exemplified in the present embodiment, it goes without saying that the same or similar process is possible even when a block size of 8×8 or 16×16 is used as in the HEVC and that the number of reference pixels increases as the block size increases.

Likewise, the reference pixels used in the NN inter prediction are also not limited to 13 pixels in (a) in FIG. 11. For example, more reference pixels may be used as in (b) in FIG. 11. Moreover, the shape defined by the location of the reference pixels that are used may be a rhombus as shown in (a) in FIG. 11 or may be a square or a rectangle as shown in (b) in FIG. 11. There is a case where the accuracy of prediction improves when more reference pixels are used (the range is expanded). Note that since the amount of parameters necessary for the NN inter prediction tends to increase, switching may be made possible according to the mode of the NN inter prediction. Applying the shape of a rhombus makes it possible to remove, from the reference pixels, a pixel that seems to have low correlation while keeping a certain range as well as to reduce the amount of necessary parameters while maintaining prediction performance.

Likewise, the reference pixels used in the NN in-loop filter are also not limited to 13 pixels in (a) in FIG. 12. For example, more reference pixels may be used as in (b) in FIG. 12. Moreover, the shape defined by the location of the reference pixels that are used may be a rhombus as shown in (a) in FIG. 12 or may be a square or a rectangle as shown in (b) in FIG. 12. There is a case where the in-loop filter performance improves when more reference pixels are used (the range is expanded). Note that since the amount of parameters necessary for the NN in-loop filter tends to increase, switching may be made possible according to the mode of the NN in-loop filter.

In the neural network shown in FIG. 13 and FIG. 14, a sigmoid function is used as an activating function f(x). However, the present disclosure is not limited to this example, and a function such as the following may be used.

f(x)=1 for x>0 f(x)=0 for x=0 f(x)=−1 for x<0

In the present embodiment, in order to reduce the processing load for the sigmoid function, for example, table reference using a look-up table may be utilized, or the sigmoid function may be replaced by approximation that requires less calculation. Furthermore, although the present embodiment uses the neural network, this is not limiting; any structure for calculating a predicted pixel or an in-loop filter result from the reference pixels may be used including a mere weighted linear sum or a non-linear filter in which primitive operations such as addition, subtraction, multiplication, and division are combined. Furthermore, although all the reference pixels are connected to all the nodes in the first layer in the examples shown in FIG. 13 and FIG. 14, there may be a reference pixel or a node that is not connected. A structure in which a reference pixel is directly connected to a node in the second or succeeding layer may also be possible.

The enabled flags for the NN intra prediction, the NN inter prediction, and the NN in-loop filter are encoded in the SPS in the present embodiment, but may be present in the PPS, or may be present in the slice header, the CTU, or the CU.

Variable-length encoder 105 may collectively encode, as a parameter set to be used, nn_parameter_set_rbsp( ) shown in FIG. 16, at the leading sequence, the leading GOP, or the leading picture. Image encoding apparatus 100 may use, instead of nps_id, the immediately previously encoded NN parameter at the time of using the NN intra prediction, the NN inter prediction, or the NN in-loop filter. Collective encoding allows for a reduction in the variation of the amount of code between blocks, facilitating the rate control or the like. Furthermore, when a parameter is specified using pps_nps_id or slice_nps_id shown in FIG. 17 and FIG. 18, overlapping parameters no longer need to be encoded, and the effect of a reduction in the amount of code is produced.

Furthermore, a mode of the NN intra prediction and a mode of the fixed intra prediction may be uniformly handled. Specifically, the type information (intra_pred_type) indicating which of the NN intra prediction and the fixed intra prediction is used may be absent, and the NN intra prediction may be used in the case of a specified intra prediction mode.

FIG. 23 shows a variation of the syntax of the CU which is a syntax resulting from the NN intra prediction mode merging with the fixed intra prediction mode. FIG. 24 shows an example of the relationship between intra_pred_mode, the prediction type, the fixed intra prediction mode, and the NN intra prediction mode in the variation of the syntax of the CU. FIG. 25 shows another example of the relationship between intra_pred_mode, the prediction type, the fixed intra prediction mode, and the NN intra prediction mode in the variation of the syntax of the CU.

In the examples shown in FIG. 23 and FIG. 24, intra predictor 110 uses the fixed intra prediction when the intra prediction mode (intra_pred_mode) is less than or equal to 34, and uses the NN intra prediction when the intra prediction mode (intra_pred_mode) is greater than or equal to 35. When the intra prediction mode (intra_pred_mode) is greater than or equal to 35, the numerical value determined by subtracting 35 from the intra prediction mode (intra_pred_mode) is a mode of the NN intra prediction (nn_intra_pred_mode). This eliminates the need for the type information of the intra prediction (intra_pred_type), eliminating the need for not only the amount of code, but also the determination process. Furthermore, as shown in FIG. 25, the NN intra prediction may be used when the intra prediction mode (intra_pred_mode) is 1. In this case, mode 1 of the fixed intra prediction is disabled, and mode 0 of the NN intra prediction is enabled instead. This allows the NN intra prediction to be introduced without changing the total number of modes of the intra prediction. In other words, it is possible to introduce the NN intra prediction without increasing the amount of code for the intra prediction mode. Moreover, this takes into consideration the case in which a part of the modes in the fixed intra prediction becomes unnecessary because of introduction of the NN intra prediction. Mode 0 and mode 1 of the fixed intra prediction are called planar prediction and DC prediction, respectively, and the DC prediction is likely to be selected for a flat image. In the case of a flat image, a similar predicted image can be generated in the planar prediction as well; in this case, the DC prediction mode is redundant. When the NN intra prediction is introduced, there is a case where disabling the DC prediction mode of the fixed intra prediction and when the DC prediction mode is specified, using the NN intra prediction are efficient.

Furthermore, inter predictor 111 may derive a mode of the NN inter prediction from a motion vector (MV).

FIG. 26 shows another variation of the syntax of the CU which shows an example in which the NN inter prediction mode is extracted with fractional MV accuracy.

As shown in the example in FIG. 26, inter predictor 111 derives a mode of the NN inter prediction from sub-pixel accuracy information of MV. In the HEVC, two lowest-order bits of the MV indicate the sub-pel position; the two lowest-order bits of 00 indicate the full-pel position, 01 indicate the quarter-pel position, 10 indicate the half-pel position, and 11 indicate the ¾-pel position. In the example in FIG. 26, inter predictor 111 switches the mode of the NN inter prediction according to the sub-pel positions of the x component and the y component to switch the structure (parameter) of the neural network. The calculation for prediction based on the neighboring pixels can be switched according to the sub-pel position of the MV; there is no need to encode the NN inter prediction mode (nn_inter_pred_mode), and thus the amount of code can be reduced. Moreover, since the accuracy of prediction increases when the calculation for prediction is switched according to the sub-pel position of the MV, it is possible to improve the accuracy of prediction by this method.

Furthermore, the processing performed in the present embodiment may be executed with software. The software may be distributed via downloading, etc. Moreover, the software may be stored on a recording medium such as a compact disc read-only memory (CD-ROM) and distributed. Note that this applies to all other embodiments throughout the Description as well.

Embodiment 2

<Overall Configuration>

Figure 29:
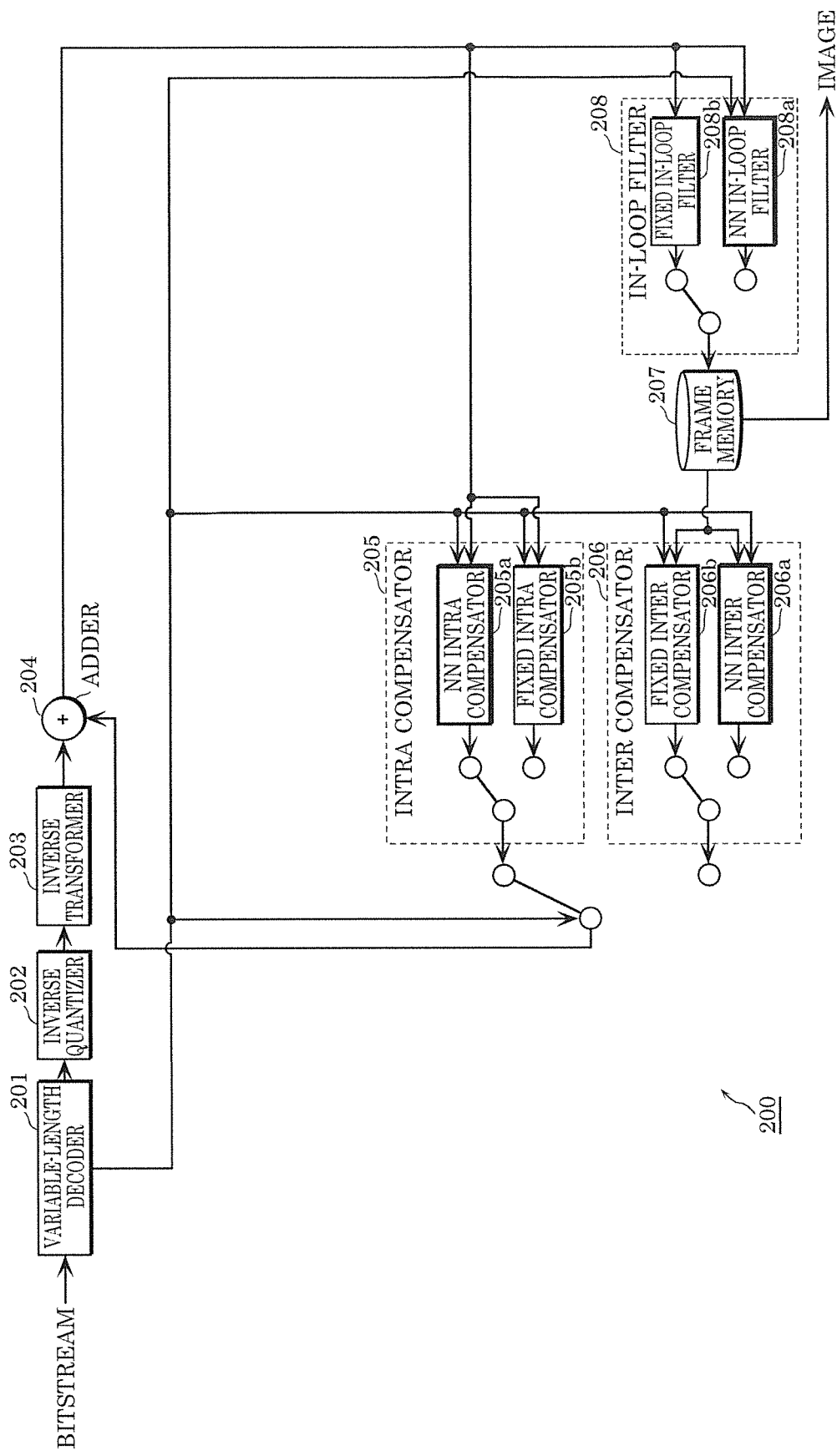
FIG. 29 is a block diagram showing a configuration of an image decoding apparatus according to Embodiment 2.

FIG. 29 is a block diagram showing a configuration of an image decoding apparatus according to the present embodiment.

Image decoding apparatus 200 according to the present embodiment includes variable-length decoder 201, inverse quantizer 202, inverse transformer 203, adder 204, intra compensator 205, inter compensator 206, frame memory 207, and in-loop filter 208. Processes performed by these structural elements will be described below using flowcharts, etc.

<Operation (as a Whole)>

Figure 30:
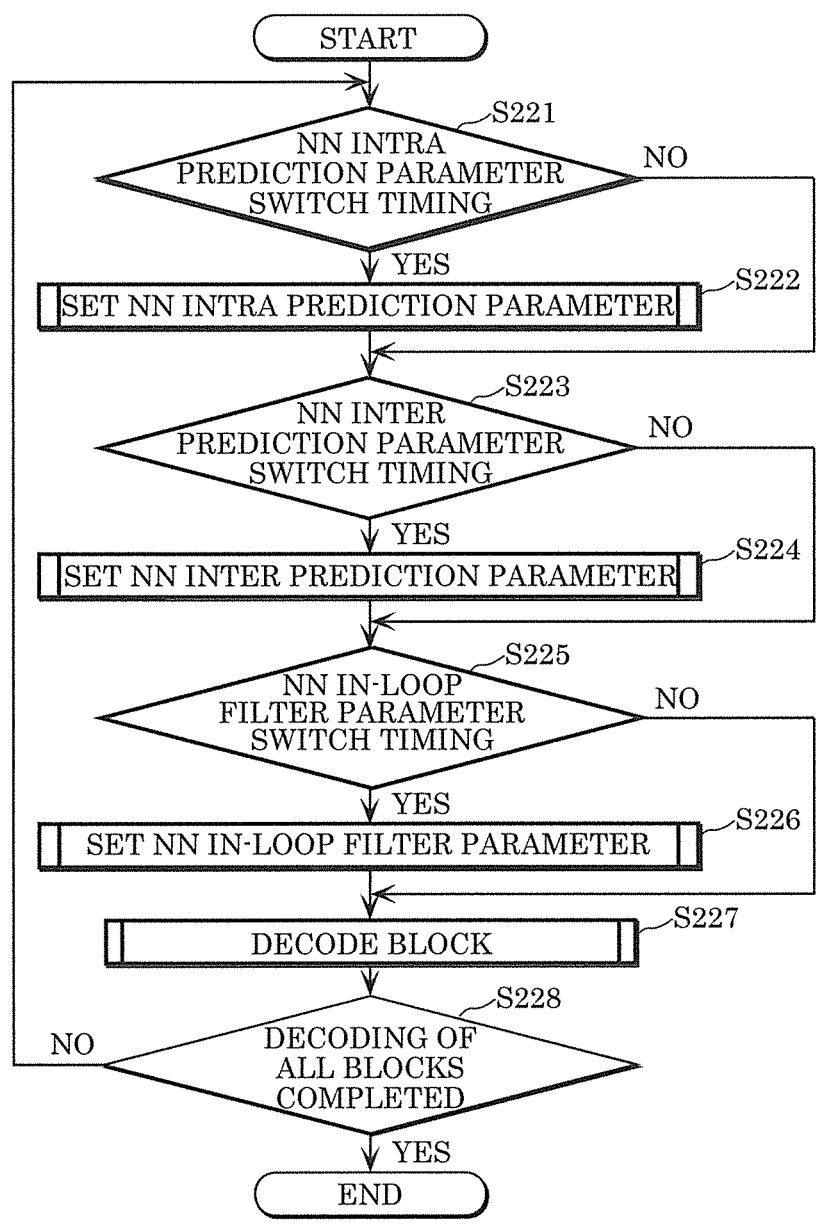
FIG. 30 is a flowchart showing the overall process of image decoding by an image decoding apparatus according to Embodiment 2.

FIG. 30 is a flowchart showing the overall process of image decoding by image decoding apparatus 200.

First, intra compensator 205 determines whether or not the timing of a current block to be decoded is NN intra prediction parameter switch timing (S221). Subsequently, when the timing of the current block is the NN intra prediction parameter switch timing, intra compensator 205 obtains the NN intra prediction parameter included in the bitstream and sets the NN intra prediction parameter for NN intra compensator 205a (S222). Likewise, inter compensator 206 determines whether or not the timing of the current block is NN inter prediction parameter switch timing (S223). Subsequently, when the timing of the current block is the NN inter prediction parameter switch timing, intra compensator 206 obtains the NN inter prediction parameter included in the bitstream and sets the NN inter prediction parameter for NN inter compensator 206a (S224). Likewise, in-loop filter 208 determines whether or not the timing of the current block is NN in-loop filter parameter switch timing (S225). Subsequently, when the timing of the current block is the NN in-loop filter parameter switch timing, in-loop filter 208 obtains the NN in-loop filter parameter included in the bitstream and sets the NN in-loop filter parameter for NN in-loop filter 208a (S226). Next, image decoding apparatus 200 decodes the current block (S227) and repeats the processing in Steps S221 to S227 until decoding of all the blocks in a current image to be decoded is completed (S228).

Note that the parameter switch timing such as the NN intra prediction parameter switch timing mentioned above is timing at which a block included in a new unit of NN parameter switching different from the unit of NN parameter switching including an immediately previously decoded block is decoded as the current block.

<Operation (Flow of Decoding Block)>

Figure 31:
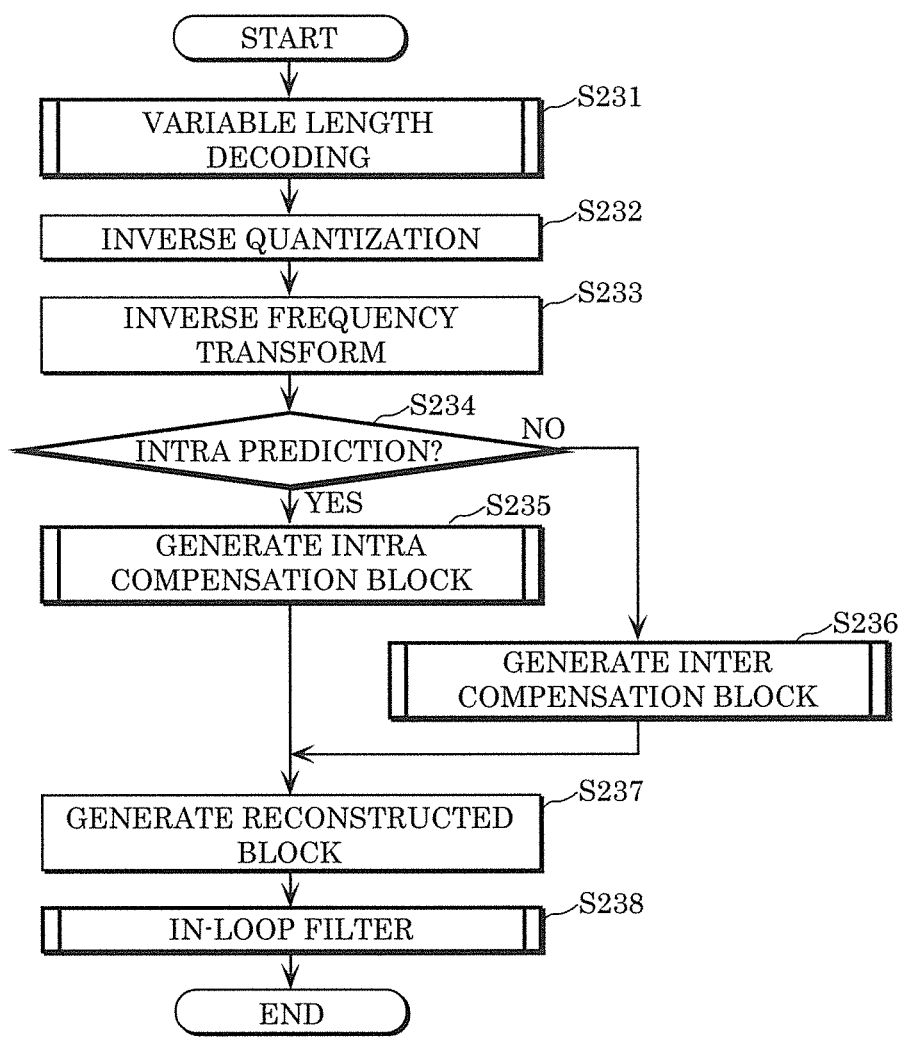
FIG. 31 is a flowchart showing the details of decoding a block in Step S227 in FIG. 30.

FIG. 31 is a flowchart showing the details of decoding a block in Step S227 in FIG. 30.

First, variable-length decoder 201 obtains the frequency-transformed and quantized block by variable-decoding the bitstream (S231).

Next, inverse quantizer 202 performs inverse quantization on the obtained block (S232), and inverse transformer 203 performs inverse frequency transformation on the block on which the inverse quantization has been performed (S233).

Next, image decoding apparatus 200 determines, from the information included in the bitstream, which of the intra prediction and the inter prediction has been used to encode the current block (S234). When the intra prediction has been used, intra compensator 205 generates an intra compensation block (S235), and when the inter prediction has been used, inter compensator 206 generates an inter compensation block (S236).

Next, adder 204 generates a reconstructed block by adding one of the intra compensation block and the inter compensation block to the result of the inverse frequency transformation (S237). In-loop filter 208 performs an in-loop filter on the reconstructed block, stores the reconstructed block into frame memory 207, and outputs an image (S238).

<Operation (Flow of Generating Intra Compensation Block)>

Figure 32:
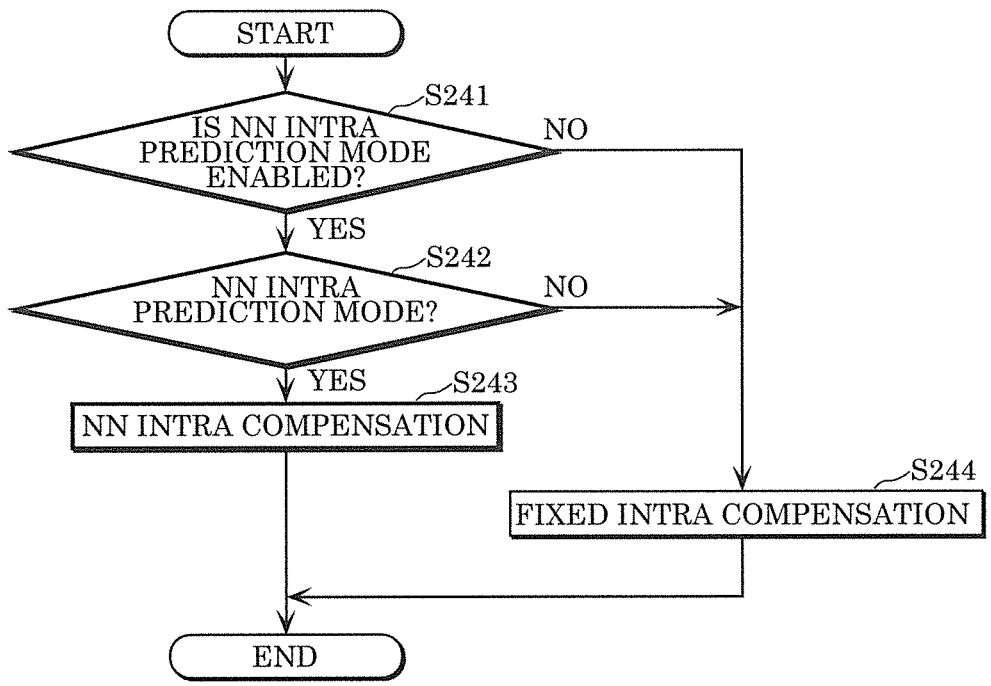
FIG. 32 is a flowchart showing the details of generating an intra compensation block in Step S235 in FIG. 31.

FIG. 32 is a flowchart showing the details of generating the intra compensation block in Step S235 in FIG. 31.

First, intra compensator 205 determines, using the information included in the bitstream, whether the NN intra prediction mode is enabled or disabled and whether or not the NN intra prediction mode has been used in the encoding process (S241, S242). When the NN intra prediction mode is enabled and the NN intra prediction mode has been used in the encoding process, NN intra compensator 205a generates an intra compensation block by performing NN intra compensation (S243). Otherwise, fixed intra compensator 205b generates an intra compensation block by performing the fixed intra compensation (S244).

As in Embodiment 1, the reference pixels in FIG. 10 and the neural network in FIG. 13 are used in the generation of the NN intra compensation block. The parameter used in the NN intra compensation is that included in the bitstream and set in Step S222 in FIG. 30. The syntax has the structure shown in FIG. 15 to FIG. 26, as in Embodiment 1. NN intra compensator 205a obtains and uses, as the parameters to be used in the NN intra compensation, parameters (the number of layers, the number of nodes, the weighting factor, and the bias value) that are specified by pps_nps_id or slice_nps_id and included in the bitstream of nn_parameter_set_rbsp( ) having nps_id that matches pps_nps_id or slice_nps_id. The parameters are present in each mode of the NN intra prediction, and NN intra compensator 205a switches the parameter using the NN intra prediction mode (nn_intra_pred_mode) included in the bitstream.

<Operation (Flow of Generating Inter Compensation Block)>

Figure 33:
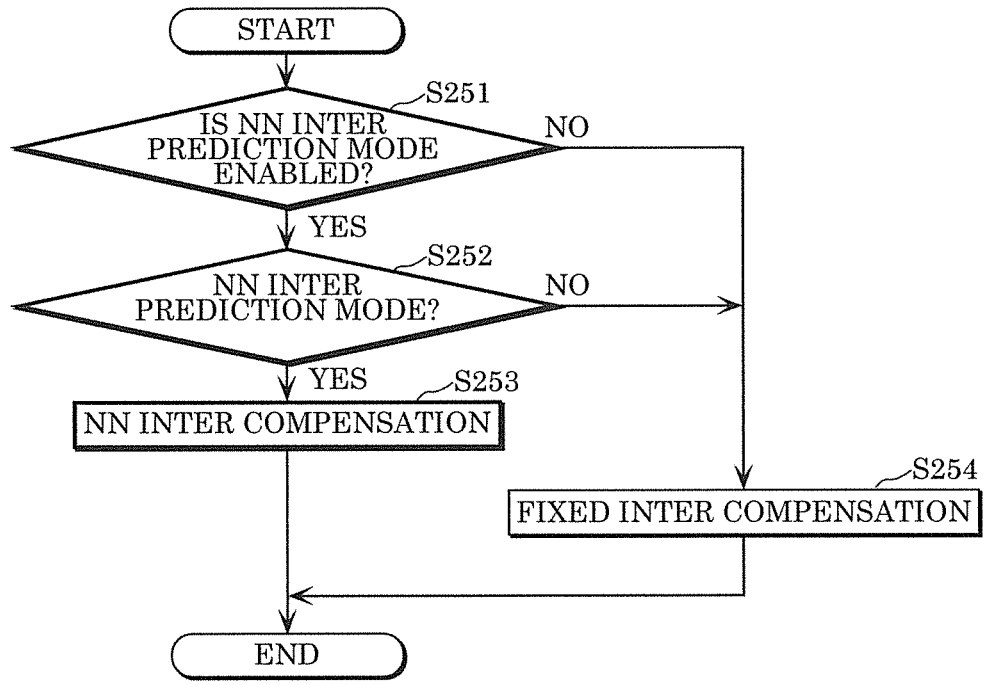
FIG. 33 is a flowchart showing the details of generating an inter compensation block in Step S236 in FIG. 31.

FIG. 33 is a flowchart showing the details of generating the inter compensation block in Step S236 in FIG. 31. Steps S251 to S254 in this flowchart in FIG. 33 are substantially the same as Steps S241 to S244 in the flowchart for generating the intra compensation block in FIG. 32; it is only necessary to replace the NN intra prediction and the fixed intra prediction by the NN inter prediction and the fixed inter prediction, and thus description thereof will be omitted.

As in Embodiment 1, the reference pixels in FIG. 11 and the neural network in FIG. 14 are used in the generation of the NN inter compensation block. The parameter used in the NN inter compensation is that included in the bitstream and set in Step S224 in FIG. 30. The syntax has the structure shown in FIG. 15 to FIG. 26, as in Embodiment 1. NN inter compensator 206a obtains and uses, as the parameters to be used in the NN inter compensation, parameters (the number of layers, the number of nodes, the weighting factor, and the bias value) that are specified by pps_nps_id or slice_nps_id and included in the bitstream of nn_parameter_set_rbsp( ) having nps_id that matches pps_nps_id or slice_nps_id. The parameters are present in each mode of the NN inter prediction, and NN inter compensator 206a switches the parameter using the NN inter prediction mode (nn_intra_pred_mode) included in the bitstream.

<Operation (In-Loop Filter Flow)>

Figure 34:
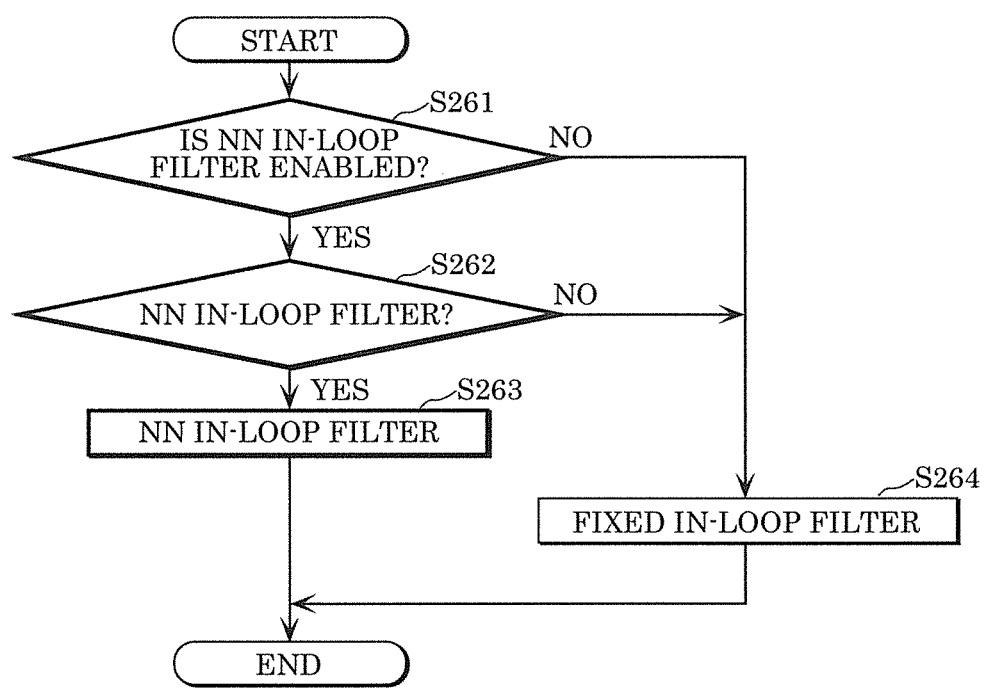
FIG. 34 is a flowchart showing the details of an in-loop filter in Step S238 in FIG. 31.

FIG. 34 is a flowchart showing the details of the in-loop filter in Step S238 in FIG. 31. Steps S261 to S264 in this flowchart in FIG. 34 are substantially the same as Steps S241 to S244 in the flowchart for generating the intra compensation block in FIG. 32; it is only necessary to replace the NN intra prediction and the fixed intra prediction by the NN in-loop filter and the fixed in-loop filter, and thus description thereof will be omitted.

As in Embodiment 1, the reference pixels in FIG. 12 and the neural network in FIG. 14 are used in the NN in-loop filter. The parameter used in the NN in-loop filter is that included in the bitstream and set in Step S226 in FIG. 30. The syntax has the structure shown in FIG. 15 to FIG. 26, as in Embodiment 1. NN in-loop filter 208a obtains and uses, as the parameters to be used in the NN in-loop filter, parameters (the number of layers, the number of nodes, the weighting factor, and the bias value) that are specified by pps_nps_id or slice_nps_id and included in the bitstream of nn_parameter_set_rbsp( ) having nps_id that matches pps_nps_id or slice_nps_id. The parameters are present in each mode of the NN in-loop filter, and NN in-loop filter 208a switches the parameter using an NN in-loop filter mode (nn_ilf_mode) included in the bitstream.

Advantageous Effects

Effects are similar to those in Embodiment 1, and thus description thereof will be omitted.

Summary of Embodiments 1 and 2

As an image encoding or decoding method according to the first aspect (1) of the present disclosure, an operation parameter of a non-linear filter is encoded or decoded, and a current image is encoded or decoded using the operation parameter. Note that this non-linear filter is a filter other than a linear filter that is a weighted sum of the plurality of pixel values.

Furthermore, as the method according to the second aspect (1-1) of the present disclosure, in the method according to the first aspect, the non-linear filter may be used in at least one of the intra prediction, the inter prediction, and the in-loop filter.

Furthermore, as the method according to the third aspect (1-2) of the present disclosure, in the method according to the first aspect, the non-linear filter may be configured to include a neural network, and at least a weighting factor between nodes may be encoded or decoded as the operation parameter.

Furthermore, as the method according to the fourth aspect (1-2-1) of the present disclosure, in the method according to the third aspect, the operation parameter to be encoded or decoded may include information of the number of layers or the number of nodes.

Furthermore, as the method according to the fifth aspect (1-2-1-1) of the present disclosure, in the method according to the fourth aspect, the maximum number of layers or the maximum number of nodes may be defined according to a profile.

Furthermore, as the method according to the sixth aspect (1-3) of the present disclosure, in the method according to the first aspect, switch information indicating which filter may be used among a linear filter having the fixed parameter and the non-linear filter may be encoded or decoded, and the use of the filter may be switched between the linear filter and the non-linear filter according to the switch information.

Furthermore, as the method according to the seventh aspect (1-3-1) of the present disclosure, in the method according to the sixth aspect, one or more modes among a plurality of modes may be set as a mode in which the non-linear filter is used, and a current image may be encoded or decoded using the non-linear filter when said mode is used.

Furthermore, as the method according to the eighth aspect (1-4) of the present disclosure, in the method according to the first aspect, the operation parameter of the non-linear filter may be switched at at least one of a block, a slice, a tile, a picture, and a group of pictures (GOP).

Furthermore, as the method according to the ninth aspect (1-4-1) of the present disclosure, in the method according to the eighth aspect, the operation parameter of the non-linear filter may be encoded or decoded at at least one of a leading sequence, a leading group of pictures (GOP), and a leading picture, and at least one of the operation parameters may be specified by an identifier and used when the non-linear filter is used.

Furthermore, as the method according to the tenth aspect (1-5) of the present disclosure, in the method according to the first aspect, enabled/disabled information of the non-linear filter may be encoded or decoded.

Furthermore, as the method according to the eleventh aspect (1-5-1) of the present disclosure, in the method according to the tenth aspect, the enabled/disabled information of the non-linear filter may be switched according to a profile.

Furthermore, as the method according to the twelfth aspect (1-5-1) of the present disclosure, in the method according to the tenth aspect, the non-linear filter may be disabled in an application with a request for low delay.

Furthermore, as the method according to the thirteenth aspect (1-6) of the present disclosure, in the method according to the first aspect, a plurality of modes of the non-linear filter may be provided, and information indicating which mode is used may be encoded or decoded, or information indicating which mode is used may be extracted from information included in a bitstream.

Here, as an image encoding or decoding method according to the fourteenth aspect (2) of the present disclosure, an operation parameter to be used in intra prediction is encoded or decoded.

Furthermore, as the method according to the fifteenth aspect (2-1) of the present disclosure, in the method according to the fourteenth aspect, the operation parameter may be an operation parameter for one of a linear filter and a non-linear filter.

Furthermore, as the method according to the sixteenth aspect (2-2) of the present disclosure, in the method according to the fourteenth aspect, intra prediction using the operation parameter may be configured to include a neural network having a single layer or two or more layers, and at least a weighting factor between nodes may be encoded or decoded as the operation parameter.

Furthermore, as the method according to the seventeenth aspect (2-2-1) of the present disclosure, in the method according to the sixteenth aspect, the operation parameter to be encoded or decoded may include information of the number of layers or the number of nodes.

Furthermore, as the method according to the eighteenth aspect (2-2-1-1) of the present disclosure, in the method according to the seventeenth aspect, the maximum number of layers or the maximum number of nodes may be defined according to a profile.

Furthermore, as the method according to the nineteenth aspect (2-3) of the present disclosure, in the method according to the fourteenth aspect, switch information indicating which intra prediction is used among intra prediction using a fixed parameter and intra prediction using the operation parameter may be encoded or decoded, and the use of the intra prediction may be switched between the intra prediction using the fixed parameter and the intra prediction using the operation parameter according to the switch information.

Furthermore, as the method according to the twentieth aspect (2-3-1) of the present disclosure, in the method according to the nineteenth aspect, one or more modes among a plurality of modes are set as a mode of the intra prediction using the operation parameter, and a current image may be encoded or decoded through the intra prediction using the operation parameter when said mode is used.

Furthermore, as the method according to the twenty-first aspect (2-4) of the present disclosure, in the method according to the fourteenth aspect, the operation parameter in the intra prediction may be switched at at least one of a block, a slice, a tile, a picture, and a group of pictures (GOP).

Furthermore, as the method according to the twenty-second aspect (2-4-1) of the present disclosure, in the method according to the twenty-first aspect, the operation parameter in the intra prediction may be encoded or decoded at at least one of a leading sequence, a leading group of pictures (GOP), and a leading picture, and at least one of the operation parameters encoded or decoded may be specified by an identifier and used upon the intra prediction using the operation parameter.

Furthermore, as the method according to the twenty-third aspect (2-5) of the present disclosure, in the method according to the fourteenth aspect, enabled/disabled information of the intra prediction using the operation parameter may be encoded or decoded.

Furthermore, as the method according to the twenty-fourth aspect (2-5-1) of the present disclosure, in the method according to the twenty-third aspect, the enabled/disabled information of the intra prediction using the operation parameter may be switched according to a profile.

Furthermore, as the method according to the twenty-fifth aspect (2-5-2) of the present disclosure, in the method according to the twenty-third aspect, the intra prediction using the operation parameter may be disabled in an application with a request for low delay.

Furthermore, as the method according to the twenty-sixth aspect (2-6) of the present disclosure, in the method according to the fourteenth aspect, a plurality of modes of the intra prediction using the operation parameter may be provided, and information indicating which mode is used may be encoded or decoded, or information indicating which mode is used may be extracted from information included in a bitstream.

Here, as an image encoding method according to the twenty-seventh aspect (3) of the present disclosure, an operation parameter of a linear filter or a non-linear filter is encoded, and an encoder which encodes a current image using the operation parameter learns, as training data, a current image to be encoded, and determines the operation parameter.

Furthermore, as the image encoding method according to the twenty-eighth aspect (3-1) of the present disclosure, in the image encoding method according to the twenty-seventh aspect, a plurality of modes using the operation parameter may be provided, learning data for each of the modes may be determined based on a feature of a current image or a block to be encoded, and the operation parameter may be determined for each of the modes.

Furthermore, as the image encoding method according to the twenty-ninth aspect (3-2) of the present disclosure, in the method according to the twenty-seventh aspect, only a highly complex region in the current image may be used as the learning data.

Embodiment 3

<Overall Configuration>

Figure 35:
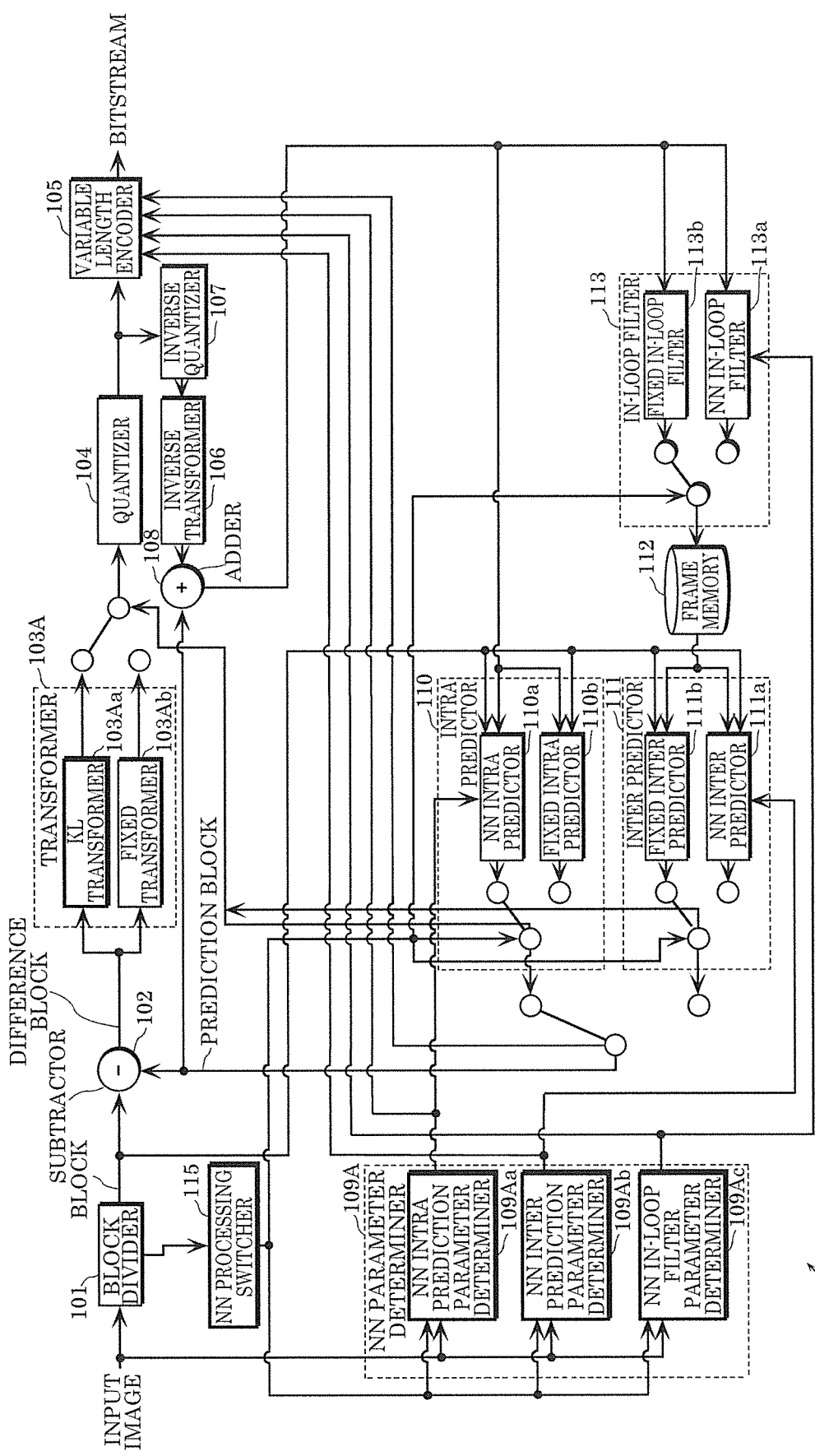
FIG. 35 is a block diagram showing a configuration of an image encoding apparatus according to Embodiment 3.

FIG. 35 is a block diagram showing a configuration of an image encoding apparatus according to the present embodiment.

Image encoding apparatus 300 according to the present embodiment includes the structural elements of image encoding apparatus 100 according to Embodiment 1 except for transformer 103 and NN parameter determiner 109A. In addition, image encoding apparatus 300 includes transformer 103A and NN parameter determiner 109A instead of transformer 103 and NN parameter determiner 109, and includes NN processing switcher 115.

<Operation (as a Whole) and Operation (Flow of Encoding Block)>

The overall flow of encoding an image and the flow of encoding a block by image encoding apparatus 300 are substantially the same as the flow shown in FIG. 2 and the flow shown in FIG. 3 in Embodiment 1, respectively. Note that at the block division (S104) in FIG. 2, block divider 101 in image encoding apparatus 300 divides an input image into a few types of blocks including 4×4, 8×8, 16×16, and 32×32 blocks. Block divider 101 divides the input image into blocks having one of the above sizes using the feature of the input image such as the size of an object therein or complexity of pixel values thereof. Furthermore, image encoding apparatus 300 may experimentally perform prediction or variable-length encoding, and block divider 101 may divide the input image into blocks of a size such that good encoding performance can be obtained. Image encoding apparatus 300 performs the process of encoding a block including prediction on more than one size of block.

<Operation (Flow of Generating Intra Prediction Block)>

Figure 36:
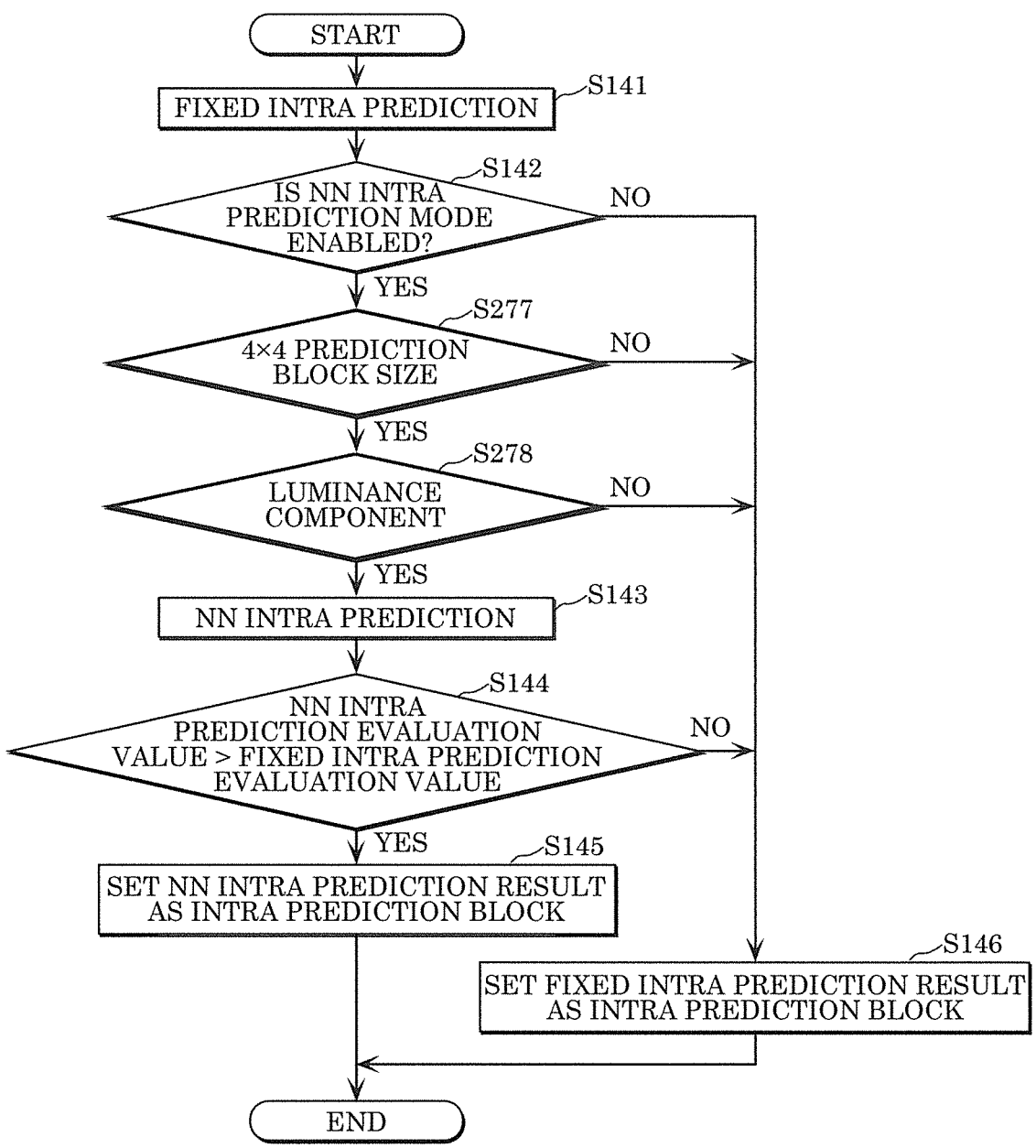
FIG. 36 is a flowchart showing the details of generating an intra prediction block by an intra predictor and an NN processing switcher according to Embodiment 3.

FIG. 36 is a flowchart showing the details of generating an intra prediction block by intra predictor 110 and NN processing switcher 115.

The flow of generating an intra prediction block by intra predictor 110 in Embodiment 3 is substantially the same as the flow shown in FIG. 4 in Embodiment 1, but the present embodiment and Embodiment 1 are different in conditions under which the NN intra prediction (S143) is performed. In Embodiment 3, under control of NN processing switcher 115, intra predictor 110 causes NN intra predictor 110a to perform the NN intra prediction only for luminance components when the prediction block size is 4×4 (S277, S278). Otherwise, intra predictor 110 causes fixed intra predictor 110b to always perform the fixed intra prediction. In this way, NN processing switcher 115 determines whether or not the prediction block size is 4×4 (S277) and determines whether or not a subject to be predicted is a luminance component (S278). Only when the prediction block size is 4×4 and the subject to be predicted is a luminance component, does NN processing switcher 115 instruct intra predictor 110 to switch to the NN intra prediction.

<Operation (Flow of Generating Inter Prediction Block)>

Figure 37:
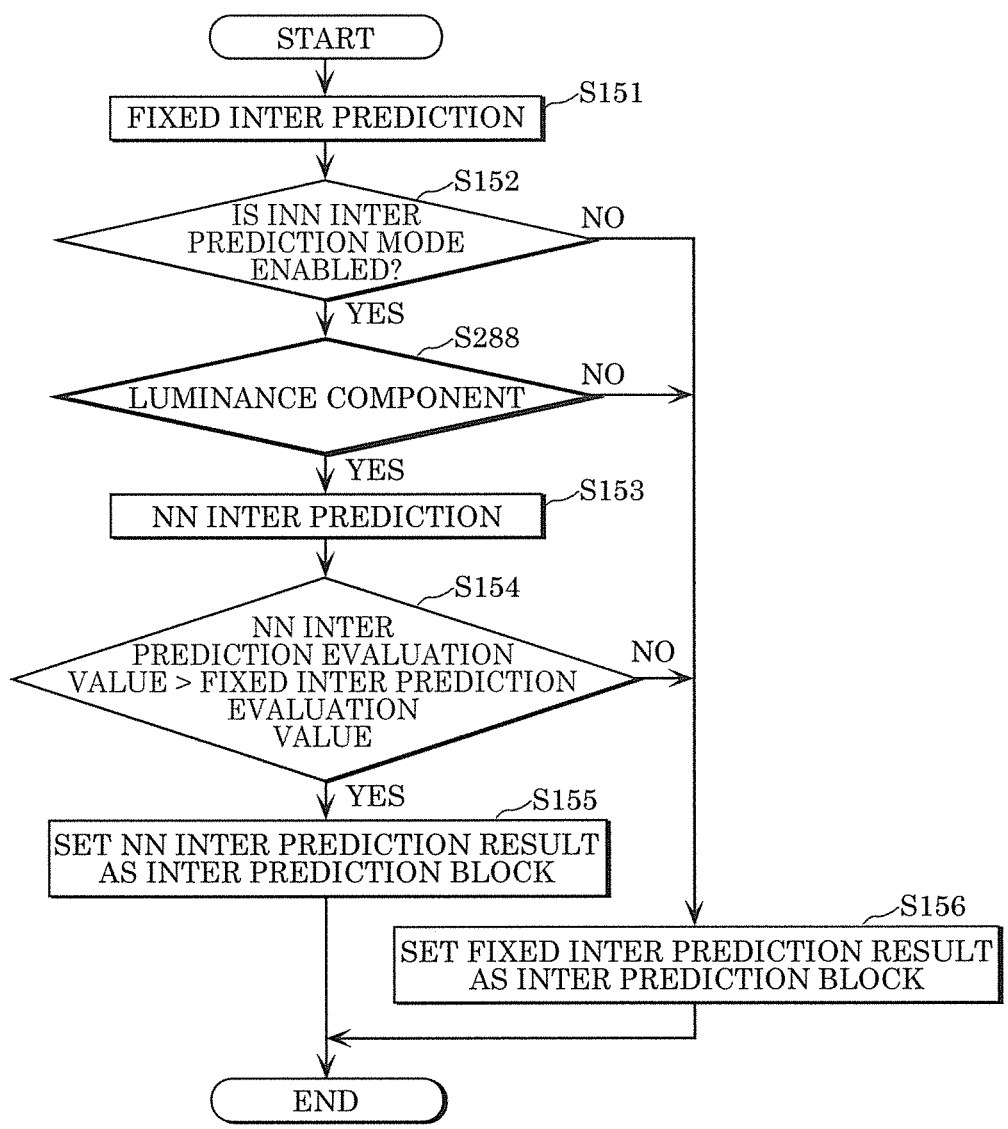
FIG. 37 is a flowchart showing the details of generating an inter prediction block by an inter predictor and an NN processing switcher according to Embodiment 3.

FIG. 37 is a flowchart showing the details of generating an inter prediction block by inter predictor 111 and NN processing switcher 115.

The flow of generating an inter prediction block by inter predictor 111 in Embodiment 3 is substantially the same as the flow shown in FIG. 5 in Embodiment 1, but the present embodiment and Embodiment 1 are different in conditions under which the NN inter prediction (S153) is performed. In Embodiment 3, under control of NN processing switcher 115, inter predictor 111 causes NN inter predictor 111a to perform the NN inter prediction only for luminance components (S288). Otherwise, inter predictor 111 causes fixed inter predictor 111b to always perform the fixed inter prediction.

In this way, NN processing switcher 115 determines whether or not a subject to be predicted is a luminance component (S288). Only when the subject to be predicted is a luminance component, does NN processing switcher 115 instruct inter predictor 111 to switch to the NN inter prediction.

<Operation (In-Loop Filter Flow)>

Figure 38:
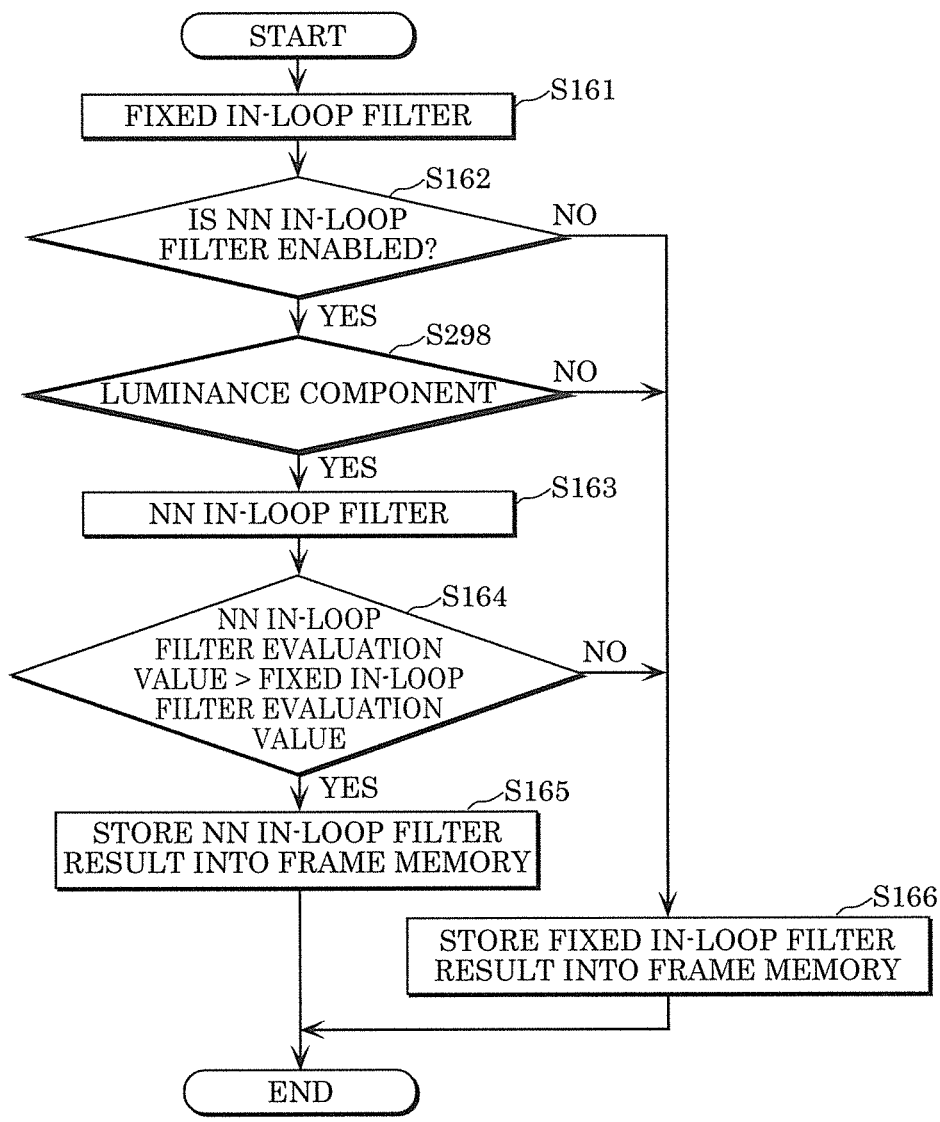
FIG. 38 is a flowchart showing the details of an in-loop filter by an in-loop filter and an NN processing switcher according to Embodiment 3.

FIG. 38 is a flowchart showing the details of an in-loop filter by in-loop filter 113 and NN processing switcher 115.

The flow of an in-loop filter by in-loop filter 113 in Embodiment 3 is substantially the same as the flow shown in FIG. 6 in Embodiment 1, but the present embodiment and Embodiment 1 are different in conditions under which the NN in-loop filter (S163) is performed. In Embodiment 3, under control of NN processing switcher 115, in-loop filter 113 causes NN in-loop filter 113a to perform the NN in-loop filter only as an in-loop filter for luminance components (S298). Otherwise, in-loop filter 113 causes fixed in-loop filter 113b to always perform the fixed in-loop filter.

In this way, NN processing switcher 115 determines whether or not a subject to be predicted is a luminance component (S298). Only when the subject to be predicted is a luminance component, does NN processing switcher 115 instruct in-loop filter 113 to switch to the NN in-loop filter.

<Operation (Flow of Frequency Transformation)>

Figure 39:
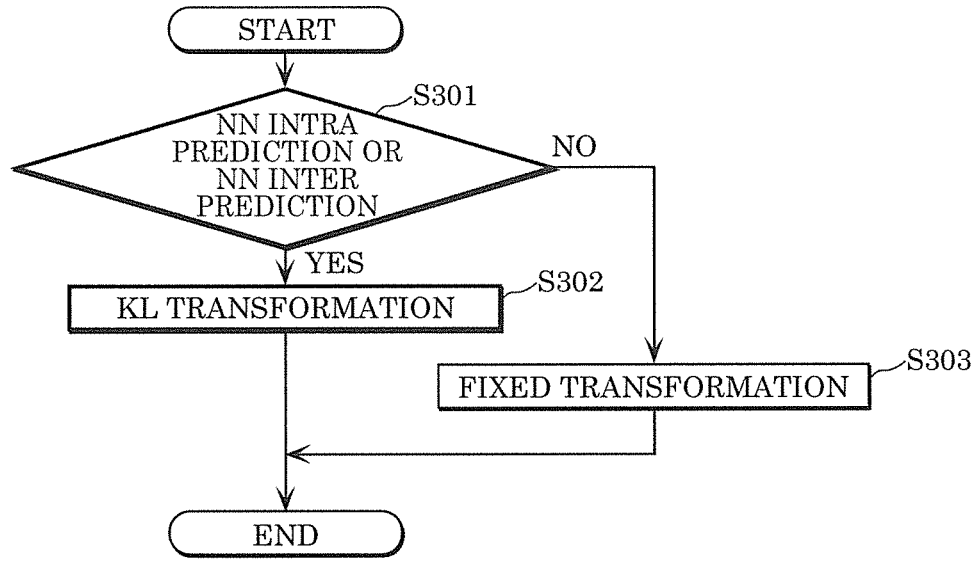
FIG. 39 is a flowchart showing the details of frequency transformation by a transformer according to Embodiment 3.

FIG. 39 is a flowchart showing the details of frequency transformation by transformer 103A.

First, transformer 103A determines whether or not the prediction block selected in the determination of a prediction block (S123 in FIG. 3) is a block generated by the NN intra prediction or the NN inter prediction (S301). When the prediction block is a block generated by one of these predictions, KL transformer 103Aa performs frequency transformation by the Karuhunen-Loéve (KL) transform (S302). Otherwise, fixed transformer 103Ab performs frequency transformation (fixed transformation) using a fixed transformation matrix such as discrete cosine transform as in the HEVC (S303). The KL transform is transformation in which the transformation matrix is changed for each image.

<Operation (Flow of Determining NN Intra Prediction Parameter, Flow of Determining NN Inter Prediction Parameter, and Flow of Determining NN In-Loop Filter Parameter)>

Figure 41:
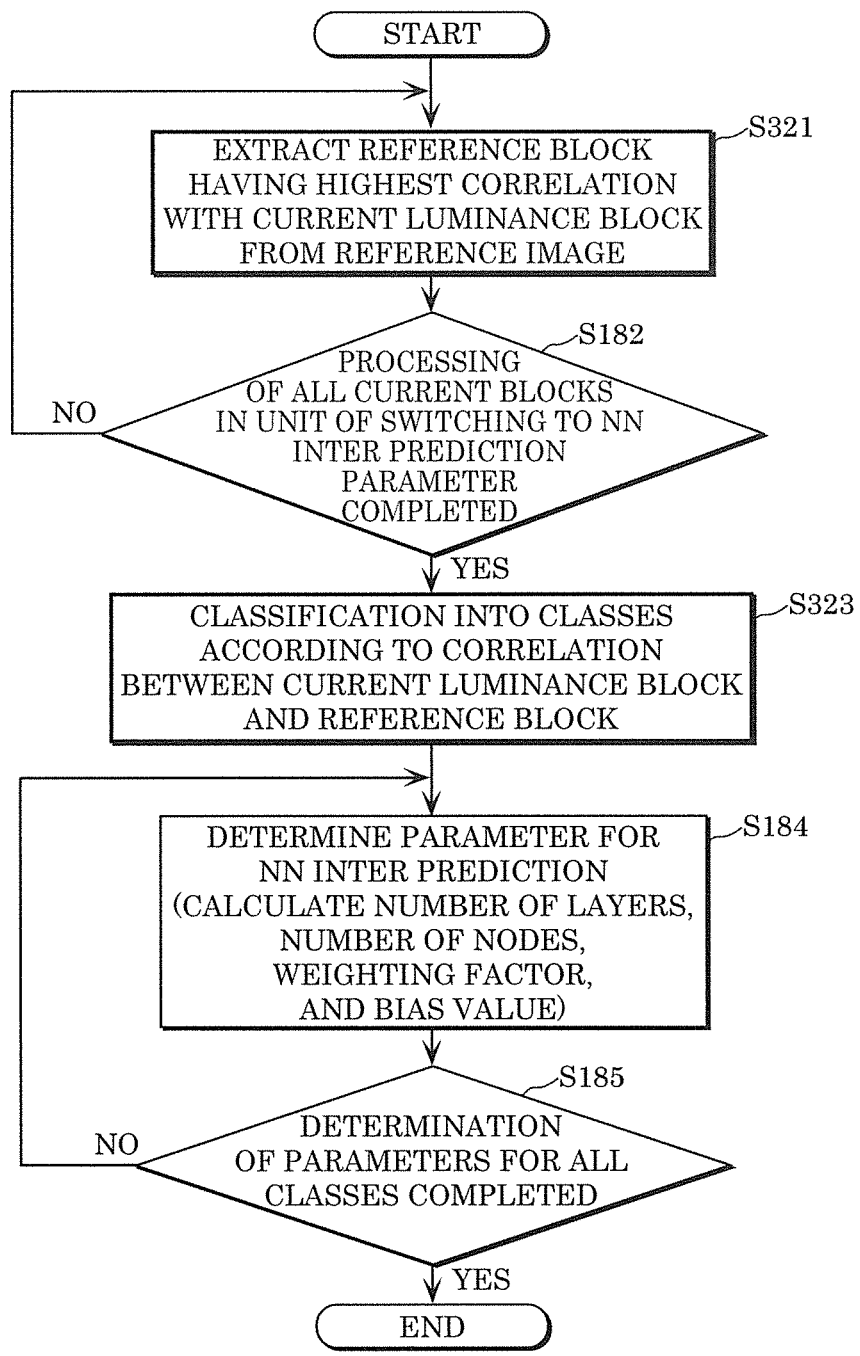
FIG. 41 is a flowchart showing the details of determining an NN inter prediction parameter by an NN inter prediction parameter determiner according to Embodiment 3.
Figure 42:
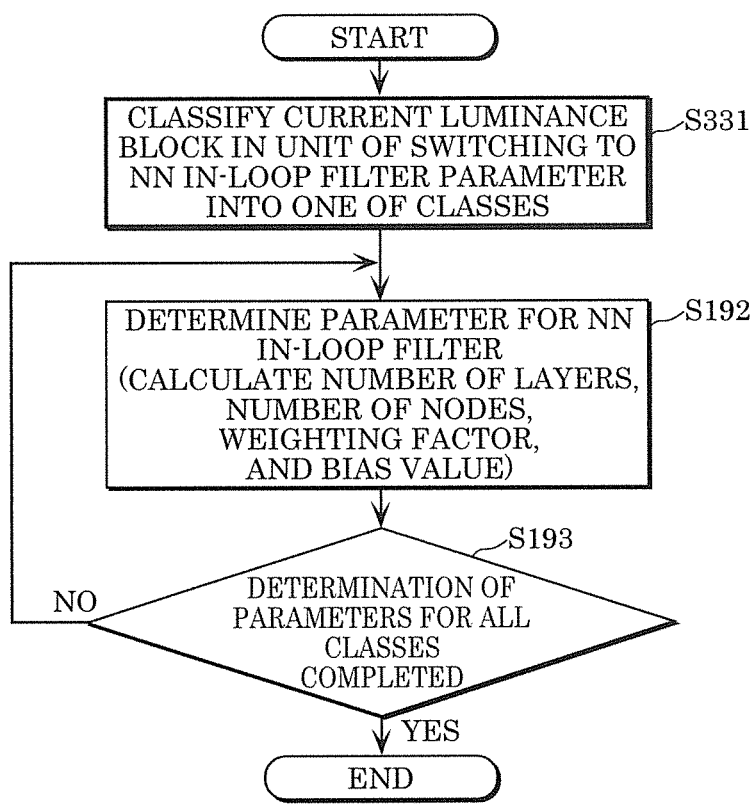
FIG. 42 is a flowchart showing the details of determining an NN in-loop filter parameter by an NN in-loop filter parameter determiner according to Embodiment 3.

The process performed by NN parameter determiner 109A will be described with reference to FIG. 40, FIG. 41, and FIG. 42.

Figure 40:
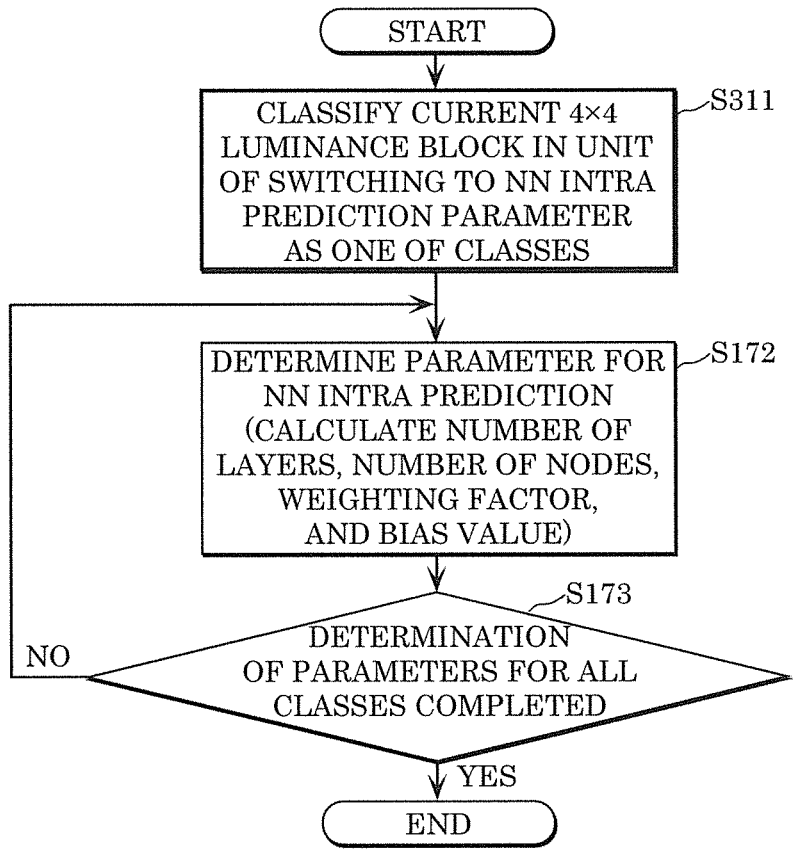
FIG. 40 is a flowchart showing the details of determining an NN intra prediction parameter by an NN intra prediction parameter determiner according to Embodiment 3.

FIG. 40 is a flowchart showing the details of determining an NN intra prediction parameter by NN intra prediction parameter determiner 109Aa. FIG. 41 is a flowchart showing the details of determining an NN inter prediction parameter by NN inter prediction parameter determiner 109Ab. FIG. 42 is a flowchart showing the details of determining an NN in-loop filter parameter by NN in-loop filter parameter determiner 109Ac.

The flows of determining the abovementioned parameters in Embodiment 3 are substantially the same as the flows in Embodiment 1 which are shown in FIG. 7, FIG. 8, and FIG. 9, but the present embodiment and Embodiment 1 are different in data used as the learning data. As shown in FIG. 40, NN intra prediction parameter determiner 109Aa classifies the 4×4 current block of luminance components as one of the classes and learns using the result as learning data to be used to determine the NN intra prediction parameter (S311). Furthermore, as shown in FIG. 41, NN inter prediction parameter determiner 109Ab uses the current block of luminance components as learning data to be used to determine the NN inter prediction parameter (S321, S323). Moreover, NN in-loop filter parameter determiner 109Ac uses the current block of luminance components as learning data to be used to determine the NN in-loop filter parameter (S331).

<Syntax Structure>

The syntax structure in Embodiment 3 is different from that in Embodiment 1 only in the syntax of the CU.

FIG. 43 shows the syntax of the CU in the present embodiment.

In Embodiment 3, variable-length encoder 105 encodes information (intra_pred_type) indicating which of the NN intra prediction and the fixed intra prediction is used only when the NN intra prediction is enabled (nn_intra_pred_enabled_flag is 1) and the prediction block size is 4×4. Otherwise, image encoding apparatus 300 operates to use the fixed intra prediction. In other words, the NN intra prediction is not allowed to be used unless the prediction block size is 4×4. Note that fixed_intra_pred_mode_chroma represents a prediction mode of the fixed intra prediction for chrominance components, and only a mode of the fixed intra prediction is allowed to be used for the chrominance components.

Furthermore, nn_intra_pred_parameter_data( ) is a parameter for the NN intra prediction for luminance components in which the size of the prediction block is 4×4, and other parameters (for prediction for chrominance components or prediction in which the size of the prediction block is 8×8) are not present (not encoded).

Furthermore, nn_inter_pred_parameter_data( ) is a parameter for the NN inter prediction for luminance components, nn_ilf_parameter_data( ) is a parameter for the NN in-loop filter for luminance components, and parameters for chrominance components are not present (not encoded).

Advantageous Effects

As described above, according to the present embodiment, the amount of code for the parameter to be used in the NN intra prediction can be reduced. More specifically, the NN intra prediction is performed only for the prediction block of a 4×4 size. In other words, the NN intra prediction is not used for the prediction block of a size greater than or equal to 8×8, and thus parameters for such a block are no longer needed. Generally, a large prediction block size is often selected for a flat region, and in that case, it is often possible to reduce prediction residuals even in the intra prediction using the fixed parameter. Therefore, when the prediction block size is large, there is less need to use the NN intra prediction than when the prediction block size is small. Furthermore, when the prediction block size is large, there is a large number of neighboring pixels, and thus it is usually hard to increase the accuracy of prediction without increasing the number of reference pixels, and if the number of reference pixels increases, the number of nodes to be input increases, causing an increase in the amount of parameters for the NN intra prediction such as the weighting factor. Conversely, a small prediction block size is often selected for a highly complex region, and in the highly complex region, the prediction error is likely to increase in the intra prediction using the fixed parameter. Furthermore, when the prediction block size is small, there is a small number of neighboring pixels, and thus it may be possible to increase the accuracy of prediction even with a small number of reference pixels. From the above, the NN intra prediction is enabled only when the prediction block size is small so that only parameters for the small prediction block size are encoded, allowing for a reduction in the amount of parameter data while reducing the degradation of the prediction performance; thus, the encoding efficiency can be improved. In addition, since the NN intra prediction for the large prediction block size is no longer needed, the amount of calculation (the processing time) for image encoding apparatus 300 to determine the parameter can also be reduced.

Furthermore, the amount of code for the parameters to be used in the NN intra prediction, the NN inter prediction, and the NN in-loop filter can be reduced. More specifically, the NN intra prediction, the NN inter prediction, and the NN in-loop filter are performed only on signals of luminance components. In other words, the NN intra prediction, the NN inter prediction, and the NN in-loop filter are not used on signals of chrominance components, and thus parameters for such signals are no longer needed. Generally, chrominance components of an image have a low level of complexity, and it is often possible, for example, to reduce prediction residuals and reduce noise even in the intra prediction, the inter prediction, and the in-loop filter that use fixed parameters. Therefore, for the chrominance components, there is less need to use the NN intra prediction, the NN inter prediction, and the NN in-loop filter than for the luminance components. From the above, the NN intra prediction, the NN inter prediction, and the NN in-loop filter are enabled only for the luminance components so that only parameters for the luminance components are encoded, allowing for a reduction in the amount of parameter data while reducing the reduction in the accuracy of prediction and the increase in noise, for example; thus, the encoding efficiency can be improved. In addition, since the NN intra prediction, the NN inter prediction, and the NN in-loop filter for chrominance components are no longer needed, the amount of calculation (the processing time) for image encoding apparatus 300 to determine the parameters can also be reduced.

There is a difference in the tendency of the prediction residual between when the NN intra prediction or the NN inter prediction is used and when the fixed prediction is used. For example, when the fixed intra prediction is used, there is a case where the prediction error increases rapidly when an object not present in the neighboring pixels appears in the current block. In contrast, in the NN intra prediction, when the neural network has been constructed so that such a case can be handled, the prediction error often does not rapidly increase. Therefore, when the NN intra prediction or the NN inter prediction is used, the method for frequency transformation is switched; when the NN prediction is used, a transformation method suitable for a prediction residual thereof is used, and thus the encoding efficiency can be improved.

Note that although the present embodiment uses the KL transform, this is not limiting; it is sufficient that when the NN intra prediction or the NN inter prediction is used, a transformation method different from that applied when the fixed prediction is used be used; for example, it is possible to apply transformation that uses a fixed transformation matrix. Furthermore, when the KL transform is used, for example, a parameter such as the transformation matrix used in that transformation may be additionally encoded. Furthermore, although the present embodiment switches the transformation when the NN intra prediction or the NN inter prediction is used, the transformation may be switched only when the NN intra prediction is used, or may be switched only when the NN inter prediction is used.

Furthermore, the present embodiment uses the NN intra prediction only when the prediction block size is 4×4, this is not limiting; for example, the NN intra prediction may be permitted when the size is less than or equal to 8×8, and the NN intra prediction may be prohibited when the size is greater than or equal to 16×16.

Note that inverse transformer 106 according to the present embodiment performs inverse transformation that corresponds to the transformation of transformer 103A.

Embodiment 4

<Overall Configuration>

Figure 44:
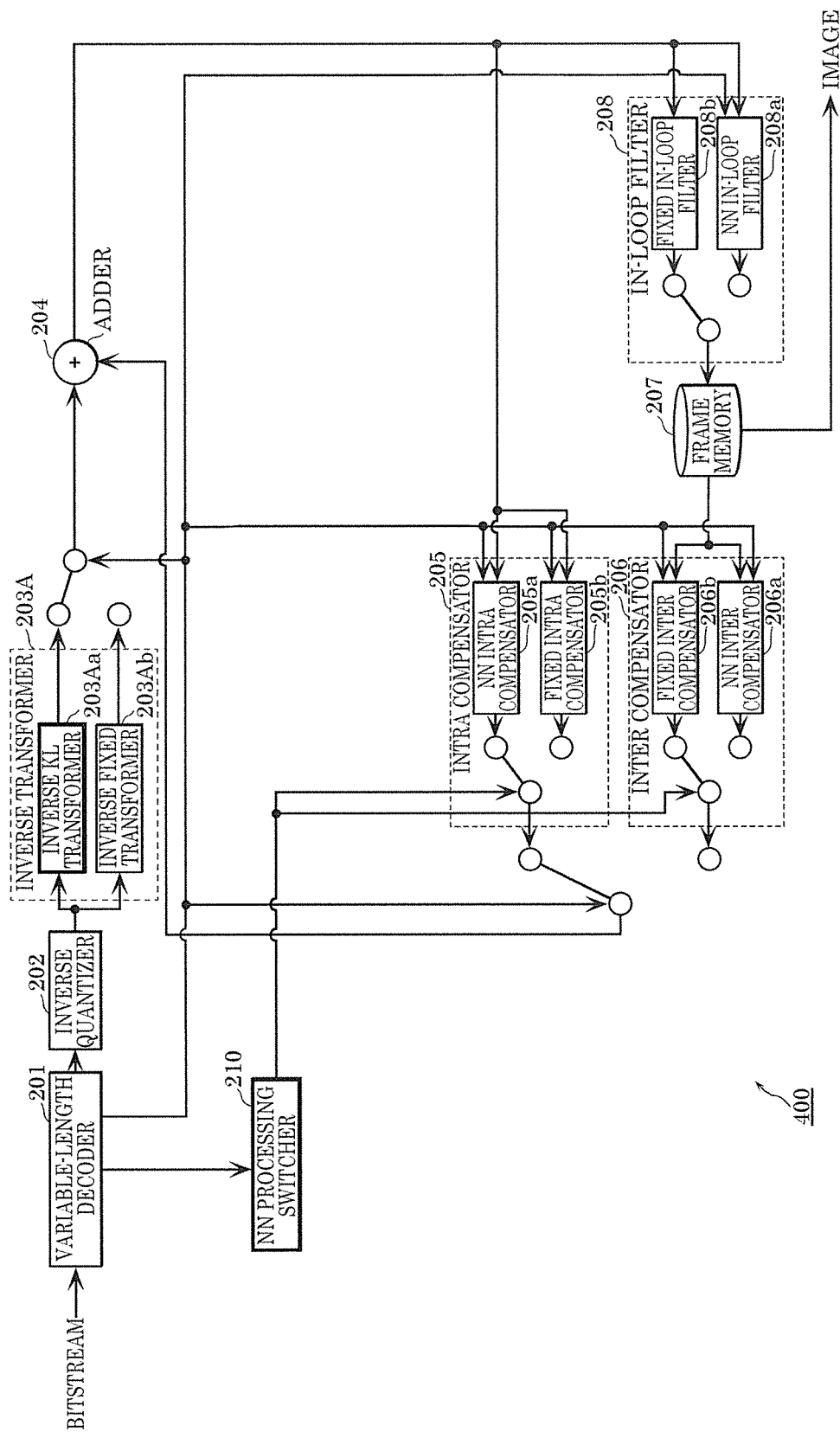
FIG. 44 is a block diagram showing a configuration of an image decoding apparatus according to Embodiment 4.

FIG. 44 is a block diagram showing a configuration of an image decoding apparatus according to the present embodiment.

Image decoding apparatus 400 according to the present embodiment includes the structural elements of image decoding apparatus 200 according to Embodiment 2 except for inverse transformer 203. In addition, image decoding apparatus 400 includes inverse transformer 203A instead of inverse transformer 203, and includes NN processing switcher 210.

<Operation (as a Whole) and Operation (Flow of Decoding Block)>

The overall flow of decoding an image and the flow of decoding a block by image decoding apparatus 400 are substantially the same as the flow shown in FIG. 30 and the flow shown in FIG. 31 in Embodiment 2, respectively. Note that image decoding apparatus 400 supports, as a block to be decoded, a few types of blocks including 4×4, 8×8, 16×16, and 32×32 blocks. Image decoding apparatus 400 determines a block size using information included in the bitstream. Furthermore, image decoding apparatus 400 performs the process of decoding a block including prediction on more than one size of block.

<Operation (Flow of Generating Intra Compensation Block)>

Figure 45:
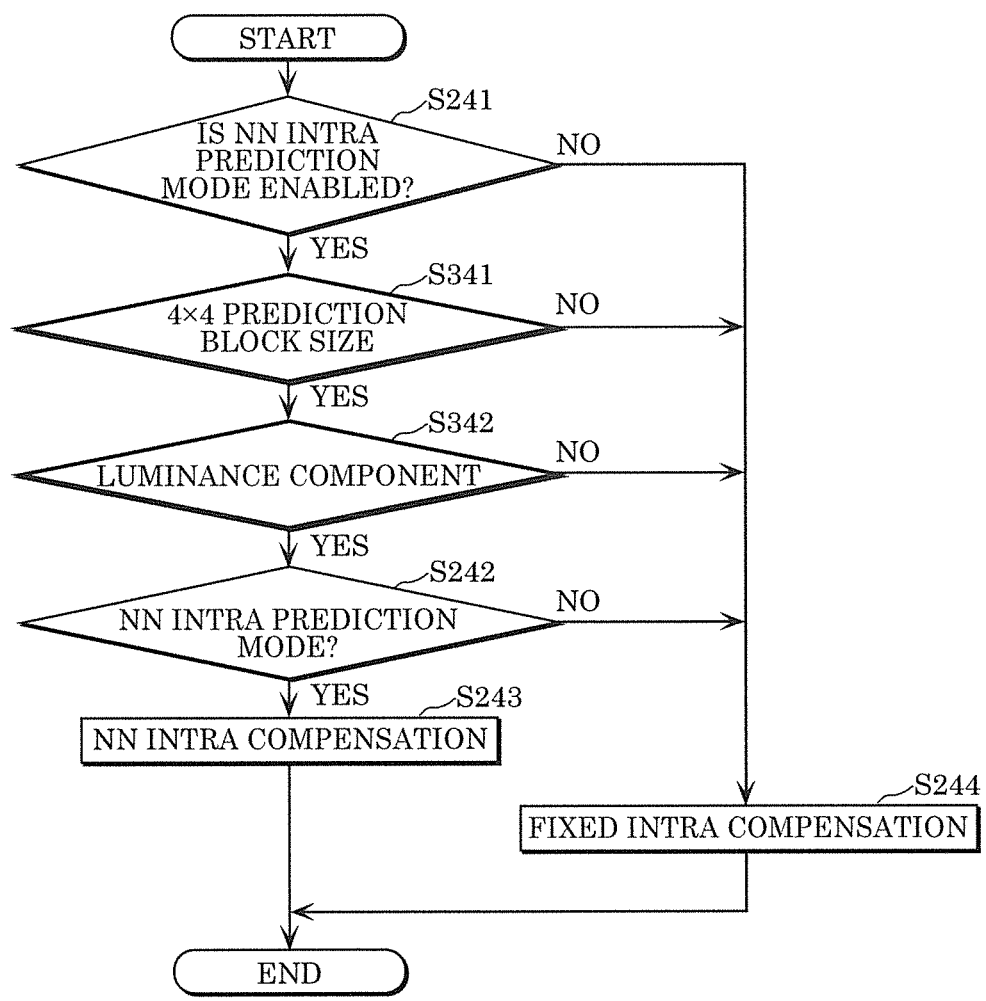
FIG. 45 is a flowchart showing the details of generating an intra compensation block by an intra compensator and an NN processing switcher according to Embodiment 4.

FIG. 45 is a flowchart showing the details of generating an intra compensation block by intra compensator 205 and NN processing switcher 210.

The flow of generating an intra compensation block by intra compensator 205 in Embodiment 4 is substantially the same as the flow shown in FIG. 32 in Embodiment 2, but the present embodiment and Embodiment 2 are different in conditions under which the NN intra compensation (S243) is performed. In Embodiment 4, under control of NN processing switcher 210, intra compensator 205 causes NN intra compensator 205a to perform the NN intra prediction only for luminance components when the prediction block size is 4×4 (S341, S342). Otherwise, intra compensator 205 causes fixed intra compensator 205b to always perform the fixed intra compensation. In this way, NN processing switcher 210 determines whether or not the prediction block size is 4×4 (S341) and determines whether or not a subject to be compensated is a luminance component (S342). Only when the prediction block size is 4×4 and the subject to be compensated is a luminance component, does NN processing switcher 210 instruct intra compensator 205 to switch to the NN intra compensation.

<Operation (Flow of Generating Inter Compensation Block)>

Figure 46:
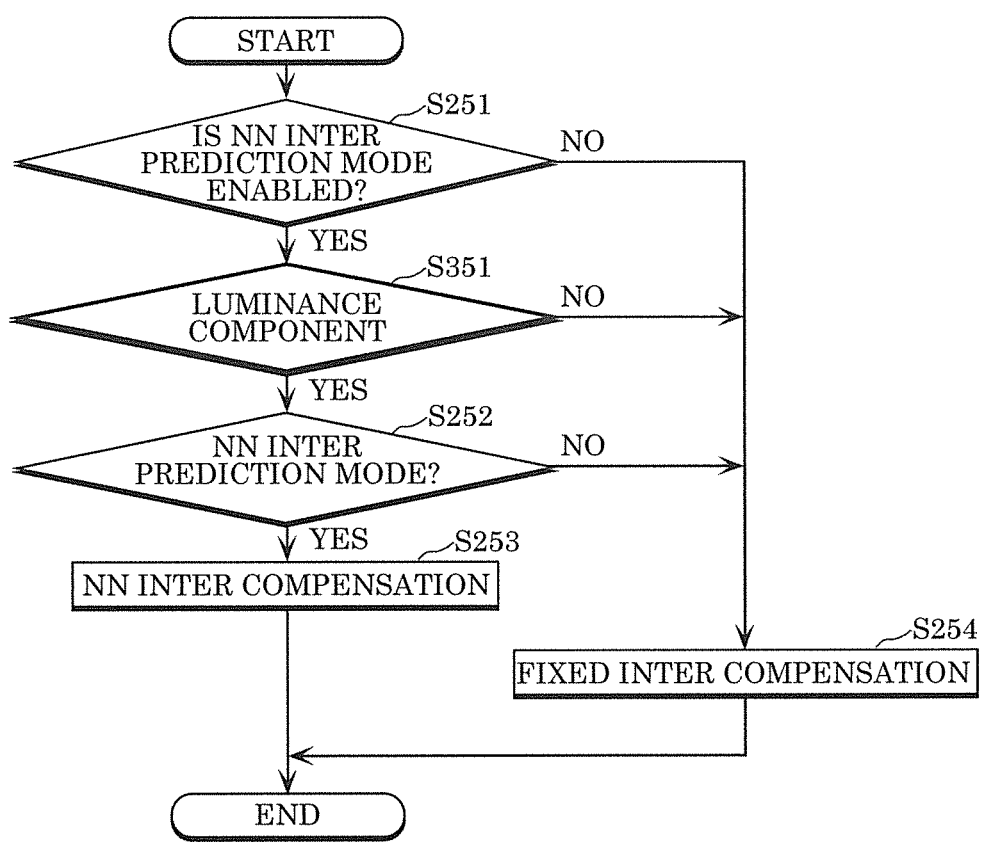
FIG. 46 is a flowchart showing the details of generating an inter compensation block by an inter compensator and an NN processing switcher according to Embodiment 4.

FIG. 46 is a flowchart showing the details of generating an inter compensation block by inter compensator 206 and NN processing switcher 210.

The flow of generating an inter compensation block by inter compensator 206 in Embodiment 4 is substantially the same as the flow shown in FIG. 33 in Embodiment 2, but the present embodiment and Embodiment 2 are different in conditions under which the NN inter compensation (S253) is performed. In Embodiment 4, under control of NN processing switcher 210, inter compensator 206 causes NN inter compensator 206a to perform the NN inter compensation only for luminance components (S351). Otherwise, inter compensator 206 causes fixed inter compensator 206b to always perform the fixed inter compensation. In this way, NN processing switcher 210 determines whether or not a subject to be compensated is a luminance component (S351). Only when the subject to be compensated is a luminance component, does NN processing switcher 210 instruct inter compensator 206 to switch to the NN inter compensation.

<Operation (In-Loop Filter Flow)>

Figure 47:
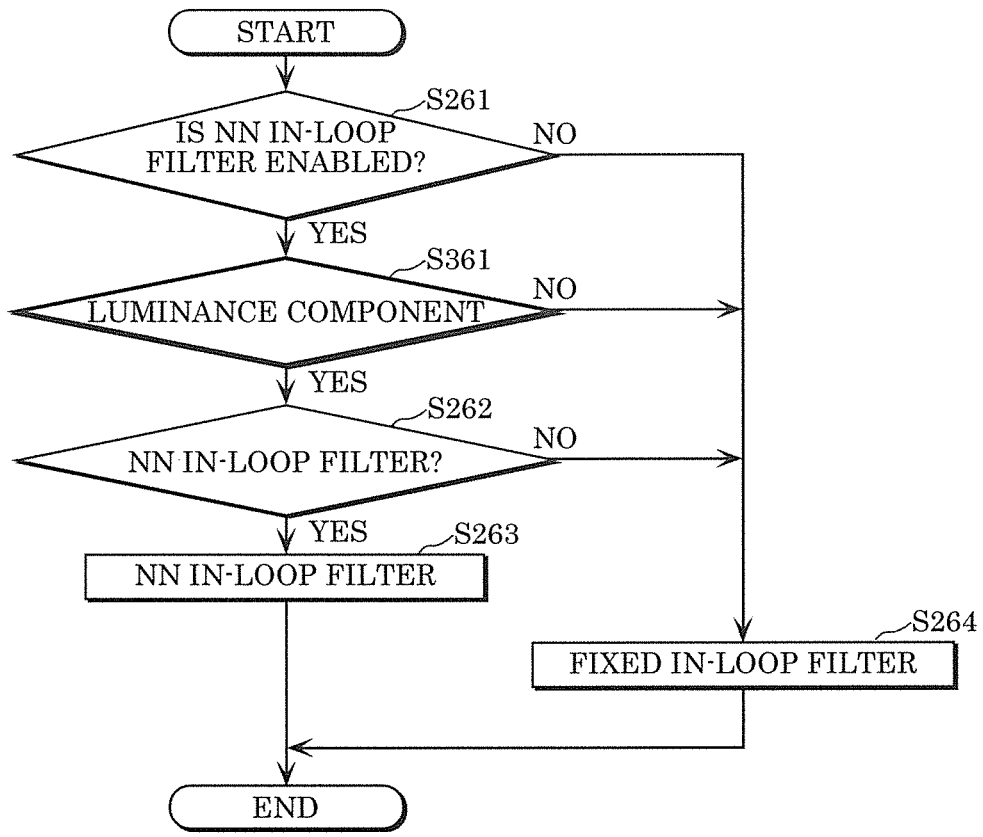
FIG. 47 is a flowchart showing the details of an in-loop filter by an in-loop filter and an NN processing switcher according to Embodiment 4.

FIG. 47 is a flowchart showing the details of an in-loop filter by in-loop filter 208 and NN processing switcher 210.

The flow of an in-loop filter by in-loop filter 208 in Embodiment 4 is substantially the same as the flow shown in FIG. 34 in Embodiment 2; the present embodiment and Embodiment 2 are different in conditions under which the NN in-loop filter (S263) is performed. In Embodiment 4, under control of NN processing switcher 210, in-loop filter 208 causes NN in-loop filter 208a to perform the NN in-loop filter only as an in-loop filter for luminance components (S361). Otherwise, in-loop filter 208 causes fixed in-loop filter 208b to always perform the fixed in-loop filter. In this way, NN processing switcher 210 determines whether or not an in-loop filter subject is a luminance component (S361). Only when the in-loop filter subject is a luminance component, does NN processing switcher 210 instruct in-loop filter 208 to switch to the NN in-loop filter.

<Operation (Flow of Frequency Transformation)>

Figure 48:
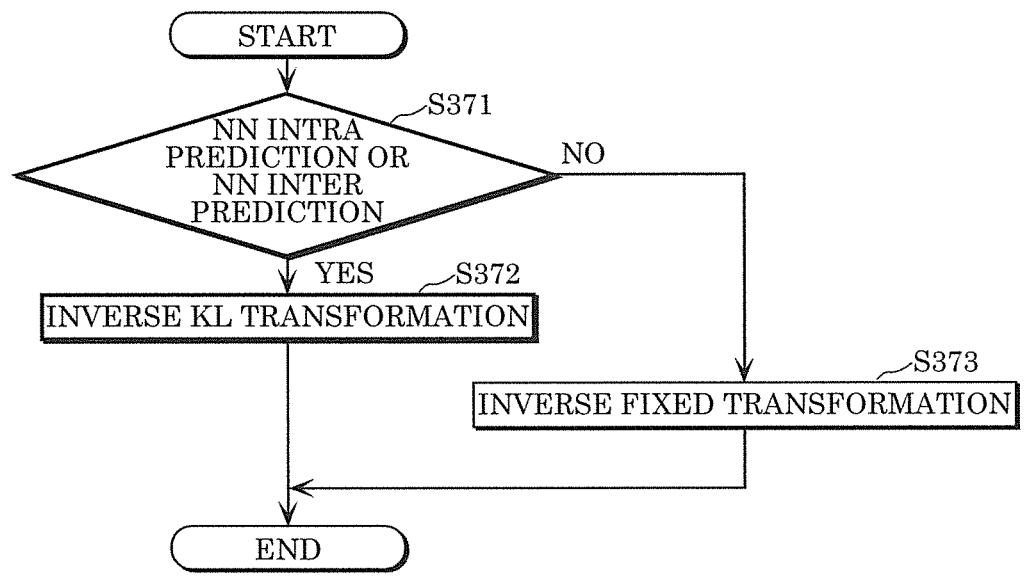
FIG. 48 is a flowchart showing the details of inverse frequency transformation by an inverse transformer according to Embodiment 4.

FIG. 48 is a flowchart showing the details of inverse frequency transformation by inverse transformer 203A.

First, inverse transformer 203A determines, from the information included in the bitstream, whether or not the prediction block is a block generated by the NN intra prediction or the NN inter prediction (S371). When the prediction block is a block generated by one of these predictions, inverse KL transformer 203Aa performs inverse frequency transformation by the inverse Karuhunen-Loeve (KL) transform (S372). Otherwise, inverse fixed transformer 203Ab performs inverse frequency transformation (inverse fixed transformation) using a fixed transformation matrix such as inverse discrete cosine transform as in the HEVC (S373).

Advantageous Effects

Effects are similar to those in Embodiment 3, and thus description thereof will be omitted.

Summary of Embodiments 3 and 4

As an image encoding or decoding method according to the first aspect (1) of the present disclosure, an operation parameter used in intra prediction is encoded or decoded.

Furthermore, as the method according to the second aspect (1-1) of the present disclosure, in the method according to the first aspect, the intra prediction using the operation parameter may be used only when a prediction block size in the intra prediction is less than or equal to a specified size, and intra prediction using a fixed parameter may be performed for other prediction block sizes.

Furthermore, as the method according to the third aspect (1-2) of the present disclosure, in the method according to the first aspect, an encoder or a decoder capable of switching between the intra prediction using the fixed parameter and the intra prediction using the operation parameter may switch a transformation method or an inverse transformation method when the intra prediction using the operation parameter is used.

Furthermore, as the method according to the fourth aspect (1-2-1) of the present disclosure, in the method according to the third aspect, transformation or inverse transformation using a variable transformation matrix may be performed when the intra prediction using the operation parameter is used.

Here, as an image encoding or decoding method according to the fifth aspect (2) of the present disclosure, an operation parameter of a non-linear filter is encoded or decoded, and a current image is encoded or decoded using the operation parameter.

Furthermore, as the method according to the sixth aspect (2-1) of the present disclosure, in the method according to the fifth aspect, only an operation parameter for a luminance component may be encoded or decoded, and the current image may be encoded or decoded using the non-linear filter for the luminance component and using a linear filter for a chrominance component.

Furthermore, as the method according to the seventh aspect (2-2) of the present disclosure, in the method according to the fifth aspect, the non-linear filter may be used in at least one of intra prediction and inter prediction, and a transformation method or an inverse transformation method may be switched when a prediction block is created using the non-linear filter.

Furthermore, as the method according to the eighth aspect (2-2-1) of the present disclosure, in the method according to the seventh aspect, transformation or an inverse transformation using a variable transformation matrix may be performed when the prediction block is created using the non-linear filter.

Embodiment 5

<Overall Configuration>

Figure 49:
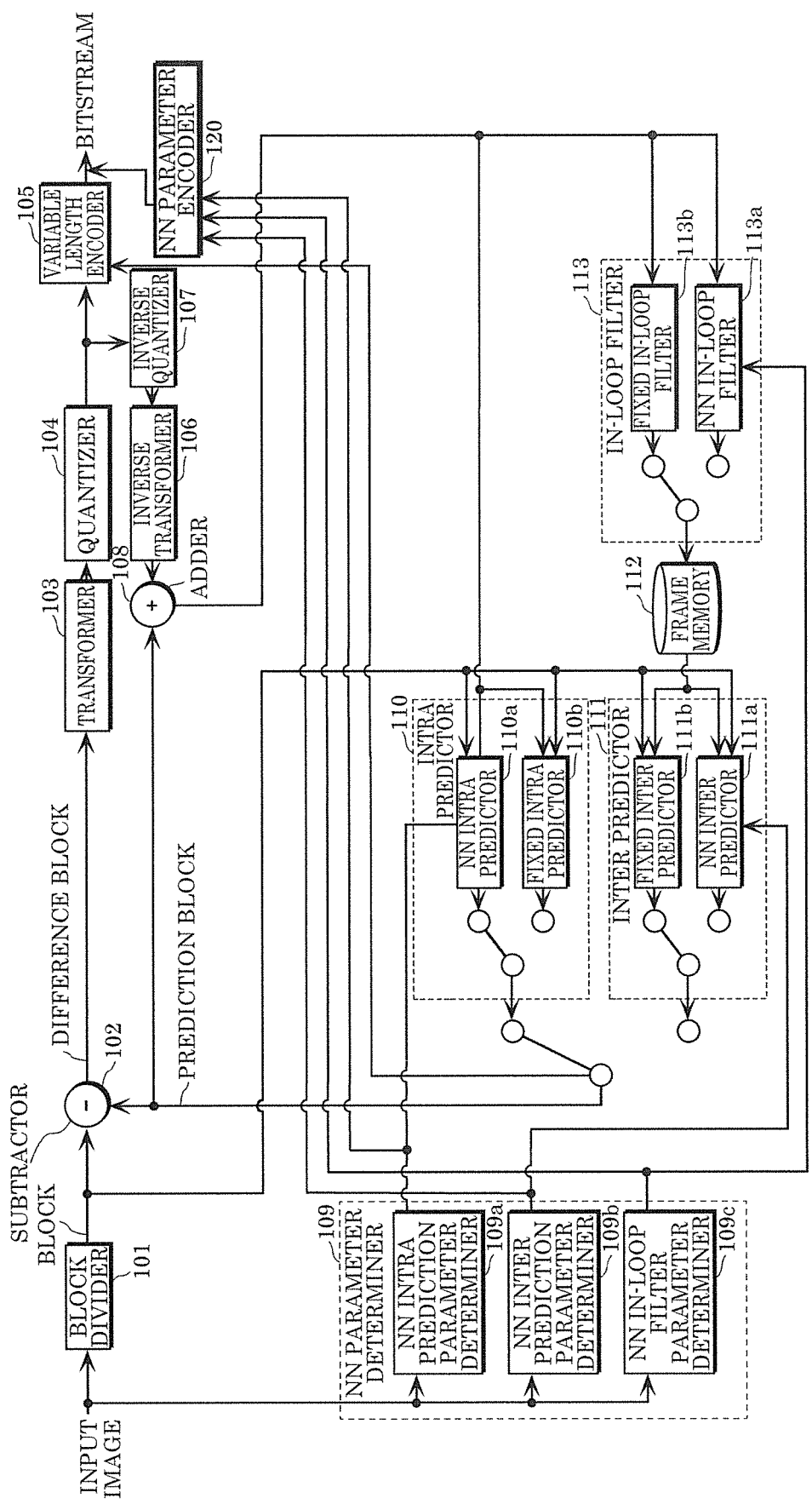
FIG. 49 is a block diagram showing a configuration of an image encoding apparatus according to Embodiment 5.

FIG. 49 is a block diagram showing a configuration of an image encoding apparatus according to the present embodiment.

Image encoding apparatus 500 according to the present embodiment includes the structural elements of image encoding apparatus 100 according to Embodiment 1, and further includes NN parameter encoder 120.

<Operation (as a Whole)>

Figure 59:
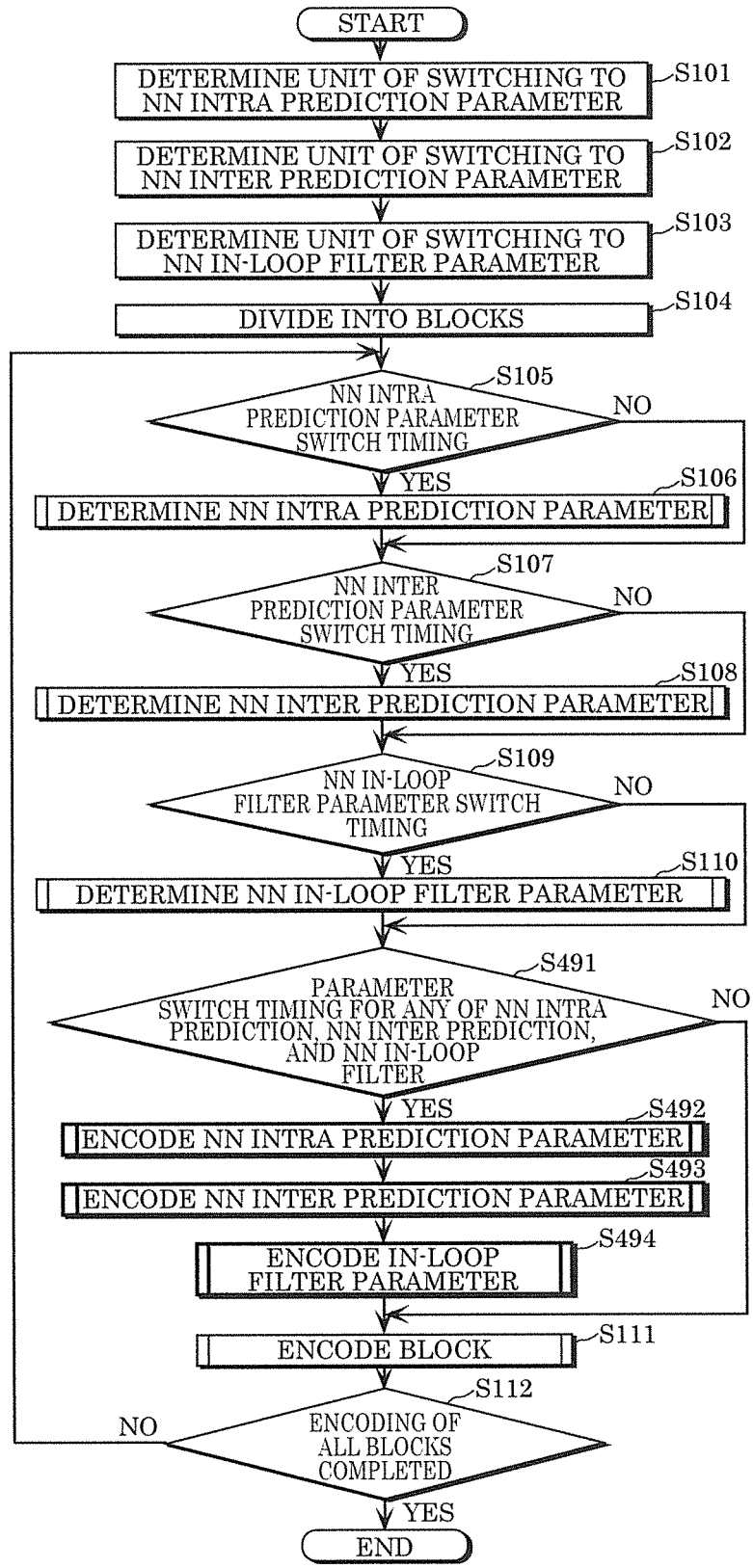
FIG. 59 is a flowchart showing the overall process of image encoding by an image encoding apparatus according to Embodiment 5.

FIG. 59 is a flowchart showing the overall process of image encoding by image encoding apparatus 500.

In Embodiment 5, image encoding apparatus 500 performs Steps S101 to S112 included in the flow shown in FIG. 2 in Embodiment 1, and further performs Steps S491, S492, S493, and S494. Specifically, in Embodiment 5, image encoding apparatus 500 performs one of Steps S492 to S494 at the occasion of parameter switch timing (S491) for any of the NN intra prediction, the NN inter prediction, and the NN in-loop filter. In each of Steps S492 to S494, NN parameter encoder 120 performs a special process of encoding the NN intra prediction parameter, the NN inter prediction parameter, or the NN in-loop filter parameter, which is different from the process performed in Embodiment 1.

<Operation (Flow of Encoding NN Intra Prediction Parameter)>

Figure 50:
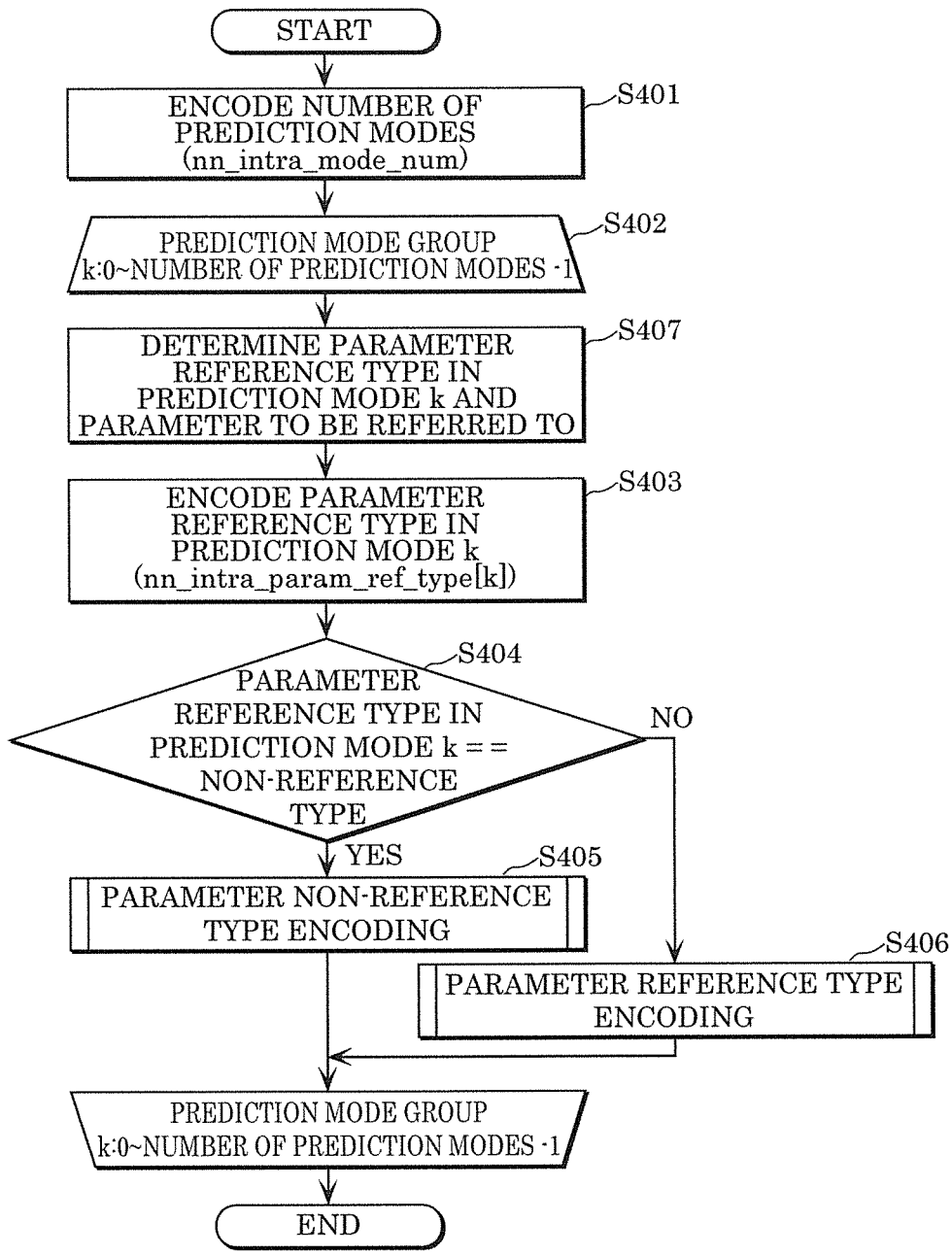
FIG. 50 is a flowchart showing the details of encoding an NN intra prediction parameter in Step S492 in FIG. 59.

FIG. 50 is a flowchart showing the details of encoding the NN intra prediction parameter in Step S492 in FIG. 59.

First, NN parameter encoder 120 encodes the number of prediction modes of the NN intra prediction (nn_intra_mode_num) (S401).

Next, NN parameter encoder 120 performs the processes in Steps S403 to S407 in each of the prediction modes (S402). Here, k represents a current prediction mode and is a variable that is incremented one by one from 0 up to the "number of prediction modes—1".

Specifically, NN parameter encoder 120 determines the parameter reference type in prediction mode k, the parameter to be referred to, and so on (S407). The parameter reference type is information indicating how to encode the NN intra prediction parameter; there are three parameter reference types. The first type is a method in which a parameter in another prediction mode is referred to and the difference from the parameter is encoded (mode reference type). The second type is a method in which information of an immediately preceding layer or an immediately preceding node is referred to and the difference from the information is encoded (immediately preceding data reference type). The third type is a method in which nothing is referred to and a value is directly encoded (non-reference type). In the mode reference type, it is possible to refer not only to a parameter in an already encoded prediction mode, but also to a preset NN intra prediction parameter which has been defined in advance. There is more than one kind of defined NN intra prediction parameters which can be selectively used. In Step S407, NN parameter encoder 120 determines a parameter reference type and when the parameter reference type is the mode reference type, also determines reference mode information (nn_intra_param_ref_mode) indicating which prediction mode is selected for a parameter to be referred to and information indicating whether or not the preset parameter is used (preset use mode ON/OFF), and when the preset parameter is used, determines a preset ID (nn_intra_param_ref_reeset_id) for indicating which preset parameter is used. A method for the determination may be selecting a parameter most similar to the NN intra prediction parameter to be encoded or may be selecting a parameter the amount of code for which is found to be smallest through an experimental encoding process.

Next, NN parameter encoder 120 encodes a parameter reference type (nn_intra_param_ref_type[k]) in prediction mode k determined in Step S407 (S403).

Next, NN parameter encoder 120 determines whether or not the parameter reference type is the non-reference type (S404), and when the parameter reference type is the non-reference type, performs a parameter non-reference type encoding process (S405). On the other hand, when the parameter reference type is not the non-reference type (when the parameter reference type is the mode reference type or the immediately preceding data reference type), NN parameter encoder 120 performs a parameter reference type encoding process (S406).

Note that a mode including a parameter to be referred to (a reference mode), which is indicated in the reference mode information, is limited to that having the same structure as prediction mode k. Specifically, the reference mode and prediction mode k have the same number of layers, the same number of nodes, the same number of reference pixels, and the same number of output pixels. This reference mode information (nn_intra_param_ref_mode) indicating a reference mode further indicates by how many modes the reference mode precedes prediction mode k, and the default value of this indication is 0.

<Operation (Parameter Non-Reference Type Encoding Flow)>

Figure 51:
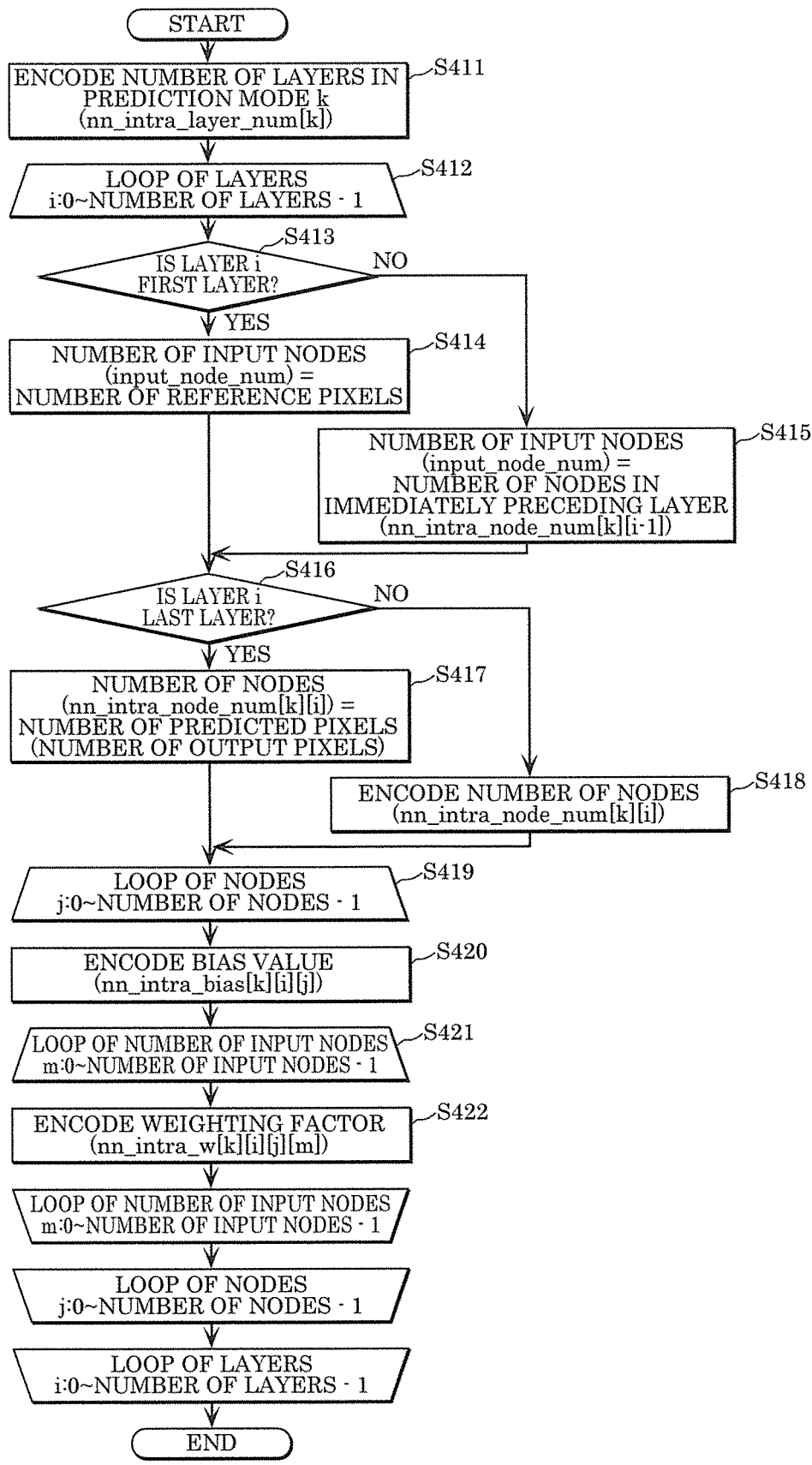
FIG. 51 is a flowchart showing the details of parameter non-reference type encoding in Step S405 in FIG. 50.

FIG. 51 is a flowchart showing the details of the parameter non-reference type encoding in Step S405 in FIG. 50.

First, NN parameter encoder 120 encodes the number of layers in prediction mode k (nn_intra_layer_num[k]) (S411), and repeats the subsequent processing as many times as the number of layers (S412). Here, i represents a current layer and is a variable that is incremented one by one from 0 up to the "number of layers—1".

Next, NN parameter encoder 120 determines whether or not layer i is the first layer (S413), and when layer i is the first layer, sets the number of input nodes (input_node_num) to the number of reference pixels (S414). On the other hand, when layer i is not the first layer, NN parameter encoder 120 sets the number of input nodes (input_node_num) to the number of nodes in the immediately preceding layer (nn_intra_node_num[k][i−1]) (S415). To describe FIG. 13 as an example, when layer i is the layer of n[k][0][x] (i=0), NN parameter encoder 120 sets the number of input nodes to 11 which is the number of reference pixels. When layer i is the layer of n[k][1][x] (i=1), NN parameter encoder 120 sets the number of input nodes to 4 which is the number of nodes in the immediately preceding layer. The number of input nodes is a variable to be used in the subsequent processing.

Next, NN parameter encoder 120 determines whether or not layer i is the last layer (S416), and when layer i is the last layer, sets the number of nodes (nn_intra_node_num[k][i]) to the number of predicted pixels (the number of output pixels) (which is 16 in the example in FIG. 13) (S417). On the other hand, when layer i is not the last layer, NN parameter encoder 120 encodes the number of nodes (S418).

Next, NN parameter encoder 120 encodes the bias values (nn_intra_bias[k][i][j]) for the number of nodes (S419, S420), and encodes the weighting factors (nn_intra_w[k][i][j][m]) for the number of nodes and the number of input nodes (S421, S422). Here, j represents a current node and is a variable that is incremented one by one from 0 up to the "number of nodes in layer i—1". And m represents a current input node and is a variable that is incremented one by one from 0 up to the "number of input nodes for node j in layer i—1". The input node is a node which inputs a value to the current node; for example, for n[k][0][0] in FIG. 13, there are 12 input nodes as reference pixels 0 to 11.

<Operation (Parameter Reference Type Encoding Flow)>

Figure 52:
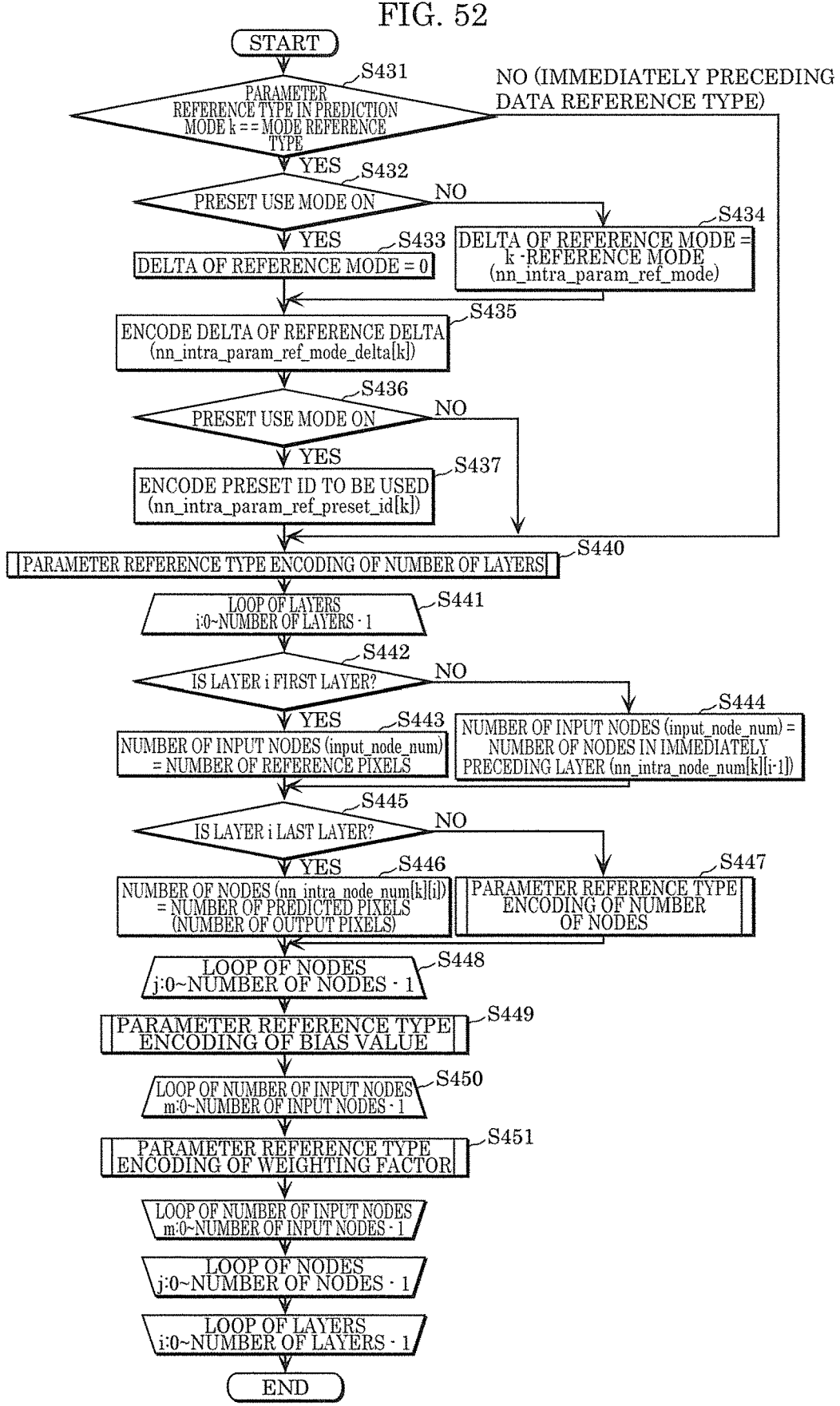
FIG. 52 is a flowchart showing the details of encoding a parameter reference type in Step S406 in FIG. 50.

FIG. 52 is a flowchart showing the details of the parameter reference type encoding in Step S406 in FIG. 50.

First, NN parameter encoder 120 determines whether or not the parameter reference type in prediction mode k is the mode reference type (S431), and when the parameter reference type is the mode reference type, further determines whether or not the preset use mode is ON (S432), and when the preset use mode is ON, sets a delta of the reference mode to 0 (S433). Subsequently, NN parameter encoder 120 encodes the delta of the reference mode (S435) and encodes the ID of a preset parameter to be used (S436, S437). When the preset use mode is not ON, NN parameter encoder 120 calculates a delta of the reference mode by subtracting the reference mode (nn_intra_param_ref mode) from k (S434), and encodes the delta of the reference mode (S435). As just described, information on whether the preset use mode is ON or OFF is not directly encoded. The image decoding apparatus can determine that the preset use mode is ON when the delta of the reference mode is 0. Furthermore, when the parameter reference type is the immediately preceding data reference type (NO in S431), NN parameter encoder 120 does not perform the processes in Steps S432 to S437.

Next, NN parameter encoder 120 encodes the number of layers according to the parameter reference type (S440). Details will be described later.

Next, NN parameter encoder 120 repeats the subsequent processing as many times as the number of layers (S441). Here, i represents a current layer and is a variable that is incremented one by one from 0 up to the "number of layers—1".

Specifically, NN parameter encoder 120 determines whether or not layer i is the first layer (S442), and when layer i is the first layer, sets the number of input nodes (input_node_num) to the number of reference pixels (S443). On the other hand, when layer i is not the first layer, NN parameter encoder 120 sets the number of input nodes (input node_num) to the number of nodes in the immediately preceding layer (nn_intra_node_num[k][i−1]) (S444).

Next, NN parameter encoder 120 determines whether or not layer i is the last layer (S445), and when layer i is the last layer, sets the number of nodes (nn_intra_node_num[k][i]) to the number of predicted pixels (the number of output pixels) (S446). On the other hand, when layer i is not the last layer, NN parameter encoder 120 encodes the number of nodes according to the parameter reference type (S447). Details regarding the encoding of the number of nodes will be described later.

Next, NN parameter encoder 120 encodes the bias values for the number of nodes (S448, S449), and encodes the weighting factors for the number of nodes and the number of input nodes according to the parameter reference type (S450, S451). Here, j represents a current node and is a variable that is incremented one by one from 0 up to the "number of nodes in layer i—1". And m represents a current input node and is a variable that is incremented one by one from 0 up to the "number of input nodes for node j in layer i—1". Encoding of the bias value (parameter reference type encoding of the bias value) in Step S449 and encoding of the weighting factor (parameter reference type encoding of the weighting factor) in Step S451 will be described later.

<Operation (Flow of Parameter Reference Type Encoding of Number of Layers)>

Figure 53:
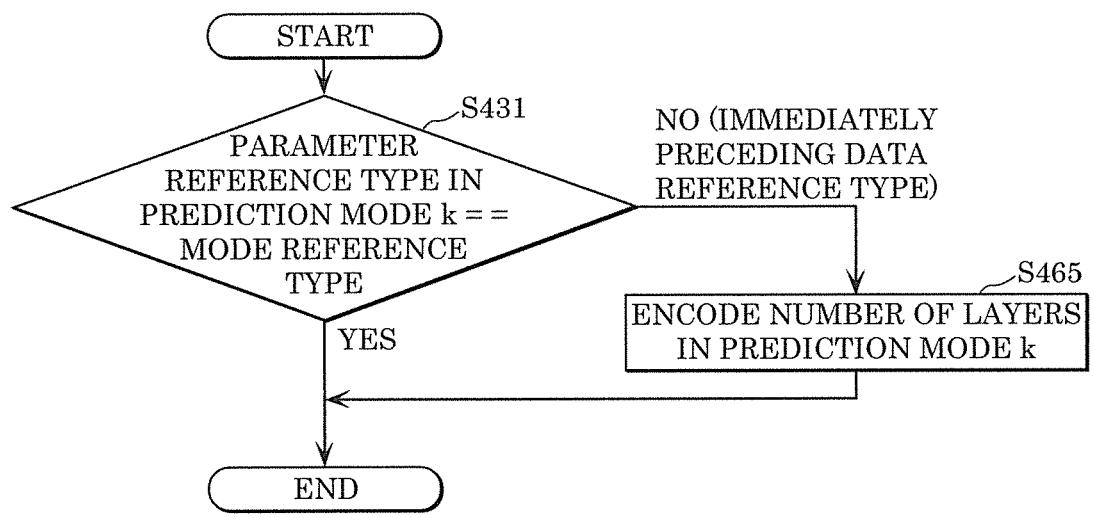
FIG. 53 is a flowchart showing the details of parameter reference type encoding of the number of layers in Step S440 in FIG. 52.

FIG. 53 is a flowchart showing the details of the parameter reference type encoding of the number of layers in Step S440 in FIG. 52.

First, NN parameter encoder 120 determines whether or not the parameter reference type in prediction mode k is the mode reference type (S431), and when the parameter reference type is not the mode reference type (when the parameter reference type is the immediately preceding data reference type), encodes the number of layers in prediction mode k (S465). When the parameter reference type is the mode reference type, NN parameter encoder 120 does not encode the number of layers because the image decoding apparatus can obtain the number of layers using a parameter in the prediction mode to be referred to or a preset parameter.

<Operation (Flow of Parameter Reference Type Encoding of Number of Nodes)>

Figure 54:
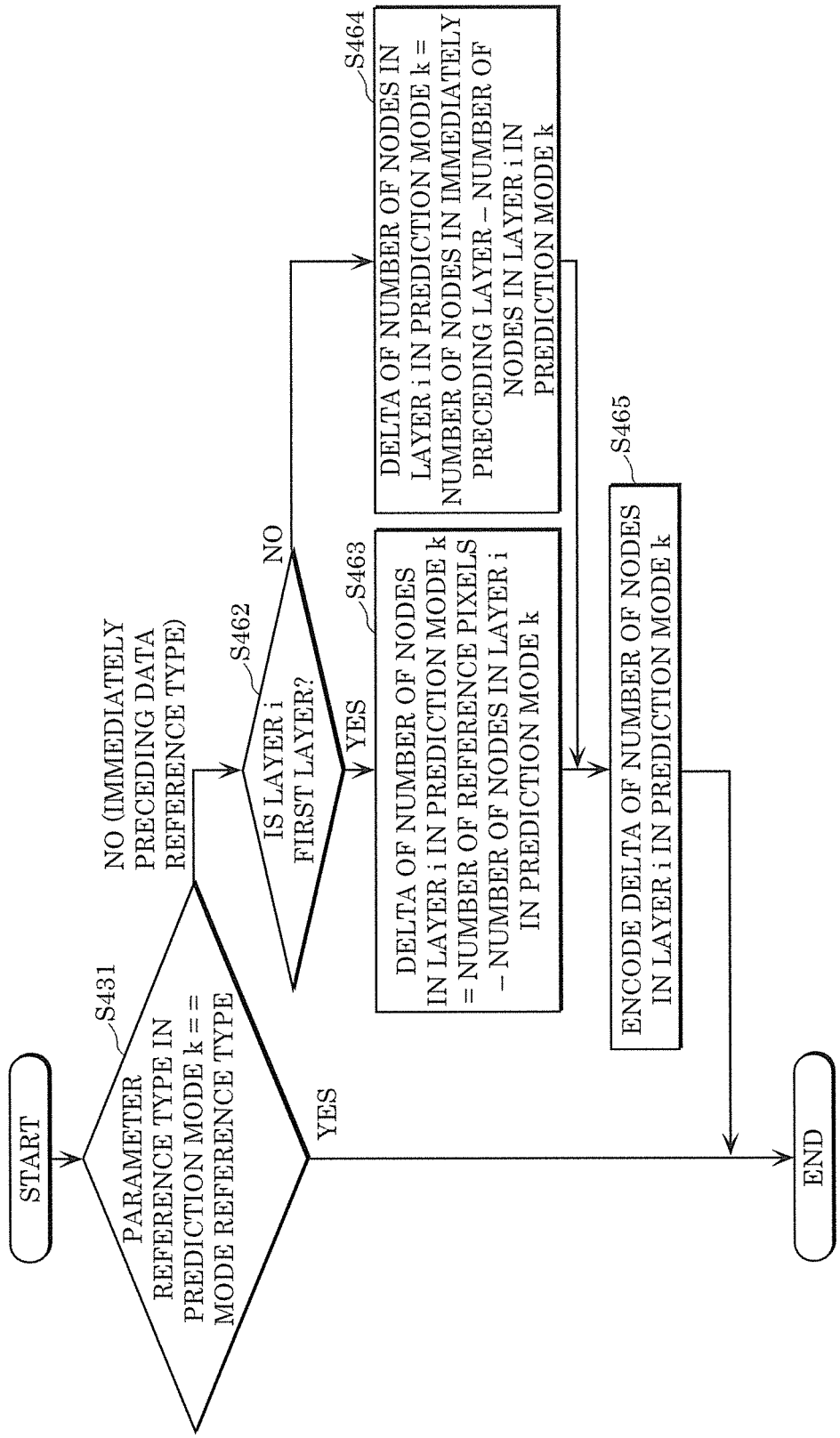
FIG. 54 is a flowchart showing the details of parameter reference type encoding of the number of nodes in Step S447 in FIG. 52.

FIG. 54 is a flowchart showing the details of the parameter reference type encoding of the number of nodes in Step S447 in FIG. 52.

NN parameter encoder 120 determines whether or not the parameter reference type in prediction mode k is the mode reference type (S431), and when the parameter reference type is not the mode reference type (when the parameter reference type is the immediately preceding data reference type), encodes the delta of the number of nodes in layer i in prediction mode k (S462 to S465). Specifically, NN parameter encoder 120 determines whether or not layer i is the first layer (S462). When layer i is the first layer, NN parameter encoder 120 calculates a delta of the number of nodes in layer i in prediction mode k by subtracting the number of nodes in layer i in prediction mode k from the number of reference pixels (S463), and encodes the delta of the number of nodes (S465). On the other hand, when layer i is not the first layer, NN parameter encoder 120 calculates a delta of the number of nodes in layer i in prediction mode k by subtracting the number of nodes in layer i in prediction mode k from the number of nodes in the immediately preceding layer (S464), and encodes the delta of the number of nodes (S465).

<Operation (Flow of Parameter Reference Type Encoding of Bias Value)>

Figure 55:
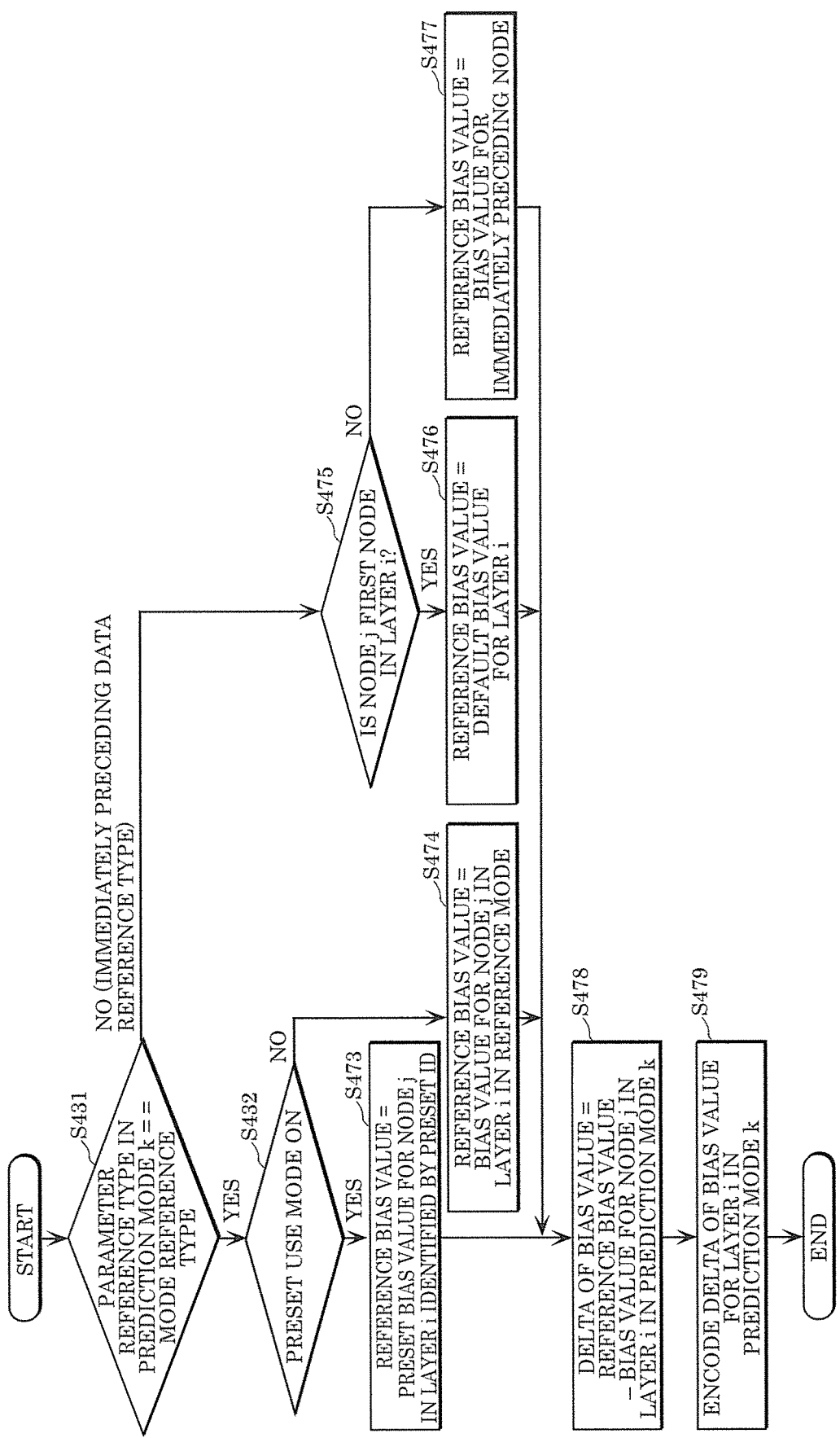
FIG. 55 is a flowchart showing the details of parameter reference type encoding of a bias value in Step S449 in FIG. 52.

FIG. 55 is a flowchart showing the details of the parameter reference type encoding of the bias value in Step S449 in FIG. 52.

NN parameter encoder 120 calculates a delta of the bias value by subtracting the bias value for node j in layer i in prediction mode k from a reference bias value (S478), and encodes the calculated value as the delta of the bias value for node j in layer i in prediction mode k (S479). The reference bias value differs according to the conditions. Specifically, NN parameter encoder 120 determines whether or not the parameter reference type in prediction mode k is the mode reference type (S431), and when the parameter reference type is the mode reference type, further determines whether or not the preset use mode is ON (S432). When the parameter reference type is the mode reference type and the preset use mode is ON, NN parameter encoder 120 sets the reference bias value to the preset bias value for node j in layer i identified by the preset ID (S473). Conversely, when, even though the parameter reference type is the mode reference type, the preset use mode is OFF, NN parameter encoder 120 sets the reference bias value to the bias value for node j in the prediction mode (reference mode) that is to be referred to (S474). Furthermore, when the parameter reference type in prediction mode k is the immediately preceding data reference type, NN parameter encoder 120 determines whether or not node j is the first node in layer i (S475), and when node j is the first node, sets the reference bias value to a default bias value for layer i (S476). On the other hand, when node j is not the first node, NN parameter encoder 120 sets the reference bias value to the bias value for the immediately preceding node (S477). Here, the first node is the node located on top in each layer, which is the node of n[k][x][0] in the example in FIG. 13. The immediately preceding node is the node located at the next higher level in the same layer in FIG. 13; the immediately preceding node for n[k][x][1] is n[k][x][0]. The default bias value is a predetermined bias value.

<Operation (Flow of Parameter Reference Type Encoding of Weighting Factor)>

Figure 56:
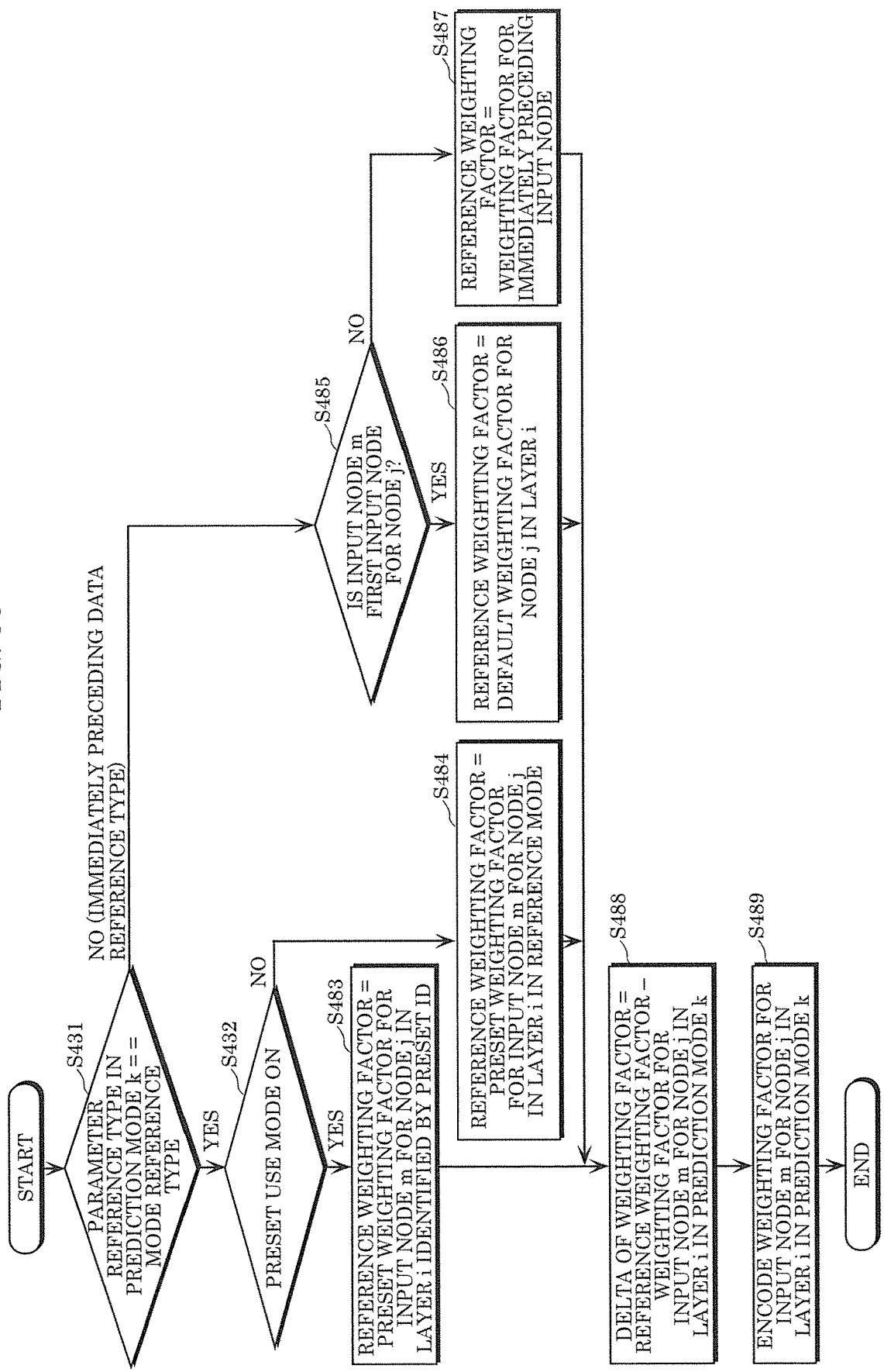
FIG. 56 is a flowchart showing the details of parameter reference type encoding of a weighting factor in Step S451 in FIG. 52.

FIG. 56 is a flowchart showing the details of the parameter reference type encoding of the weighting factor in Step S451 in FIG. 52.

NN parameter encoder 120 calculates a delta of the weighting factor by subtracting the weighting factor for input node m for node j in layer i in prediction mode k from a reference weighting factor (S488), and encodes the calculated value as the weighting factor for input node m for node j in layer i in prediction mode k (S489). The reference weighting factor differs according to the conditions. Specifically, NN parameter encoder 120 determines whether or not the parameter reference type in prediction mode k is the mode reference type (S431), and when the parameter reference type is the mode reference type, further determines whether or not the preset use mode is ON (S432). When the parameter reference type is the mode reference type and the preset use mode is ON, NN parameter encoder 120 sets the reference weighting factor to the preset weighting factor for input node m for node j in layer i identified by the preset ID (S483). Conversely, when, even though the parameter reference type is the mode reference type, the preset use mode is OFF, NN parameter encoder 120 sets the reference weighting factor to the weighting factor for input node m for node j in layer i in the prediction mode (reference mode) that is to be referred to (S484). Furthermore, when the parameter reference type in prediction mode k is the immediately preceding data reference type, NN parameter encoder 120 determines whether or not input node m is the first input node for node j (S485), and when input mode m is the first input node, sets the reference weighting factor to a default weighting factor for node j in layer i (S486). On the other hand, when input mode m is not the first input node, NN parameter encoder 120 sets the reference weighting factor to the weighting factor for the immediately preceding input node (S487). Here, the first input node is the node located on top among input nodes, which is reference pixel 0 for n[k][0][0] in the example in FIG. 13. The immediately preceding input node is the node located at the next higher level among the input nodes in FIG. 13; the immediately preceding input node of reference pixel 1 for n[k][0][0] is reference pixel 0. The default weighting factor is a predetermined weighting factor.

<Operation (Flow of Encoding NN Inter Prediction Parameter) and Operation (Flow of Encoding NN In-Loop Filter Parameter)>

The flows of encoding the NN inter prediction parameter and encoding the NN in-loop filter parameter in Steps S493 and S494 in FIG. 59 are substantially the same as the flow of encoding the NN intra prediction parameter shown in FIG. 50 to FIG. 56; it is only necessary to replace the NN intra prediction by the NN inter prediction or the NN in-loop filter, and thus description thereof will be omitted.

<Syntax Structure>

The syntaxes in the present embodiment are different from the syntaxes shown in FIG. 15 to FIG. 26 in Embodiment 1 only in the syntax of the parameter data in the NN intra prediction (FIG. 19), the syntax of the parameter data in the NN inter prediction (FIG. 20), and the syntax of the parameter data in the NN in-loop filter (FIG. 21). In the present embodiment, the syntaxes shown in FIG. 57 and FIG. 58 are used instead of the syntaxes shown in FIG. 19 to FIG. 21. The other syntaxes are the same. Note that ae(v) in Descriptor indicates that the context-based adaptive binary arithmetic coding (CABAC) is used in the encoding process.

As mentioned earlier, there are three methods for encoding the NN parameter in Embodiment 5, which is different from Embodiment 1. Information indicating that type is nn_intra_param_ref type in FIG. 57; when nn_intra_param_ref_type is NN_INTRA_PARAM_NO_REF, the parameter reference type is the non-reference parameter type, and NN parameter encoder 120 encodes the parameter value itself as in Embodiment 1. When nn_intra_param_ref_type is NN_INTRA_PARAM_REF_MODE, the parameter reference type is the mode reference type, and NN parameter encoder 120 encodes prediction mode information that is referred to, and encodes the NN parameter using the parameter value in the prediction mode that is referred to. When nn_intra_param_ref_type is other than the above, the parameter reference type is the immediately preceding data reference type, NN parameter encoder 120 encodes the NN parameter (operation parameter) using the value of an immediately previously encoded node or the default value. Furthermore, in the case of the mode reference type, the values of a plurality of preset parameters which have been defined in advance are available. In the case of the mode reference type, the prediction mode to be referred to (reference mode) is specified by the difference from a current prediction mode value (nn_intra_param_ref_mode_delta), and the difference of 0 means that the preset use mode is ON. When the preset parameter is used, which preset parameter is used is identified by nn_intra_param_ref_preset_id. Note that even when a parameter is referred to, NN parameter encoder 120 does not copy the bias value or the value of the weighting factor, but encodes the difference from the value that is referred to (nn_intra_bias_delta, nn_intra_w_delta). The parameter can be efficiently transmitted even when the bias value or the value of the weighting factor is somewhat different from the parameter to be referred to, the preset parameter, or the default value.

Note that the syntax of the NN inter prediction parameter or the NN in-loop filter parameter is similar to the syntax of the NN intra prediction parameter shown in FIG. 57 and FIG. 58; it is only necessary to replace intra_pred by inter_pred or ilf, and thus description thereof will be omitted.

Advantageous Effects

As described above, according to the present embodiment, the amount of code for the parameters in the NN intra prediction, the NN inter prediction, and the NN in-loop filter can be reduced, and thus the encoding efficiency can be improved. More specifically, a parameter in another prediction mode is referred to, and the difference from the parameter is encoded so that the amount of information is reduced. This is based on the finding that the NN parameters are similar in value even when the prediction modes are different.

Furthermore, in addition to the parameters in other prediction modes, a plurality of preset parameters are defined in advance, and when the parameter is similar to any of the preset parameters, the difference from the preset parameter is transmitted so that the amount of code is reduced. By defining preset parameters that can be applied to versatile images, it is possible to offer a certain level of encoding efficiency even when the parameter is not encoded, and the amount of information of the parameter needed to be encoded can be reduced.

Furthermore, the encoding method of the immediately preceding data reference type is provided to encode the difference from the immediately previously encoded parameter so that the amount of code for the parameter is reduced. This is based on the finding that the NN parameters have high correlation with the immediately preceding nodes and the immediately preceding input nodes.

In the case of the first node or input node, the difference from the default value is encoded so that the amount of code is reduced. This is based on the finding that the values of the NN parameters are somewhat uneven and it is possible to reduce the amount of code by providing the default value.

Furthermore, when a particular value is specified in the prediction mode to be referred to, the process is switched to the process of referring to a preset parameter; this results in a reduction in the amount of code for switching between the process of referring to a parameter in another prediction mode and the process of referring to a preset parameter. More specifically, when the delta of the reference mode is 0, the preset parameter is referred to. The delta of the reference mode is the difference from the current prediction mode and is a variable that specifies the prediction mode to be referred to; the situation in which the delta of the reference mode becomes 0 is an abnormal case (error). In the present embodiment, using the fact that the delta of the reference mode could never be 0, the amount of code is effectively used by switching to another reference method when the delta of the reference mode is 0.

Note that although the present embodiment uses the context-based adaptive binary arithmetic coding (CABAC) to encode the parameter information, this is not limiting; other variable-length encoding methods may be used. For example, Golomb coding may be used.

Furthermore, although the information on whether or not to use the preset parameter is determined according to whether the delta of the reference mode is 0, this is not limiting; information indicating that the preset parameter is to be used (for example, ref_preset_flag in FIG. 57) may be separately encoded.

Furthermore, although the difference from the prediction mode to be referred to or the preset parameter is encoded, this is not limiting; instead of encoding the difference information, the value in the prediction mode to be referred to or the value of the preset parameter may be directly copied and used as the parameter value.

Furthermore, although the configuration that includes a plurality of preset parameters is applied, this is not limiting; the configuration that includes only one preset parameter may be applied. It goes without saying that in this case, the information of the identifier for indicating which preset parameter is referred to (for example, nn_intra_param_ref_preset_id in FIG. 57) is no longer needed.

Embodiment 6

<Overall Configuration>

Figure 60:
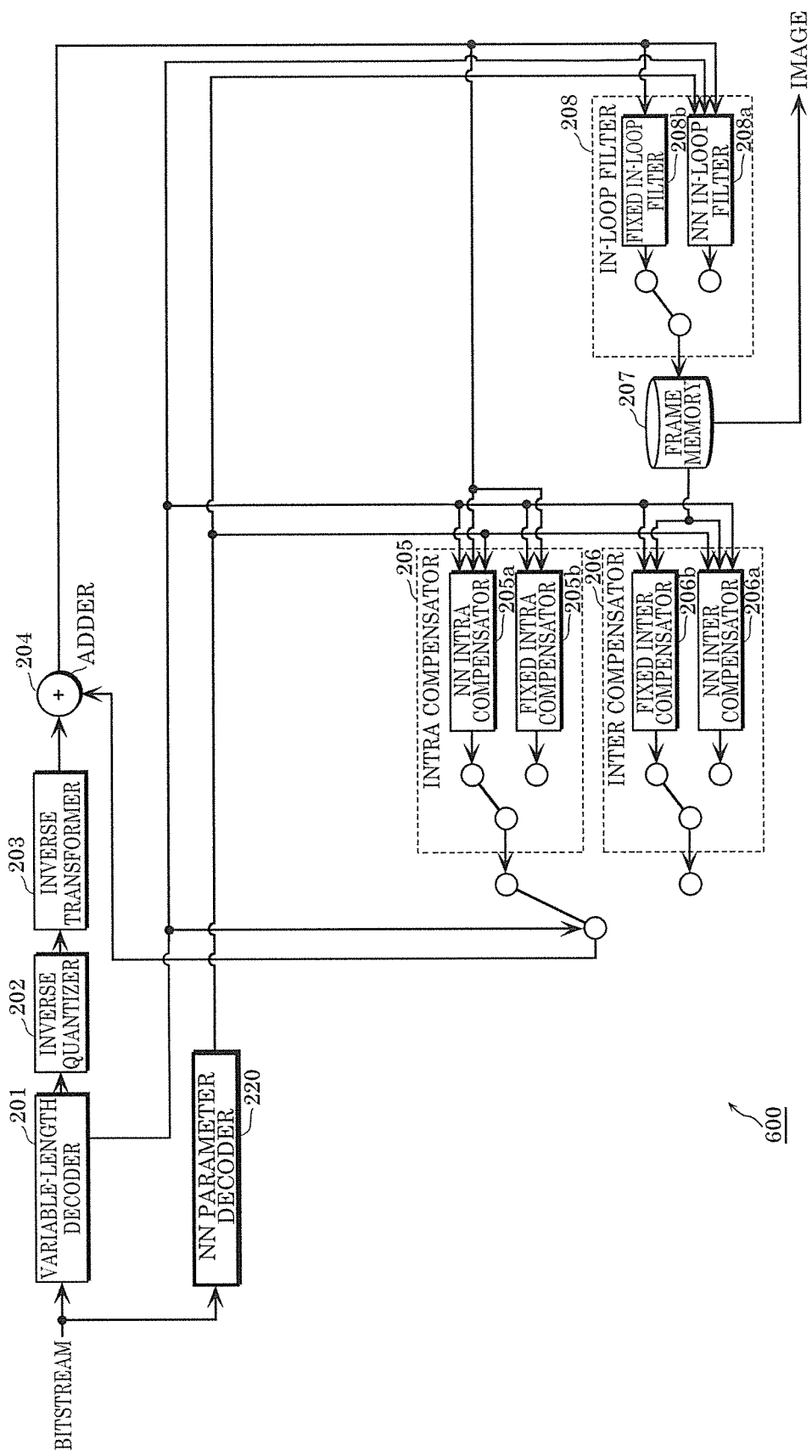
FIG. 60 is a block diagram showing a configuration of an image decoding apparatus according to Embodiment 6.

FIG. 60 is a block diagram showing a configuration of an image decoding apparatus according to the present embodiment.

Image decoding apparatus 600 according to the present embodiment includes the structural elements of image decoding apparatus 200 according to Embodiment 2, and further includes NN parameter decoder 220.

<Operation (as a Whole)>

Figure 68:
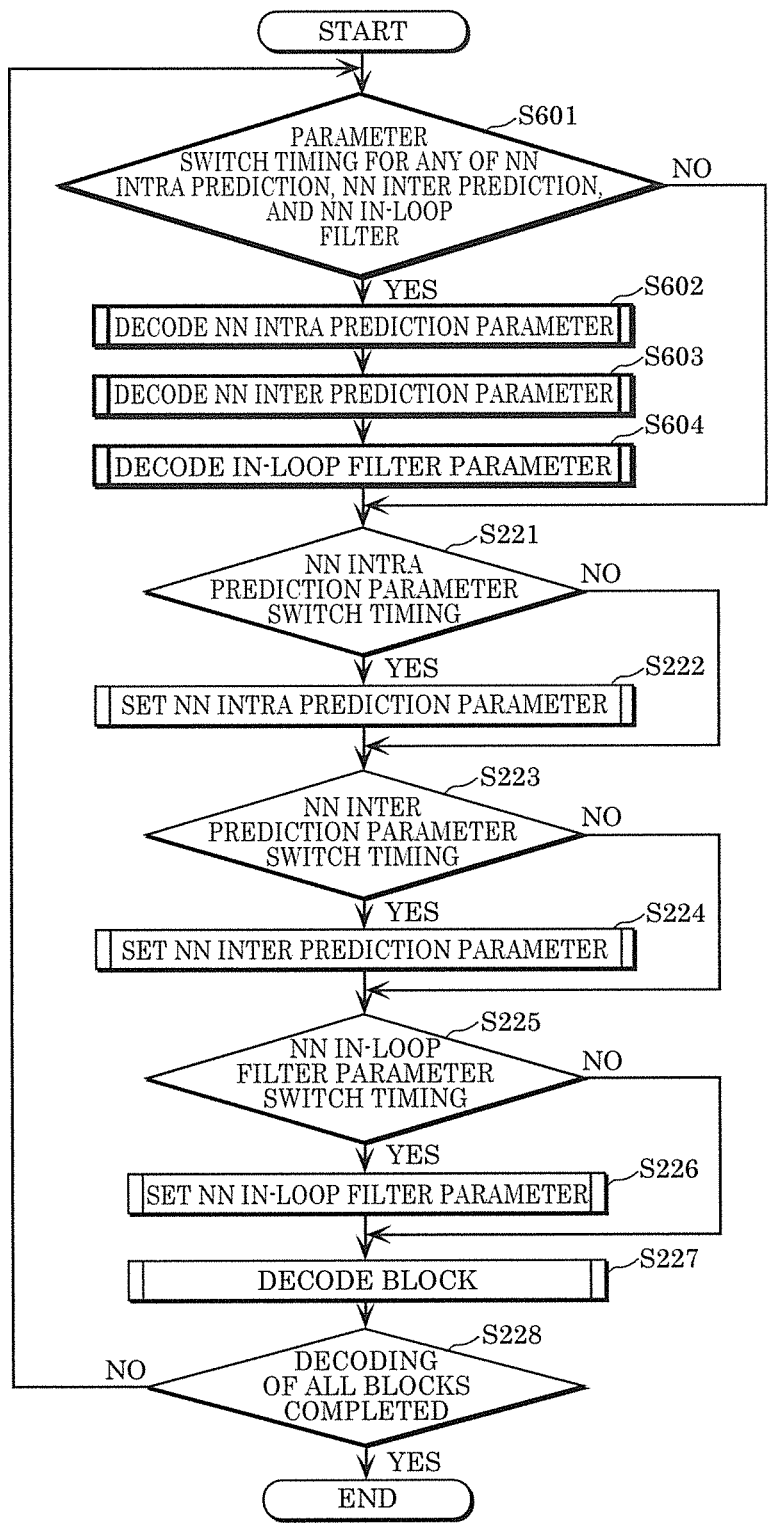
FIG. 68 is a flowchart showing the overall process of image decoding by an image decoding apparatus according to Embodiment 6.

FIG. 68 is a flowchart showing the overall process of image decoding by image decoding apparatus 600.

In Embodiment 6, image decoding apparatus 600 performs Steps S221 to S228 included in the flow shown in FIG. 30 in Embodiment 2, and further performs Steps S601, S602, S603, and S604. Specifically, in Embodiment 6, image decoding apparatus 600 performs one of Steps S602 to S604 at the occasion of parameter switch timing (S601) for any of the NN intra prediction, the NN inter prediction, and the NN in-loop filter. In each of Steps S602 to S604, NN parameter decoder 220 performs a special process of decoding the NN intra prediction parameter, the NN inter prediction parameter, or the NN in-loop filter parameter, which is different from the process performed in Embodiment 2.

<Operation (Flow of Decoding NN Intra Prediction Parameter)>

Figure 61:
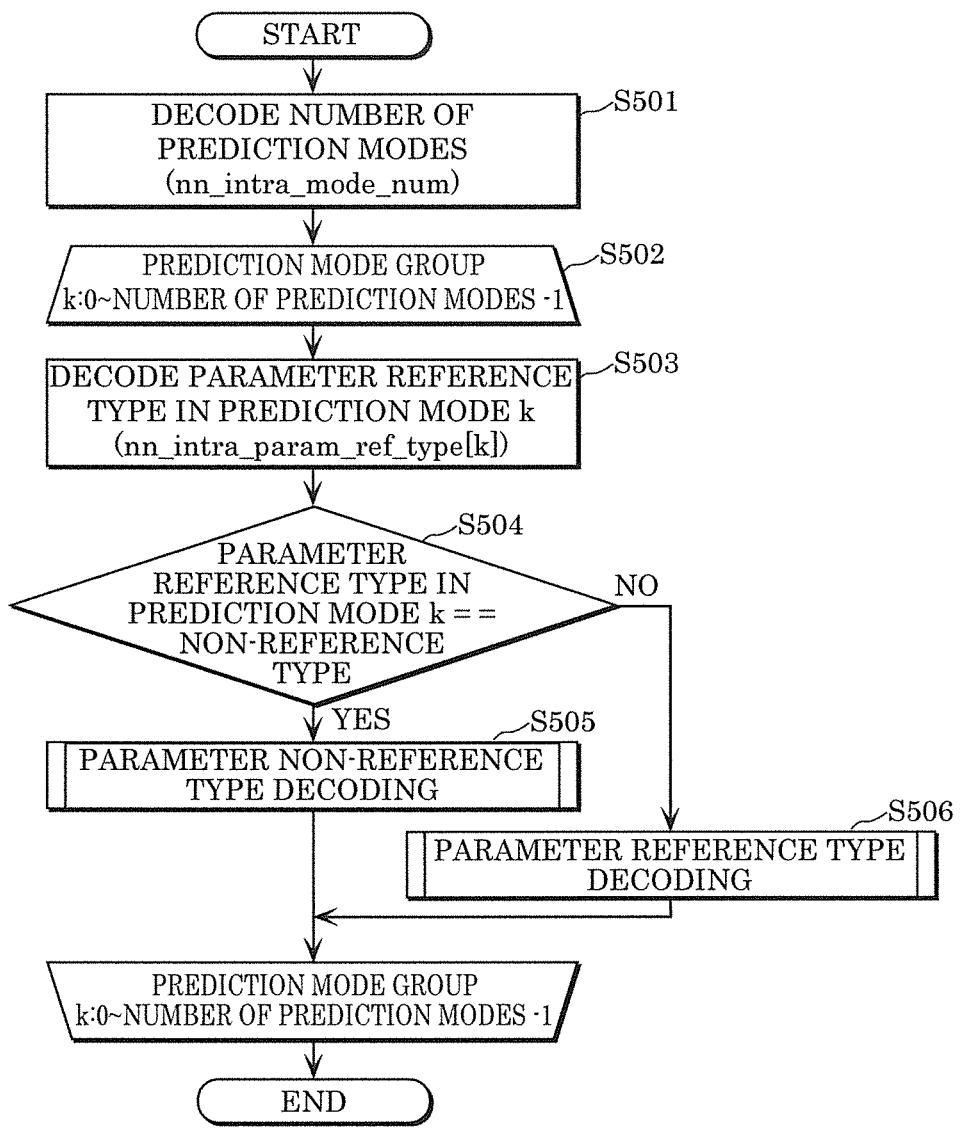
FIG. 61 is a flowchart showing the details of decoding an NN intra prediction parameter in Step S602 in FIG. 68.

FIG. 61 is a flowchart showing the details of decoding the NN intra prediction parameter in Step 602 in FIG. 68.

First, NN parameter decoder 220 decodes the number of prediction modes of the NN intra prediction (nn_intra_mode_num) (S501).

Next, NN parameter decoder 220 performs the processes in Steps S503 to S606 in each of the prediction modes (S502). Here, k represents a current prediction mode and is a variable that is incremented one by one from 0 up to the "number of prediction modes—1".

Specifically, NN parameter decoder 220 determines the parameter reference type in prediction mode k (nn_intra_param_ref_type[k]) (S503).

Next, NN parameter decoder 220 determines whether or not the parameter reference type is the non-reference type (S504), and when the parameter reference type is the non-reference type, performs a parameter non-reference type decoding process (S505), while, when the parameter reference type is not the non-reference type (when the parameter reference type is the mode reference type or the immediately preceding data reference type), NN parameter decoder 220 performs a parameter reference type decoding process (S506).

<Operation (Parameter Non-Reference Type Decoding Flow)>

Figure 62:
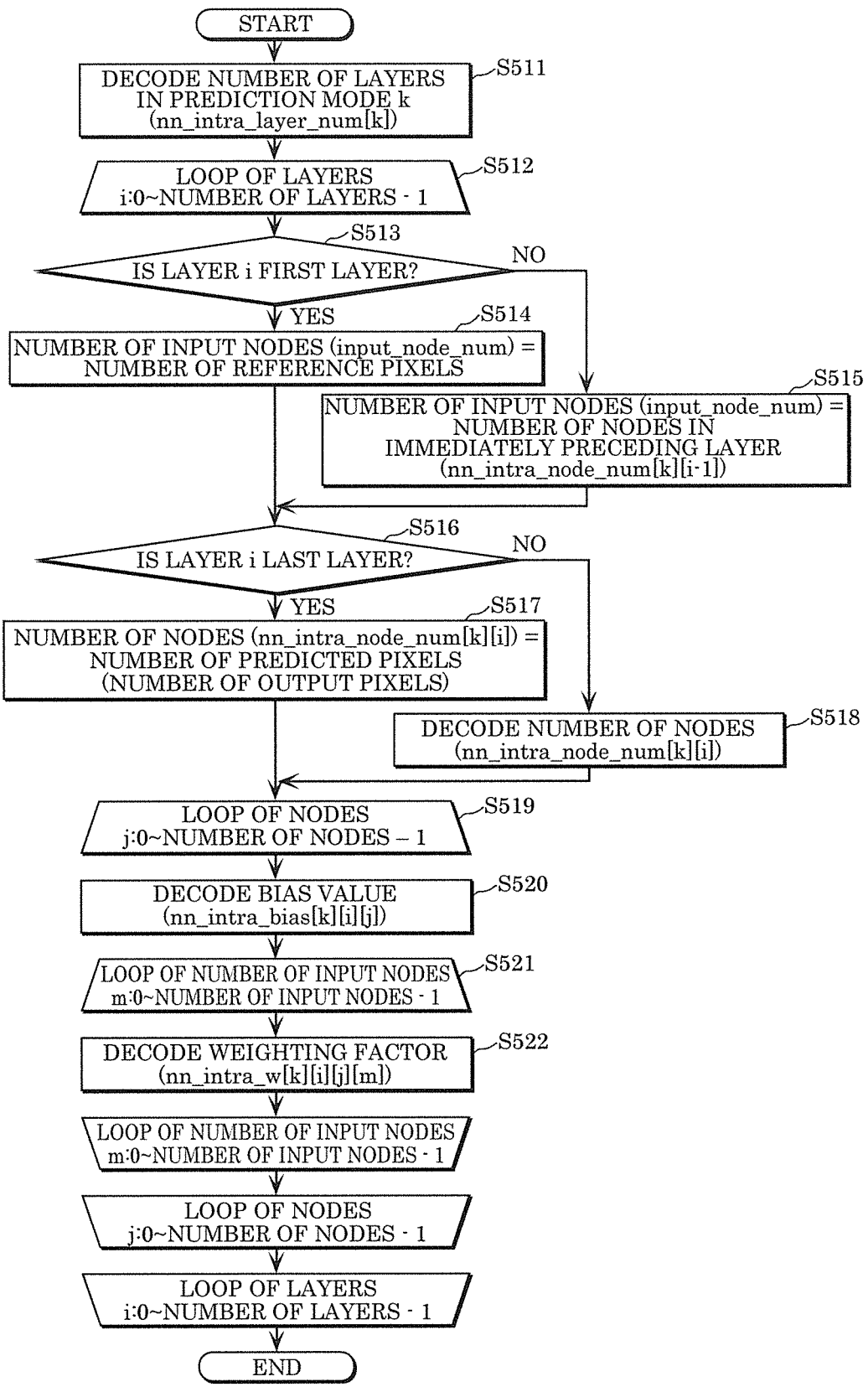
FIG. 62 is a flowchart showing the details of parameter non-reference type decoding in Step S505 in FIG. 61.

FIG. 62 is a flowchart showing the details of the parameter non-reference type decoding in Step S505 in FIG. 61.

First, NN parameter decoder 220 decodes the number of layers in prediction mode k (nn_intra_layer_num[k]) (S511), and repeats the subsequent processing as many times as the number of layers (S512). Here, i represents a current layer and is a variable that is incremented one by one from 0 up to the "number of layers—1".

Next, NN parameter decoder 220 determines whether or not layer i is the first layer (S513), and when layer i is the first layer, sets the number of input nodes (input_node_num) to the number of reference pixels (S514). On the other hand, when layer i is not the first layer, NN parameter decoder 220 sets the number of input nodes (input_node_num) to the number of nodes in the immediately preceding layer (nn_intra_node_num[k][i−1]) (S515). To describe FIG. 13 as an example, when layer i is the layer of n[k][0][x] (i=0), NN parameter decoder 220 sets the number of input nodes to 11 which is the number of reference pixels. When layer i is the layer of n[k][1][x] (i=1), NN parameter decoder 220 sets the number of input nodes to 4 which is the number of nodes in the immediately preceding layer. The number of input nodes is a variable to be used in the subsequent processing.

Next, NN parameter decoder 220 determines whether or not layer i is the last layer (S516), and when layer i is the last layer, sets the number of nodes (nn_intra_node_num[k][i]) to the number of predicted pixels (the number of output pixels) (which is 16 in the example in FIG. 13) (S517). On the other hand, when layer i is not the last layer, NN parameter decoder 220 decodes the number of nodes (S518).

Next, NN parameter decoder 220 decodes the bias values (nn_intra_bias[k][i][j]) for the number of nodes (S519, S520), and decodes the weighting factors (nn_intra_w[k][i][j][m]) for the number of nodes and the number of input nodes (S521, S522). Here, j represents a current node and is a variable that is incremented one by one from 0 up to the "number of nodes in layer i—1". And m represents a current input node and is a variable that is incremented one by one from 0 up to the "number of input nodes for node j in layer i—1". The input node is a node which inputs a value to the current node; for example, for n[k][0][0] in FIG. 13, there are 12 input nodes as reference pixels 0 to 11.

<Operation (Parameter Reference Type Decoding Flow)>

Figure 63:
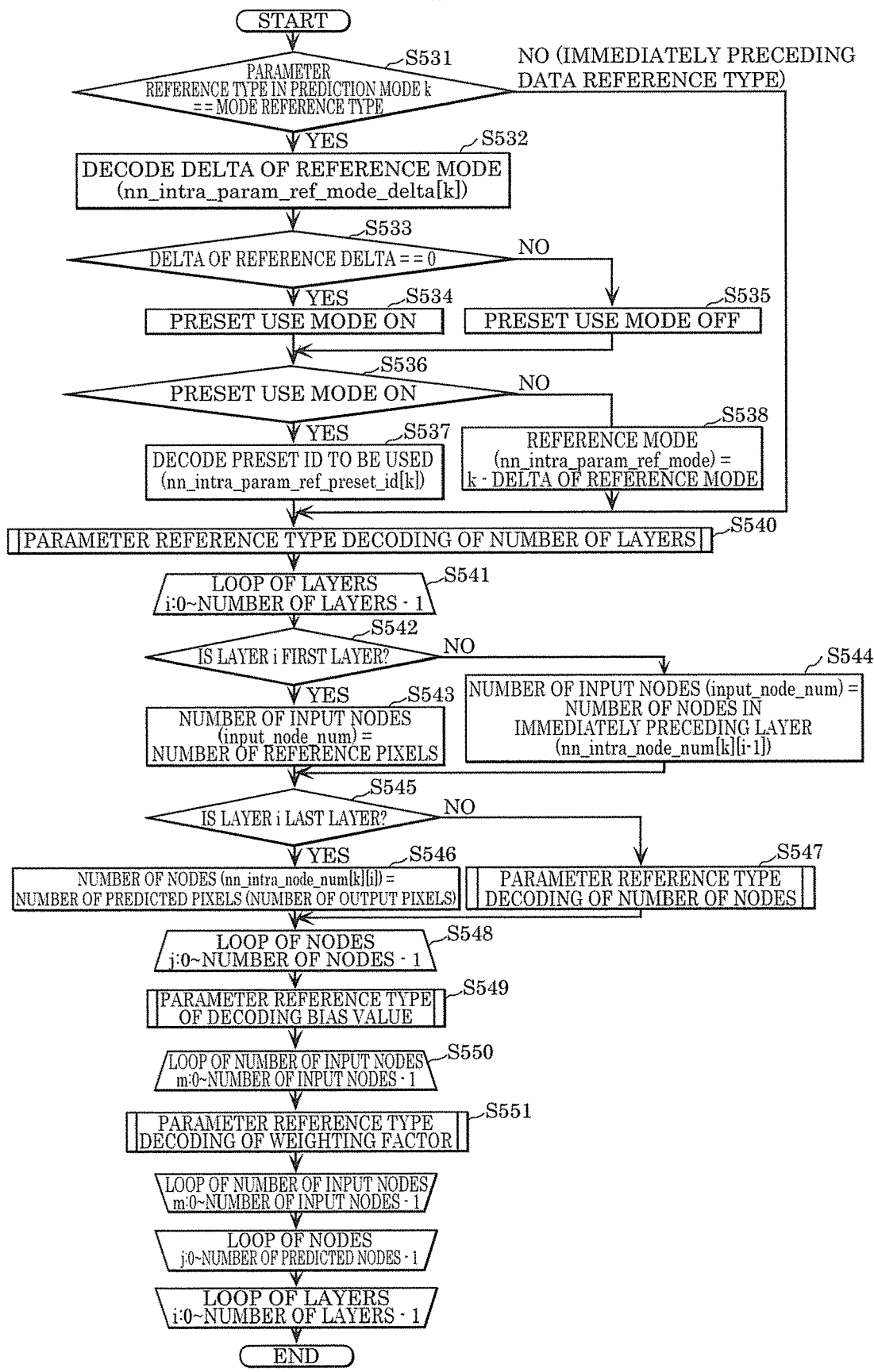
FIG. 63 is a flowchart showing the details of decoding a parameter reference type in Step S506 in FIG. 61.

FIG. 63 is a flowchart showing the details of the parameter reference type decoding in Step S506 in FIG. 61.

First, NN parameter decoder 220 determines whether or not the parameter reference type in prediction mode k is the mode reference type (S531), and when the parameter reference type is the mode reference type, decodes the delta of the reference mode (nn_intra_param_ref_mode_delta) (S532). Subsequently, NN parameter decoder 220 determines whether or not the delta of the reference mode is 0 (S533), and when the delta of the reference mode is 0, turns ON the preset use mode (S534), and when the delta of the reference mode is not 0, turns OFF the preset use mode (S535).

Next, NN parameter decoder 220 determines whether or not the preset use mode is ON (S536), and when the preset use mode is ON, decodes the ID of a preset parameter to be used (nn_intra_param_ref_preset_id) (S537). On the other hand, when the preset use mode is not ON, NN parameter decoder 220 calculates a reference mode (nn_intra_param_ref_mode) by subtracting the delta of the reference mode from k (S538). When the parameter reference type is the immediately preceding data reference type (NO in S531), NN parameter decoder 220 does not perform the processes in Steps S532 to S538.

Next, NN parameter decoder 220 decodes the number of layers according to the parameter reference type (S540). Details will be described later.

Next, NN parameter decoder 220 repeats the subsequent processing as many times as the number of layers (S541). Here, i represents a current layer and is a variable that is incremented one by one from 0 up to the "number of layers—1".

Specifically, NN parameter decoder 220 determines whether or not layer i is the first layer (S542), and when layer i is the first layer, sets the number of input nodes (input_node_num) to the number of reference pixels (S543). On the other hand, when layer i is not the first layer, NN parameter decoder 220 sets the number of input nodes (input_node_num) to the number of nodes in the immediately preceding layer (nn_intra_node_num[k][i−1]) (S544).

Next, NN parameter decoder 220 determines whether or not layer i is the last layer (S545), and when layer i is the last layer, sets the number of nodes (nn_intra_node_num[k][i]) to the number of predicted pixels (the number of output pixels) (S546). On the other hand, when layer i is not the last layer, NN parameter decoder 220 decodes the number of nodes according to the parameter reference type (S547). Details regarding the decoding of the number of nodes will be described later.

Next, NN parameter decoder 220 encodes the bias values for the number of nodes (S548, S549), and decodes the weighting factor for the number of nodes and the number of input nodes according to the parameter reference type (S550, S551). Here, j represents a current node and is a variable that is incremented one by one from 0 up to the "number of nodes in layer i—1". And m represents a current input node and is a variable that is incremented one by one from 0 up to the "number of input nodes for node j in layer i—1". Decoding of the bias value (parameter reference type decoding of the bias value) in Step S549 and decoding of the weighting factor (parameter reference type decoding of the weighting factor) in Step S551 will be described later.

<Operation (Flow of Parameter Reference Type Decoding of Number of Layers)>

Figure 64:
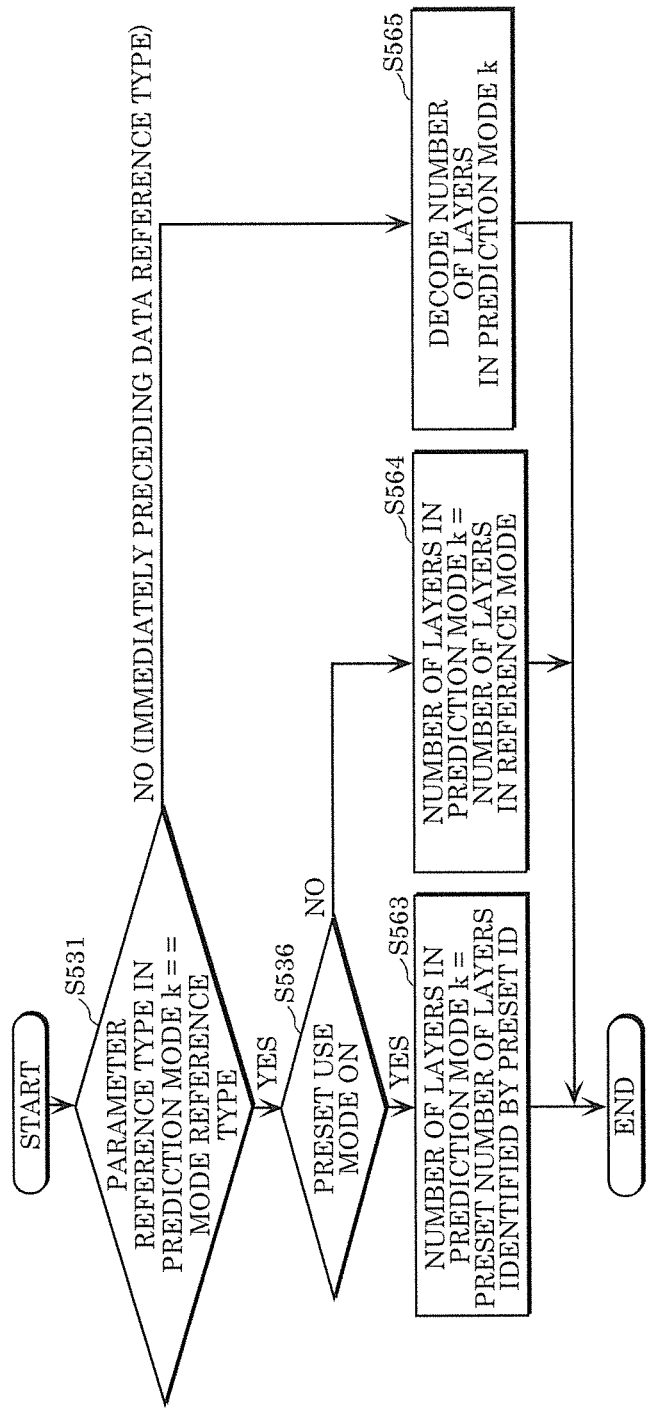
FIG. 64 is a flowchart showing the details of parameter reference type decoding of the number of layers in Step S540 in FIG. 63.

FIG. 64 is a flowchart showing the details of the parameter reference type decoding of the number of layers in Step S540 in FIG. 63.

First, NN parameter decoder 220 determines whether or not the parameter reference type in prediction mode k is the mode reference type (S531), and when the parameter reference type is the mode reference type, further determines whether or not the preset use mode is ON (S536). When the preset use mode is ON, NN parameter decoder 220 sets the number of layers in prediction mode k to the preset number of layers identified by the preset ID (S563). On the other hand, when the preset use mode is OFF, NN parameter decoder 220 sets the number of layers in prediction mode k to the number of layers in the prediction mode to be referred to (S564).

When the parameter reference type in prediction mode k is the immediately preceding data reference type (NO in S531), NN parameter decoder 220 decodes the number of layers in prediction mode k (S565).

In the present process, when the parameter reference type is the mode reference type, NN parameter decoder 220 does not decode the number of layers and obtains the number of layers from information of the preset parameter or other prediction modes.

<Operation (Flow of Parameter Reference Type Decoding of Number of Nodes)>

Figure 65:
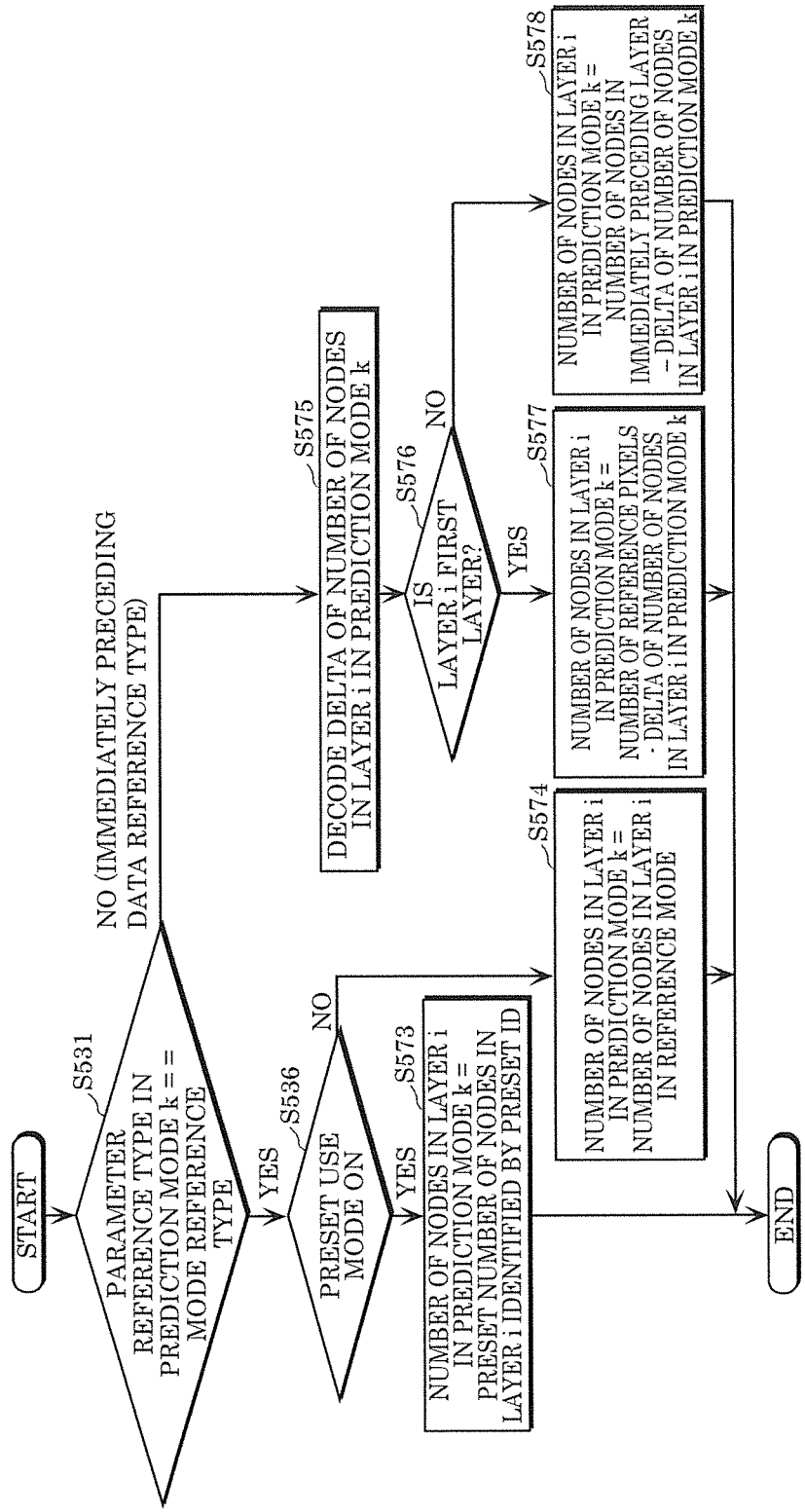
FIG. 65 is a flowchart showing the details of parameter reference type decoding of the number of nodes in Step S547 in FIG. 63.

FIG. 65 is a flowchart showing the details of the parameter reference type decoding of the number of nodes in Step S547 in FIG. 63.

First, NN parameter decoder 220 determines whether or not the parameter reference type in prediction mode k is the mode reference type (S531), and when the parameter reference type is the mode reference type, further determines whether or not the preset use mode is ON (S536). When the preset use mode is ON, NN parameter decoder 220 sets the number of nodes in layer i in prediction mode k to the preset number of nodes identified by the preset ID (S573). On the other hand, when the preset use mode is OFF, NN parameter decoder 220 sets the number of nodes in layer i in prediction mode k to the number of nodes in the prediction mode to be referred to (S574).

When the parameter reference type in prediction mode k is the immediately preceding data reference type (NO in S531), NN parameter decoder 220 decodes the delta of the number of nodes in layer i in prediction mode k (S575). Subsequently, NN parameter decoder 220 determines whether or not layer i is the first layer (S576), and when layer i is the first layer, subtracts the delta of the number of nodes decoded in Step S575 from the number of reference pixels, and sets the number of nodes in layer i in prediction mode k to the result of the subtraction (S577). When layer i is not the first layer, NN parameter decoder 220 subtracts the delta of the number of nodes decoded in Step S575 from the number of nodes in the immediately preceding layer and sets the number of nodes in layer i in prediction mode k to the result of the subtraction (S578).

In the present process, when the parameter reference type is the mode reference type, NN parameter decoder 220 does not decode the number of nodes and obtains the number of nodes from information of the preset parameter or other prediction modes.

<Operation (Flow of Parameter Reference Type Decoding of Bias Value)>

Figure 66:
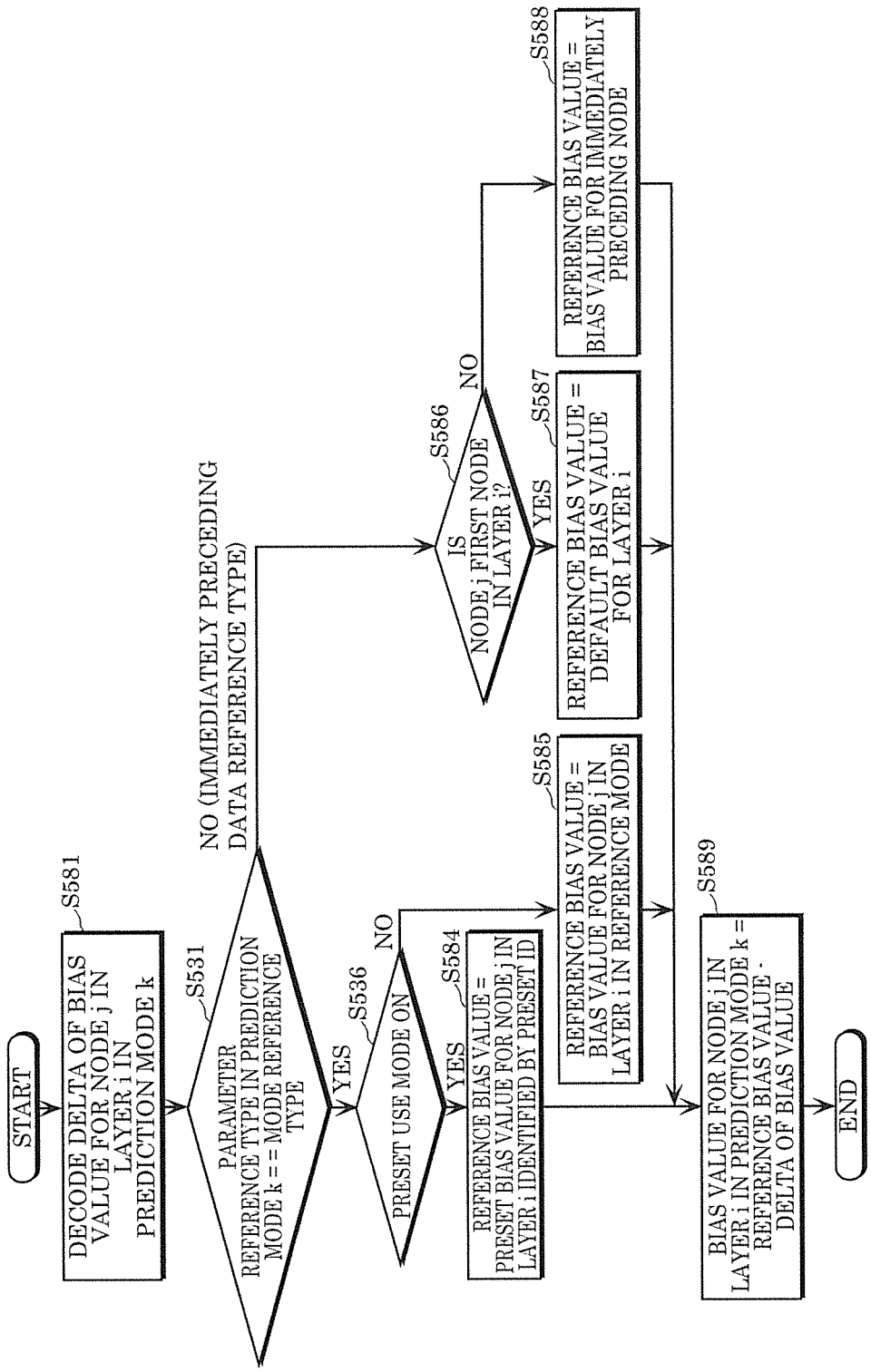
FIG. 66 is a flowchart showing the details of parameter reference type decoding of a bias value in Step S549 in FIG. 63.

FIG. 66 is a flowchart showing the details of the parameter reference type decoding of the bias value in Step S549 in FIG. 63.

First, NN parameter decoder 220 decodes the delta of the bias value for node j in layer i in prediction mode k (S581).

Next, NN parameter decoder 220 determines whether or not the parameter reference type in prediction mode k is the mode reference type (S531), and when the parameter reference type is the mode reference type, further determines whether or not the preset use mode is ON (S536). When the preset use mode is ON, NN parameter decoder 220 sets the reference bias value to the preset bias value identified by the preset ID (S584). On the other hand, when the preset use mode is OFF, NN parameter decoder 220 sets the reference bias value to the bias value in the prediction mode to be referred to (S585).

When the parameter reference type in prediction mode k is the immediately preceding data reference type (NO in S531), NN parameter decoder 220 determines whether or not node j is the first node in layer i (S586). NN parameter decoder 220 sets the reference bias value to the default bias value for layer i (S587) when node j is the first node, and sets the reference bias value to the bias value for the immediately preceding node (S588) when node j is not the first node.

Next, NN parameter decoder 220 subtracts the delta of the bias value decoded in Step S581 from the reference bias value and sets the bias value for node j in layer i in prediction mode k to the result of the subtraction (S589).

<Operation (Flow of Parameter Reference Type Decoding of Weighting Factor)>

Figure 67:
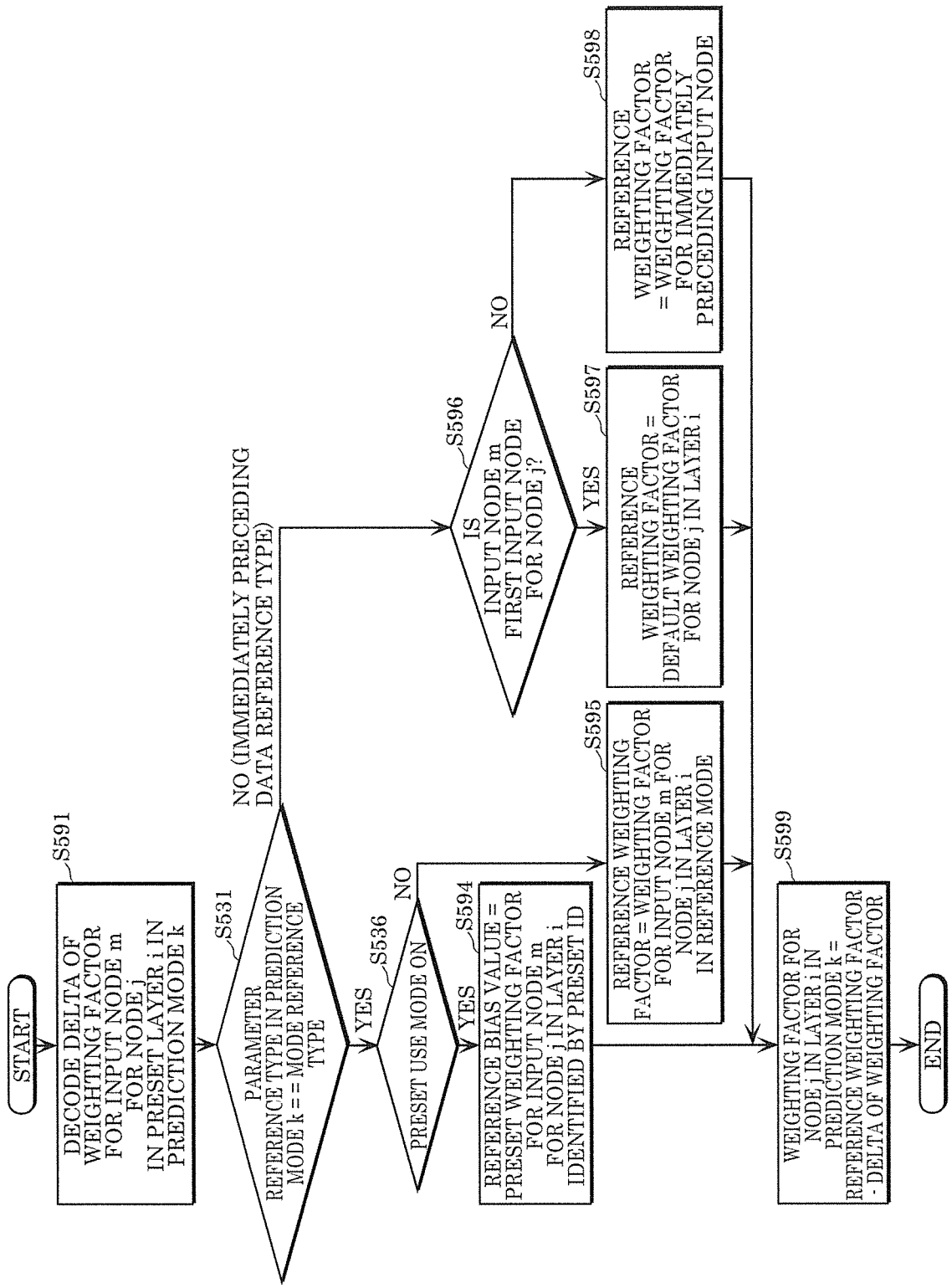
FIG. 67 is a flowchart showing the details of parameter reference type decoding of a weighting factor in Step S551 in FIG. 63.

FIG. 67 is a flowchart showing the details of the parameter reference type decoding of the weighting factor in Step S551 in FIG. 63.

First, NN parameter decoder 220 decodes the delta of the weighting factor for input node m for node j in layer i in prediction mode k (S591).

Next, NN parameter decoder 220 determines whether or not the parameter reference type in prediction mode k is the mode reference type (S531), and when the parameter reference type is the mode reference type, further determines whether or not the preset use mode is ON (S536). When the preset use mode is ON, NN parameter decoder 220 sets the reference weighting factor to the preset reference weighting factor identified by the preset ID (S594). On the other hand, when the preset use mode is OFF, NN parameter decoder 220 sets the reference weighting factor to the weighting factor in the prediction mode to be referred to (S595).

When the parameter reference type in prediction mode k is the immediately preceding data reference type (NO in S531), NN parameter decoder 220 determines whether or not input node m is the first node for node j (S596). NN parameter decoder 220 sets the reference weighting factor to the default weighting factor for node j in layer i (S597) when input node m is the first input node, and sets the reference weighting factor to the weighting factor for the immediately preceding input node (S598) when input node m is not the first input node.

Next, NN parameter decoder 220 subtracts the delta of the weighting factor decoded in Step S591 from the reference weighting factor, and sets the weighting factor for input node m for node j in layer i in prediction mode k to the result of the subtraction (S599).

<Operation (Flow of Encoding of NN Inter Prediction Parameter) and Operation (Flow of Encoding NN In-Loop Filter Parameter)>

The flows of decoding the NN inter prediction parameter and decoding the NN in-loop filter parameter in Steps S603 and S604 in FIG. 68 are substantially the same as the flow of decoding the NN intra prediction parameter shown in FIG. 61 to FIG. 67; it is only necessary to replace the NN intra prediction by the NN inter prediction or the NN in-loop filter, and thus description thereof will be omitted.

<Syntax Structure>

The syntaxes in the present embodiment are the same as the syntaxes shown in FIG. 57 and FIG. 58 in Embodiment 5, and thus description thereof will be omitted. The syntaxes of the NN inter prediction parameter and the NN in-loop filter parameter are similar to the syntax of the NN intra prediction parameter which is shown in FIG. 57 and FIG. 58; it is only necessary to replace intra_pred by inter_pred or ilf, and thus description thereof will be omitted.

Advantageous Effects

Effects are similar to those in Embodiment 5, and thus description thereof will be omitted.

Summary of Embodiments 5 and 6

As an image encoding or decoding method according to the first aspect (1) of the present disclosure, an operation parameter of a non-linear filter is encoded or decoded, and a current image is encoded or decoded using the operation parameter.

Furthermore, as the method according to the second aspect (1-1) of the present disclosure, in the method according to the first aspect, the operation parameter may be encoded or decoded by referring to a previously encoded or decoded operation parameter.

Furthermore, as the method according to the third aspect (1-1-1) of the present disclosure, in the method according to the second aspect, a plurality of modes of a process using the operation parameter may be provided, and the operation parameter may be encoded or decoded by referring to a previously encoded or decoded operation parameter in another mode.

Furthermore, as the method according to the fourth aspect (1-1-2) of the present disclosure, in the method according to the second aspect, the operation parameter may be encoded or decoded by referring to an immediately previously encoded or decoded operation parameter.

Furthermore, as the method according to the fifth aspect (1-1-3) of the present disclosure, in the method according to the second aspect, a value of difference from data to be referred to may be encoded or decoded.

Furthermore, as the method according to the sixth aspect (1-2) of the present disclosure, in the method according to the first aspect, a specific operation parameter may be defined, and the operation parameter may be encoded or decoded by referring to the specific operation parameter.

Furthermore, as the method according to the seventh aspect (1-2-1) of the present disclosure, in the method according to the sixth aspect, a plurality of operation parameters may be defined, an identifier for specifying one of the plurality of operation parameters may be encoded or decoded, and the operation parameter may be encoded or decoded by referring to the specified operation parameter.

Furthermore, as the method according to the eighth aspect (1-2-2) of the present disclosure, in the method according to the sixth aspect, a value of difference from data to be referred to may be encoded or decoded.

Here, as an image encoding or decoding method according to the ninth aspect (2) of the present disclosure, an operation parameter to be used in intra prediction is encoded or decoded.

Furthermore, as the method according to the tenth aspect (2-1) of the present disclosure, in the method according to the ninth aspect, the operation parameter may be encoded or decoded by referring to a previously encoded or decoded operation parameter.

Furthermore, as the method according to the eleventh aspect (2-1-1) of the present disclosure, in the method according to the tenth aspect, a plurality of modes of a process using the operation parameter may be provided, and the operation parameter may be encoded or decoded by referring to a previously encoded or decoded operation parameter in another mode.

Furthermore, as the method according to the twelfth aspect (2-1-2) of the present disclosure, in the method according to the tenth aspect, the operation parameter may be encoded or decoded by referring to an immediately previously encoded or decoded operation parameter.

Furthermore, as the method according to the thirteenth aspect (2-1-3) of the present disclosure, in the method according to the tenth aspect, a value of difference from data to be referred to may be encoded or decoded.

Furthermore, as the method according to the fourteenth aspect (2-2) of the present disclosure, in the method according to the ninth aspect, a specific operation parameter may be defined, and the operation parameter may be encoded or decoded by referring to the specific operation parameter.

Furthermore, as the method according to the fifteenth aspect (2-2-1) of the present disclosure, in the method according to the fourteenth aspect, a plurality of operation parameters may be defined, an identifier for specifying one of the plurality of operation parameters may be encoded or decoded, and the operation parameter may be encoded or decoded by referring to the specified operation parameter.

Furthermore, as the method according to the sixteenth aspect (2-2-2) of the present disclosure, in the method according to the fourteenth aspect, a value of difference from data to be referred to may be encoded or decoded.

In each of the foregoing embodiments, the respective function blocks can typically be implemented using a microprocessor (MPU), a memory, and the like. Furthermore, the processes performed by the respective function blocks may typically be implemented through software (e.g., a program), and such software may be recorded on a recording medium such as a ROM, or the like. In addition, such software may be distributed by downloading, and so on, and may also be distributed by being recorded on a recording medium such as a CD-ROM, or the like. Note that the respective function blocks may obviously be implemented through hardware (e.g., a dedicated circuit).

Furthermore, the processes described in each of the embodiments may be implemented by integrated processing using a single apparatus (system), or may be implemented by distributed processing using plural apparatuses. Furthermore, the computer for executing the above-described program may be a single computer or plural computers. In other words, integrated processing may be performed or distributed processing may be performed.

The present disclosure is not limited by the forgoing embodiments, and various modifications are possible, and such modifications are obviously included in the scope of the present disclosure.

Summary of Embodiments 1 and 6

Figure 69A:
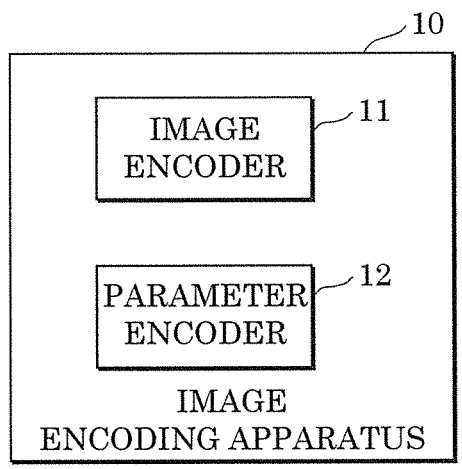
FIG. 69A is a block diagram of an image encoding apparatus according to one aspect of the present disclosure.

FIG. 69A is a block diagram of an image encoding apparatus according to one aspect of the present disclosure.

Image encoding apparatus 10 which corresponds to image encoding apparatuses 100, 300, and 500 according to the above embodiments transforms a picture on a block basis, reconstructs the transformed block using an in-loop filter, predicts the reconstructed block using intra prediction in which a pixel in the picture is used or inter prediction in which a pixel in another picture is used, and encodes the block. Image encoding apparatus 10 includes image encoder 11 and parameter encoder 12.

Image encoder 11 encodes an image including the block by performing, in at least one of the intra prediction, the inter prediction, and the in-loop filter, a non-linear process by which the input-output relationship becomes non-linear. Parameter encoder 12 encodes an operation parameter of a non-linear filter to be used in the non-linear process.

Figure 69B:
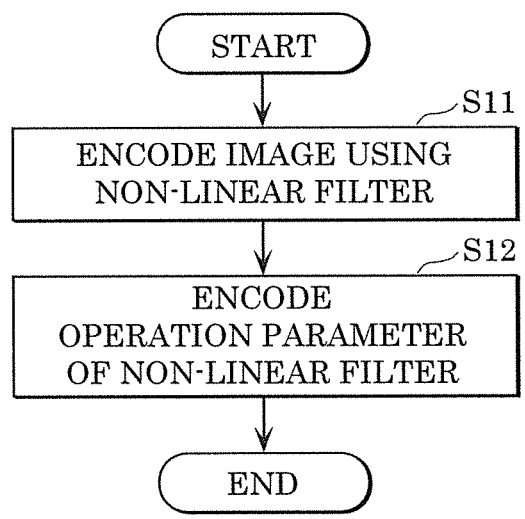
FIG. 69B is a flowchart of an image encoding method according to one aspect of the present disclosure.

FIG. 69B is a flowchart of an image encoding method according to one aspect of the present disclosure.

The image encoding method includes: transforming a picture on a block basis; reconstructing the transformed block using an in-loop filter; predicting the reconstructed block using intra prediction in which a pixel in the picture is used or inter prediction in which a pixel in another picture is used; and encoding the block, and the image encoding method includes Step S11 and Step S12. In Step S11, an image including the block is encoded by performing, in at least one of the intra prediction, the inter prediction, and the in-loop filter, the non-linear process by which the input-output relationship becomes non-linear. In Step S12, an operation parameter of a non-linear filter to be used in the non-linear process is encoded.

In this way, in the image encoding apparatus and the image encoding method according to one aspect of the present disclosure, an image can be efficiently encoded by using the non-linear filter.

For example, the non-linear filter may include a neural network, and in the encoding of the operation parameter, a weighting factor between nodes included in the neural network may be encoded as the operation parameter. Furthermore, for example, the encoding of the operation parameter may further include encoding the number of layers or the number of nodes in the neural network as the operation parameter.

Furthermore, in the encoding of the image, a maximum number of layers or a maximum number of nodes in the neural network may be defined according to a profile of the image to be encoded, and the non-linear process may be performed using the neural network that has no more than the maximum number of layers or no more than the maximum number of nodes.

Accordingly, as shown in FIG. 28, for example, the number of layers or the number of nodes is limited according to the profile, and thus the amount of calculation for the non-linear process can be reduced, allowing for low delay.

Furthermore, the image encoding method may further include encoding switch information indicating, as a filter to be used, one of a linear filter having a fixed parameter and the non-linear filter, and in the encoding of the image, a process to be used for encoding the image may be switched, according to the switch information, between the non-linear process using the non-linear filter and a linear process using the linear filter in at least one of the intra prediction, the inter prediction, and the in-loop filter.

For example, the switch information is intra_pred_type, inter_pred_type, or ilf_type, shown in FIG. 22. The linear process is at least one of the conventional intra prediction, inter prediction, and an in-loop filter in which the linear filter having a fixed parameter (such as a weighting factor) is used.

Thus, since switching is possible between the non-linear process and the linear process, a process having a high evaluation value, which is defined according to the amount of code and image distortion (image quality), can be selected so that both the amount of code and the image quality deterioration can be reduced.

Furthermore, the non-linear process may be associated with a mode among a plurality of modes, and in the encoding of the image, the image may be encoded by performing the non-linear process when the mode is specified.

Thus, when a mode such as nn_intra_pred_mode, nn_inter_pred_mode, and nn_ilf_mode shown in FIG. 22, for example, is specified, an appropriate non-linear process associated with the specified mode can be performed.

Furthermore, the image encoding method may further include encoding information indicating the specified mode.

Thus, as shown in FIG. 22 to FIG. 26, for example, the information indicating a mode is encoded, and therefore the mode can be reported to the image decoding apparatus, allowing the image to be appropriately decoded.

Furthermore, the image encoding method may further include switching the operation parameter for each image unit which is a block, a slice, a tile, a picture, or a group of pictures (GOP) included in the image, and in the encoding of the image, the image unit may be encoded by performing, on the image unit, the non-linear process using the non-linear filter having switched the operation parameter. For example, in the encoding of the operation parameter, the operation parameter corresponding to each of the plurality of non-linear filters and associated with a first identifier is encoded at least one of the leading sequence, the leading GOP, and the leading picture in the image, and in the encoding of the image, the image is encoded by specifying, for each image unit, the operation parameter by the first identifier and performing the non-linear process using the non-linear filter having the specified operation parameter.

For example, as shown in FIG. 16 to FIG. 18, for each image unit, the first identifier such as pps_nps_id or slice_nps_id specifies the operation parameter (nn_intra_pred_parameter_data( ), nn_inter_pred_parameter_data( ), or nn_ilf_parameter_data( )) that is associated with the same nps_id as the first identifier. With this, the operation parameter can be appropriately used for each image unit.

Furthermore, the image encoding method may further include encoding enabled/disabled information indicating whether the non-linear filter is enabled or disabled, and in the encoding of the image, the non-linear process may be performed when the enabled/disabled information indicates that the non-linear filter is enabled.

For example, the enabled/disabled information that is a flag such as nn_intra_pred_enabled_flag shown in FIG. 15 is encoded, and when the flag indicates that the non-linear filter is enabled, the non-linear process such as the NN intra prediction is performed. This allows the image decoding apparatus to omit a process for the operation parameter or the like when the enabled/disabled information indicates that the non-linear filter is disabled; thus, it is possible to decode the image easily.

Furthermore, the image encoding method may further include switching, according to a profile of the image to be encoded, content to be indicated by the enabled/disabled information.

Thus, whether or not to perform the non-linear process can be selected according to the profile.

Furthermore, the image encoding method may further include switching, on an application program that handles the image, the content indicated by the enabled/disabled information to a disabled state when a request for low delay is made on image processing.

Thus, on the application program with a request for low delay, the linear process, such as the intra prediction, using the linear filter having the fixed parameter can be performed instead of the non-linear process, and it is possible to encode the image in a way that meets the request.

Furthermore, the image encoding method may further include determining the operation parameter through learning using the image as training data. For example, the image encoding method further includes: classifying each block included in the image as one of a plurality of classes according to a feature of the block; and determining the operation parameter for each class through learning using, as the training data, at least one block classified as the class and a neighboring pixel of the at least one block in the determination of the operation parameter.

Thus, as shown in FIG. 7 to FIG. 14, for example, the operation parameter can be optimized for a current image to be encoded, allowing for more efficient encoding of the image.

Furthermore, in the determining of the operation parameter, the operation parameter may be determined through learning using only a region of the image that is more complex than a predetermined criterion.

Thus, the learning range can be narrowed down without degrading the accuracy or performance of the non-linear process, and the amount of the operation parameter in the non-linear filter can be reduced.

Furthermore, in the transforming, the image may be transformed from a spatial domain into a frequency domain, and a method for the transformation may be switched according to whether the intra prediction or the inter prediction using the non-linear filter is performed and whether the intra prediction or the inter prediction using the linear filter is performed. For example, in the transformation, when the intra prediction using the non-linear filter is performed, the method for the transformation is switched to a method using a variable transformation matrix, and the transformation is performed according to the method using the variable transformation matrix.

For example, as shown in FIG. 39, when the intra prediction using the non-linear filter (NN intra prediction) is performed, th transformation is performed by a method using a variable transformation matrix such as the KL transformation, while, when the intra prediction using the linear filter (conventional intra prediction) is performed, the transformation is performed by fixed transformation such as the discrete cosine transform. Thus, when the non-linear process such as the NN intra prediction is performed, the transformation suitable for the non-linear process can be performed, allowing for improvement in the encoding efficiency.

Furthermore, in the encoding of the image, when the block included in the image is of a size equal to or less than a predetermined size, the intra prediction using the non-linear filter may be performed on the block as the non-linear process, and when the block is of a size greater than the predetermined size, the intra prediction using a linear filter having a fixed parameter may be performed on the block.

For example, as shown in FIG. 36, the NN intra prediction is performed on the prediction block when the block (prediction block) included in the image is of a size of 4×4 pixels or less, and the fixed intra prediction is performed on the prediction block when the block is of a size greater than the size of 4×4 pixels. Thus, the amount of data of the operation parameter can be reduced while the degradation of the prediction performance is reduced, allowing for improvement in the encoding efficiency.

Furthermore, in the encoding of the image, the non-linear process may be performed on a luminance component of the image, and a linear process by which the input-output relationship becomes linear may be performed on a chrominance component of the image in at least one of the intra prediction, the inter prediction, and the in-loop filter.

For example, as shown in FIG. 36 to FIG. 38, the NN intra prediction, the NN inter prediction, or the NN in-loop filter is performed on the luminance component, and the fixed intra prediction, the fixed inter prediction or the fixed in-loop filter is performed on the chrominance component. Note that each of the fixed intra prediction, the fixed inter prediction, and the fixed in-loop filter is conventional inter prediction, intra prediction, or an in-loop filter which is performed using a linear filter having a fixed parameter. Thus, the amount of data of the operation parameter can be reduced while the reduction in the accuracy of prediction and the increase in noise are reduced, allowing for improvement in the encoding efficiency.

Furthermore, in the encoding of the operation parameter, a current operation parameter to be encoded may be encoded by referring to a previously encoded operation parameter different from the current operation parameter. Specifically, in the encoding of the operation parameter, the difference between the current operation parameter and the previously encoded operation parameter is encoded.

Thus, as shown in FIG. 54 to FIG. 56, for example, the operation parameter can be efficiently encoded.

Furthermore, the non-linear process may have a plurality of modes, and the previously encoded operation parameter may be a previously encoded operation parameter in the non-linear process in another mode different from the mode of the non-linear process for the current operation parameter.

Thus, as shown in Steps S484 and S488 in FIG. 56, for example, the operation parameter (weighting factor) can be efficiently encoded. Note that the weighting factor for input node m for node j in layer i in the reference mode in Step S484 is a previously encoded operation parameter.

Furthermore, the previously encoded operation parameter may be an operation parameter encoded immediately before the current operation parameter.

Thus, as shown in Steps S487 and S488 in FIG. 56, for example, the operation parameter (weighting factor) can be efficiently encoded. Note that the weighting factor for the immediately preceding input node in Step S487 is an operation parameter encoded immediately before the current operation parameter.

Furthermore, in the encoding of the operation parameter, a current operation parameter to be encoded may be encoded by referring to a defined parameter which is defined in advance.

Thus, as shown in Steps S483 and S488 in FIG. 56, for example, the operation parameter (weighting factor) can be efficiently encoded. Note that the preset weighting factor for input node m for node j in layer i identified by the preset ID in Step S483 is the defined parameter which is defined in advance.

Furthermore, in the encoding of the operation parameter, one parameter may be specified using a second identifier of the parameter among a plurality of predetermined parameters, and the specified parameter may be referred to as the defined parameter, and the image encoding method may further include encoding the second identifier.

For example, in Step S437 in FIG. 52, the preset ID is specified as the second identifier and encoded. Thus, an appropriate defined parameter can be selected, allowing for more efficient encoding of the operation parameter.

Figure 70A:
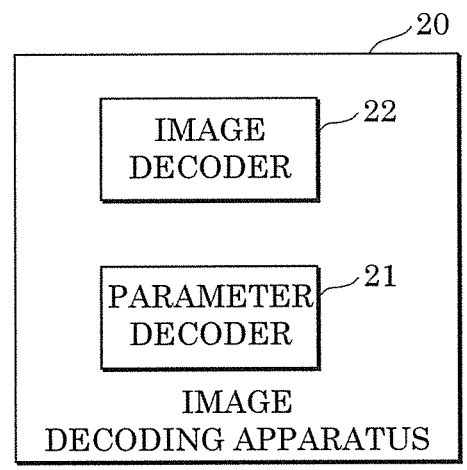
FIG. 70A is a block diagram of an image decoding apparatus according to one aspect of the present disclosure.

FIG. 70A is a block diagram of an image decoding apparatus according to one aspect of the present disclosure.

Image decoding apparatus 20 which corresponds to image decoding apparatuses 200, 400, and 600 according to the above embodiments inversely transform an encoded picture on a block basis, reconstructs the inversely transformed block using an in-loop filter, predicts the reconstructed block using intra prediction in which a previously decoded pixel in the encoded picture is used or inter prediction in which a previously decoded pixel in another encoded picture is used, and decodes the block. Image decoding apparatus 20 includes parameter decoder 21 and image decoder 22.

Parameter decoder 21 decodes an operation parameter of a non-linear filter. Image decoder 22 decodes an image including the block by performing, in at least one of the intra prediction, the inter prediction, and the in-loop filter, a non-linear process in which the non-linear filter having the decoded operation parameter is used and by which the input-output relationship becomes non-linear.

Figure 70B:
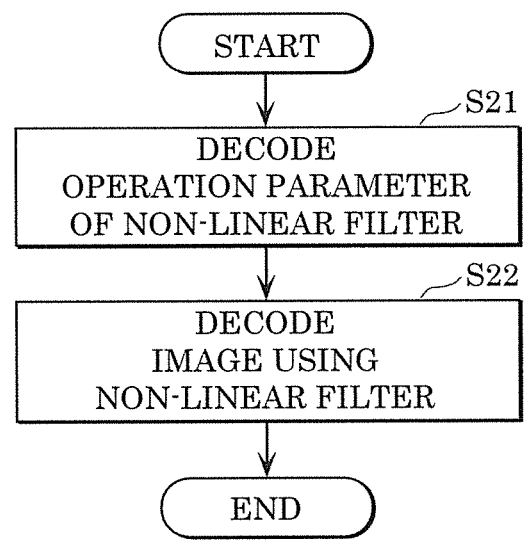
FIG. 70B is a flowchart of an image decoding method according to one aspect of the present disclosure.

FIG. 70B is a flowchart of an image decoding method according to one aspect of the present disclosure.

The image decoding method includes: inversely transforming the encoded picture on a block basis; reconstructing the inversely transformed block using an in-loop filter; predicting the reconstructed block using intra prediction in which a previously decoded pixel in the encoded picture is used or inter prediction in which a previously decoded pixel in another encoded picture is used; and decoding the block, and the image decoding method includes Step S21 and Step S22. In Step S21, an operation parameter of a non-linear filter is decoded. In Step S22, an image including the block is decoded by performing, in at least one of the intra prediction, the inter prediction, and the in-loop filter, the non-linear process in which the non-linear filter having the decoded operation parameter is used and by which the input-output relationship becomes non-linear.

In this way, in the image decoding apparatus and the image decoding method according to one aspect of the present disclosure, the efficiently encoded image can be appropriately decoded by using the non-linear filter.

For example, the non-linear filter may include a neural network, and in the decoding of the operation parameter, a weighting factor between nodes included in the neural network may be decoded as the operation parameter. Furthermore, for example, the decoding of the operation parameter may further include decoding, as the operation parameter, the number of layers or the number of nodes in the neural network.

Furthermore, the image decoding method may further include decoding switch information indicating, as a filter to be used, one of a linear filter having a fixed parameter and the non-linear filter, and in the decoding of the image, a process to be used for decoding the image may be switched, according to the switch information, between the non-linear process using the non-linear filter and a linear process using the linear filter in at least one of the intra prediction, the inter prediction, and the in-loop filter.

For example, the switch information is intra_pred_type, inter_pred_type, or ilf_type, shown in FIG. 22. The linear process is at least one of the conventional intra prediction, inter prediction, and an in-loop filter in which the linear filter having a fixed parameter (such as a weighting factor) is used.

Thus, since switching is possible between the non-linear process and the linear process, a process having a high evaluation value, which is defined according to the amount of code and image distortion (image quality), can be selected so that both the amount of code and the image quality deterioration can be reduced.

Furthermore, the non-linear process may be associated with a mode among a plurality of modes, and in the decoding of the image, the image may be decoded using the non-linear process when the mode is specified.

Thus, when a mode such as nn_intra_pred_mode, nn_inter_pred_mode, and nn_ilf_mode shown in FIG. 22, for example, is specified, an appropriate non-linear process associated with the specified mode can be performed.

Furthermore, the image decoding method may further include decoding information indicating the specified mode.

Thus, as shown in FIG. 22 to FIG. 26, for example, the information indicating a mode is decoded, and therefore the image can be appropriately decoded according to the mode reported from the image encoding apparatus.

Furthermore, the image decoding method may further include switching the operation parameter for each image unit which is a block, a slice, a tile, a picture, or a group of pictures (GOP) included in the image, and in the decoding of the image, the image unit may be decoded by performing, on the image unit, the non-linear process using the non-linear filter having the switched operation parameter. For example, in the decoding of the operation parameter, the operation parameter corresponding to each of the plurality of non-linear filters and associated with a first identifier is decoded at least one of the leading sequence, the leading GOP, and the leading picture in the image, and in the decoding of the image, the image is decoded by specifying, for each image unit, the operation parameter by the first identifier and performing the non-linear process using the non-linear filter having the specified operation parameter.

For example, as shown in FIG. 16 to FIG. 18, for each image unit, the first identifier such as pps_nps_id or slice_nps_id specifies the operation parameter (nn_intra_pred_parameter_data( ), nn_inter_pred_parameter_data( ), or nn_ilf_parameter_data( )) that is associated with the same nps_id as the first identifier. With this, the operation parameter can be appropriately used for each image unit.

Furthermore, the image decoding method may further include decoding enabled/disabled information indicating whether the non-linear filter is enabled or disabled, and in the decoding of the image, the non-linear process may be performed when the enabled/disabled information indicates that the non-linear filter is enabled.

For example, the enabled/disabled information that is a flag such as nn_intra_pred_enabled_flag shown in FIG. 15 is decoded, and when the flag indicates that the non-linear filter is enabled, the non-linear process such as the NN intra prediction is performed. This allows the image decoding apparatus to omit a process for the operation parameter or the like when the enabled/disabled information indicates that the non-linear filter is disabled; thus, it is possible to decode the image easily.

Furthermore, the inversely transforming may include inverse transformation of the image from a frequency domain into a spatial domain, and a method for the inverse transformation may be switched according to whether the intra prediction or the inter prediction using the non-linear filter is performed and whether the intra prediction or the inter prediction using the linear filter is performed. For example, in the inverse transformation, when the intra prediction using the non-linear filter is performed, the method for the inverse transformation may be switched to a method using a variable transformation matrix, and the inverse transformation may be performed according to the method using the variable transformation matrix.

For example, as shown in FIG. 48, when the intra prediction using the non-linear filter (NN intra prediction) is performed, th transformation is performed by a method using a variable transformation matrix such as the inverse KL transformation, while, when the intra prediction using the linear filter (conventional intra prediction) is performed, the inverse fixed transformation is performed by inverse fixed transformation such as the inverse discrete cosine transform. Thus, when the non-linear process such as the NN intra prediction is performed, the inverse transformation suitable for the non-linear process can be performed, allowing for improvement in the encoding efficiency.

Furthermore, in the decoding of the image, when the block included in the image is of a size equal to or less than a predetermined size, the intra prediction using the non-linear filter may be performed on the block as the non-linear process, and when the block is of a size greater than the predetermined size, the intra prediction using a linear filter having a fixed parameter may be performed on the block.

For example, as shown in FIG. 45, the NN intra prediction is performed on the prediction block when the block (prediction block) included in the image is of a size of 4×4 pixels or less, and the fixed intra prediction is performed on the prediction block when the block is of a size greater than the size of 4×4 pixels. Thus, the amount of data of the operation parameter can be reduced while the degradation of the prediction performance is reduced, allowing for improvement in the encoding efficiency.

Furthermore, in the decoding of the image, the non-linear process may be performed on a luminance component of the image, and a linear process by which the input-output relationship becomes linear may be performed on a chrominance component of the image in at least one of the intra prediction, the inter prediction, and the in-loop filter.

For example, as shown in FIG. 45 to FIG. 47, the NN intra prediction, the NN inter prediction, or the NN in-loop filter is performed on the luminance component, and the fixed intra prediction, the fixed inter prediction or the fixed in-loop filter is performed on the chrominance component. Note that each of the fixed intra prediction, the fixed inter prediction, and the fixed in-loop filter is conventional inter prediction, intra prediction, or an in-loop filter which is performed using a linear filter having a fixed parameter. Thus, the amount of data of the operation parameter can be reduced while the reduction in the accuracy of prediction and the increase in noise are reduced, allowing for improvement in the encoding efficiency.

Furthermore, in the decoding of the operation parameter, a current operation parameter to be decoded may be decoded by referring to a previously decoded operation parameter different from the current operation parameter. Specifically, in the decoding of the operation parameter, the difference between the current operation parameter and the previously decoded operation parameter is decoded.

Thus, as shown in FIG. 65 to FIG. 67, for example, the operation parameter can be efficiently decoded.

Furthermore, the non-linear process may have a plurality of modes, and the previously decoded operation parameter may be a previously decoded operation parameter in the non-linear process in another mode different from the mode of the non-linear process for the current operation parameter.

Thus, as shown in Steps S595 and S599 in FIG. 67, for example, the operation parameter (weighting factor) can be efficiently decoded. Note that the weighting factor for input node m for node j in layer i in the reference mode in Step S595 is a previously decoded operation parameter.

Furthermore, the previously decoded operation parameter may be an operation parameter decoded immediately before the current operation parameter.

Thus, as shown in Steps S598 and S599 in FIG. 67, for example, the operation parameter (weighting factor) can be efficiently decoded. Note that the weighting factor for the immediately preceding input node in Step S598 is a previously decoded operation parameter.

Furthermore, in the decoding of the operation parameter, a current operation parameter to be decoded may be decoded by referring to a defined parameter which is defined in advance.

Thus, as shown in Steps S594 and S599 in FIG. 67, for example, the operation parameter (weighting factor) can be efficiently decoded. Note that the preset weighting factor for input node m for node j in layer i identified by the preset ID in Step S594 is the defined parameter which is defined in advance.

Furthermore, the image decoding method may further include decoding a second identifier, and in the decoding of the operation parameter, one parameter may be specified using the second identifier among a plurality of predetermined parameters, and the specified parameter may be referred to as the defined parameter.

For example, in Step S537 in FIG. 63, the preset ID is decoded as the second identifier. Thus, an appropriate defined parameter can be selected, allowing for more efficient decoding of the operation parameter.

Note that these general and specific aspects may be implemented using a system, a method, an apparatus, an integrated circuit, a computer program, or a computer-readable recording medium such as a CD-ROM, or any combination of systems, methods, apparatuses, integrated circuits, computer programs, and recording media.

Embodiment 7

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 71:
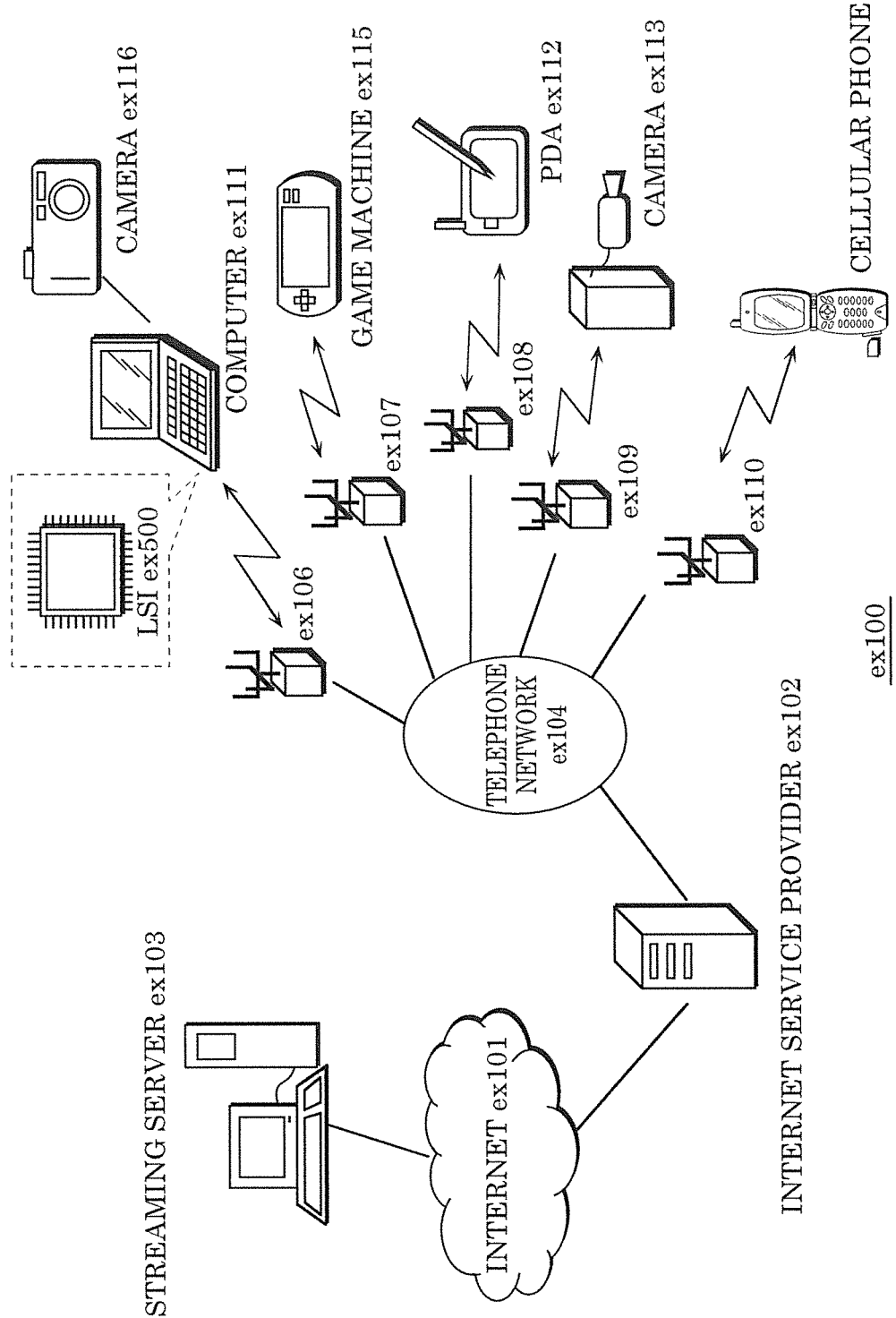
FIG. 71 shows an overall configuration of a content providing system for implementing content distribution services.

FIG. 71 illustrates an overall configuration of content providing system ex100 for implementing content distribution services. The area for providing communication services is divided into cells of desired size, and base stations ex106, ex107, ex108, ex109, and ex110 which are fixed wireless stations are placed in each of the cells.

Content providing system ex100 is connected to devices, such as computer ex111, personal digital assistant (PDA) ex112, camera ex113, cellular phone ex114 and game machine ex115, via Internet ex101, Internet service provider ex102, telephone network ex104, as well as base stations ex106 to ex110, respectively.

However, the configuration of content providing system ex100 is not limited to the configuration shown in FIG. 71, and a combination in which any of the elements are connected is acceptable. In addition, each device may be directly connected to telephone network ex104, rather than via base stations ex106 to ex110 which are the fixed wireless stations. Furthermore, the devices may be interconnected to each other via a short distance wireless communication and others.

Camera ex113, such as a digital video camera, is capable of capturing video. Camera ex116, such as a digital camera, is capable of capturing both still images and video. Furthermore, cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, cellular phone ex114 may be a Personal Handyphone System (PHS).

In content providing system ex100, streaming server ex103 is connected to camera ex113 and others via telephone network ex104 and base station ex109, which enables distribution of images of a live show and others. In such a distribution, a content (for example, video of a music live show) captured by the user using camera ex113 is encoded as described above in each of embodiments (i.e., the camera functions as the image encoding apparatus according to an aspect of the present disclosure), and the encoded content is transmitted to streaming server ex103. On the other hand, streaming server ex103 carries out stream distribution of the transmitted content data to the clients upon their requests. The clients include computer ex111, PDA ex112, camera ex113, cellular phone ex114, and game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by camera ex113 or streaming server ex103 that transmits the data, or the encoding processes may be shared between camera ex113 and streaming server ex103. Similarly, the distributed data may be decoded by the clients or streaming server ex103, or the decoding processes may be shared between the clients and streaming server ex103. Furthermore, the data of the still images and video captured by not only camera ex113 but also camera ex116 may be transmitted to streaming server ex103 through computer ex111. The encoding processes may be performed by camera ex116, computer ex111, or streaming server ex103, or shared among them.

Furthermore, the coding processes may be performed by LSI ex500 generally included in each of computer ex111 and the devices. LSI ex500 may be configured of a single chip or a plurality of chips. Software for coding video may be integrated into some type of a recording medium (such as a CD-ROM, a flexible disk, and a hard disk) that is readable by computer ex111 and others, and the coding processes may be performed using the software. Furthermore, when cellular phone ex114 is equipped with a camera, the video data obtained by the camera may be transmitted. The video data is data encoded by LSI ex500 included in cellular phone ex114.

Furthermore, streaming server ex103 may be composed of servers and computers, and may decentralize data and process the decentralized data, record, or distribute data.

As described above, the clients may receive and reproduce the encoded data in content providing system ex100. In other words, the clients can receive and decode information transmitted by the user, and reproduce the decoded data in real time in content providing system ex100, so that the user who does not have any particular right and equipment can implement personal broadcasting.

Figure 72:
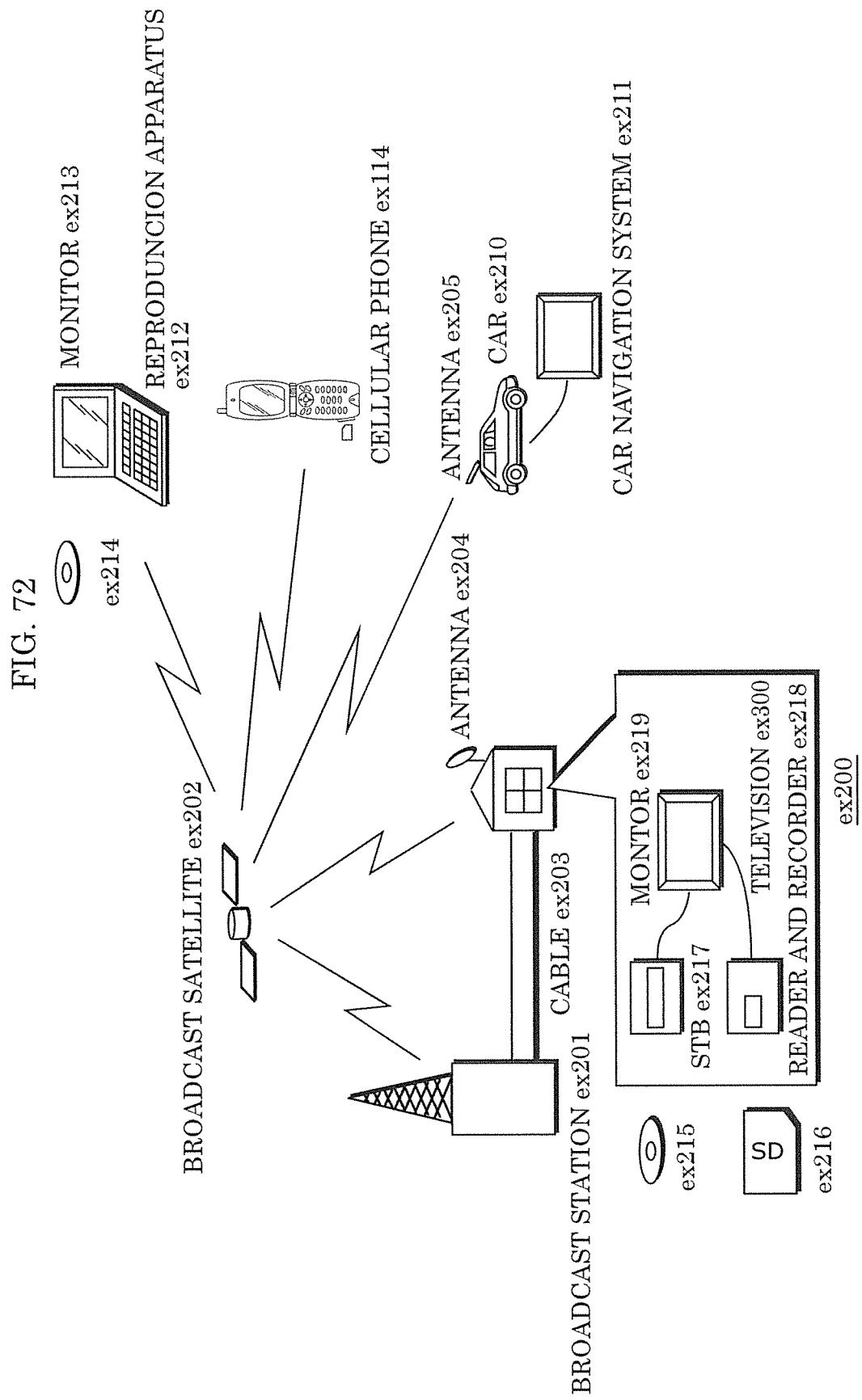
FIG. 72 shows an overall configuration of a digital broadcasting system.

Aside from the example of content providing system ex100, at least one of the moving picture coding apparatus (image coding apparatus) described in each of embodiments may be implemented in digital broadcasting system ex200 illustrated in FIG. 72. More specifically, broadcast station ex201 communicates or transmits, via radio waves to broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, broadcast satellite ex202 transmits radio waves for broadcasting. Then, home-use antenna ex204 with a satellite broadcast reception function receives the radio waves. Next, a device such as television (receiver) ex300 and set top box (STB) ex217 decodes the received multiplexed data, and reproduces the decoded data (i.e., functions as the image decoding apparatus according to an aspect of the present disclosure).

Furthermore, reader/recorder ex218 (i) reads and decodes the multiplexed data recorded on recording medium ex215, such as a DVD and a BD, or (i) encodes video signals in recording medium ex215, and in some cases, writes data obtained by multiplexing an audio signal on the encoded data. Reader/recorder ex218 can include the moving picture decoding apparatus or the moving picture encoding apparatus as shown in each of embodiments. In this case, the reproduced video signals are displayed on monitor ex219, and can be reproduced by another device or system using recording medium ex215 on which the multiplexed data is recorded. It is also possible to implement the moving picture decoding apparatus in set top box ex217 connected to cable ex203 for a cable television or to antenna ex204 for satellite and/or terrestrial broadcasting, so as to display the video signals on monitor ex219 of television ex300. The moving picture decoding apparatus may be implemented not in the set top box but in television ex300.

Figure 73:
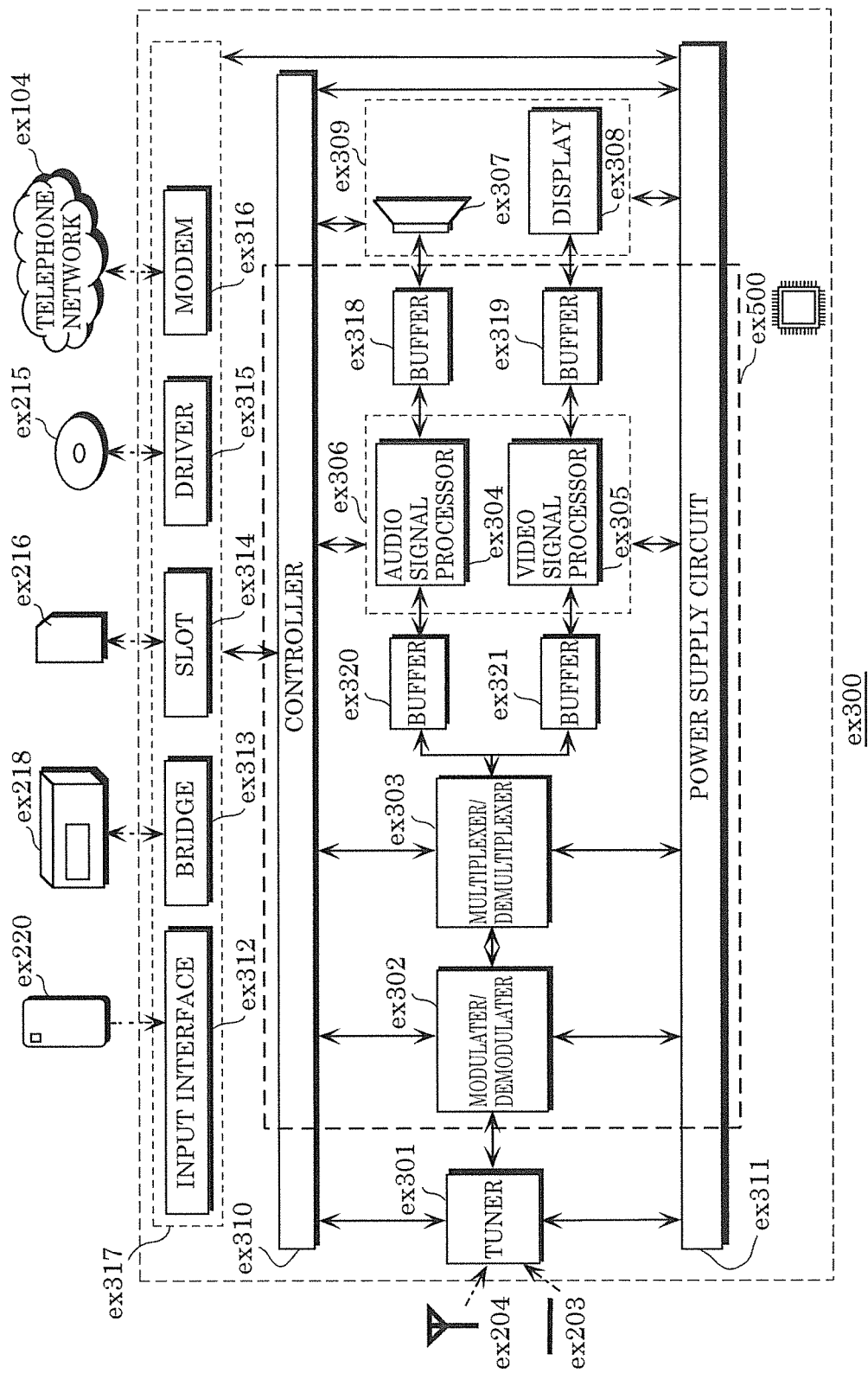
FIG. 73 shows a block diagram illustrating an example of a configuration of a television.

FIG. 73 illustrates television (receiver) ex300 that uses the moving picture encoding method and the moving picture decoding method described in each of embodiments. Television ex300 includes: tuner ex301 that obtains or provides multiplexed data obtained by multiplexing audio data onto video data, through antenna ex204 or cable ex203, etc. that receives a broadcast; modulator/demodulater ex302 that demodulates the received multiplexed data or modulates data into multiplexed data to be supplied outside; and multiplexer/demultiplexer ex303 that demultiplexes the modulated multiplexed data into video data and audio data, or multiplexes video data and audio data encoded by signal processor ex306 into data.

Television ex300 further includes: signal processor ex306 including audio signal processor ex304 and video signal processor ex305 that code each of audio data and video data, (which function as the image coding apparatus according to the aspects of the present disclosure); and output ex309 including speaker ex307 that provides the decoded audio signal, and display ex308 that displays the decoded video signal, such as a display. Furthermore, television ex300 includes interface ex317 including input interface ex312 that receives an input of a user operation. Furthermore, television ex300 includes controller ex310 that controls overall each constituent element of television ex300, and power supply circuit ex311 that supplies power to each of the elements. Other than input interface ex312, interface ex317 may include: bridge ex313 that is connected to an external device, such as reader/recorder ex218; slot ex314 for enabling attachment of recording medium ex216, such as an SD card; driver ex315 to be connected to an external recording medium, such as a hard disk; and modem ex316 to be connected to a telephone network. Here, recording medium ex216 can electrically record information using a non-volatile/volatile semiconductor memory element for storage. The constituent elements of television ex300 are connected to each other through a synchronous bus.

First, the configuration in which television ex300 decodes multiplexed data obtained from outside through antenna ex204 and others and reproduces the decoded data will be described. In television ex300, upon a user operation through remote controller ex220 and others, multiplexer/demultiplexer ex303 demultiplexes the multiplexed data demodulated by modulater/demodulater ex302, under control of controller ex310 including a CPU. Furthermore, audio signal processor ex304 decodes the demultiplexed audio data, and video signal processor ex305 decodes the demultiplexed video data, using the decoding method described in each of embodiments, in television ex300. Output ex309 provides the decoded video signal and audio signal outside, respectively. When output ex309 provides the video signal and the audio signal, the signals may be temporarily stored in buffers ex318 and ex319, and others so that the signals are reproduced in synchronization with each other. Furthermore, television ex300 may read multiplexed data not through a broadcast and others but from recording media ex215 and ex216, such as a magnetic disk, an optical disk, and a SD card. Next, a configuration in which television ex300 encodes an audio signal and a video signal, and transmits the data outside or writes the data on a recording medium will be described. In television ex300, upon a user operation through remote controller ex220 and others, audio signal processor ex304 encodes an audio signal, and video signal processor ex305 encodes a video signal, under control of controller ex310 using the encoding method described in each of embodiments. Multiplexer/demultiplexer ex303 multiplexes the encoded video signal and audio signal, and provides the resulting signal outside. When multiplexer/demultiplexer ex303 multiplexes the video signal and the audio signal, the signals may be temporarily stored in buffers ex320 and ex321, and others so that the signals are reproduced in synchronization with each other. Here, buffers ex318, ex319, ex320, and ex321 may be plural as illustrated, or at least one buffer may be shared in television ex300. Furthermore, data may be stored in a buffer so that the system overflow and underflow may be avoided between modulater/demodulater ex302 and multiplexer/demultiplexer ex303, for example.

Furthermore, television ex300 may include a configuration for receiving an AV input from a microphone or a camera other than the configuration for obtaining audio and video data from a broadcast or a recording medium, and may encode the obtained data. Although television ex300 can encode, multiplex, and provide outside data in the description, it may be capable of only receiving, decoding, and providing outside data but not the encoding, multiplexing, and providing outside data.

Furthermore, when reader/recorder ex218 reads or writes multiplexed data from or on a recording medium, one of television ex300 and reader/recorder ex218 may code the multiplexed data, and television ex300 and reader/recorder ex218 may share the coding partly.

Figure 74:
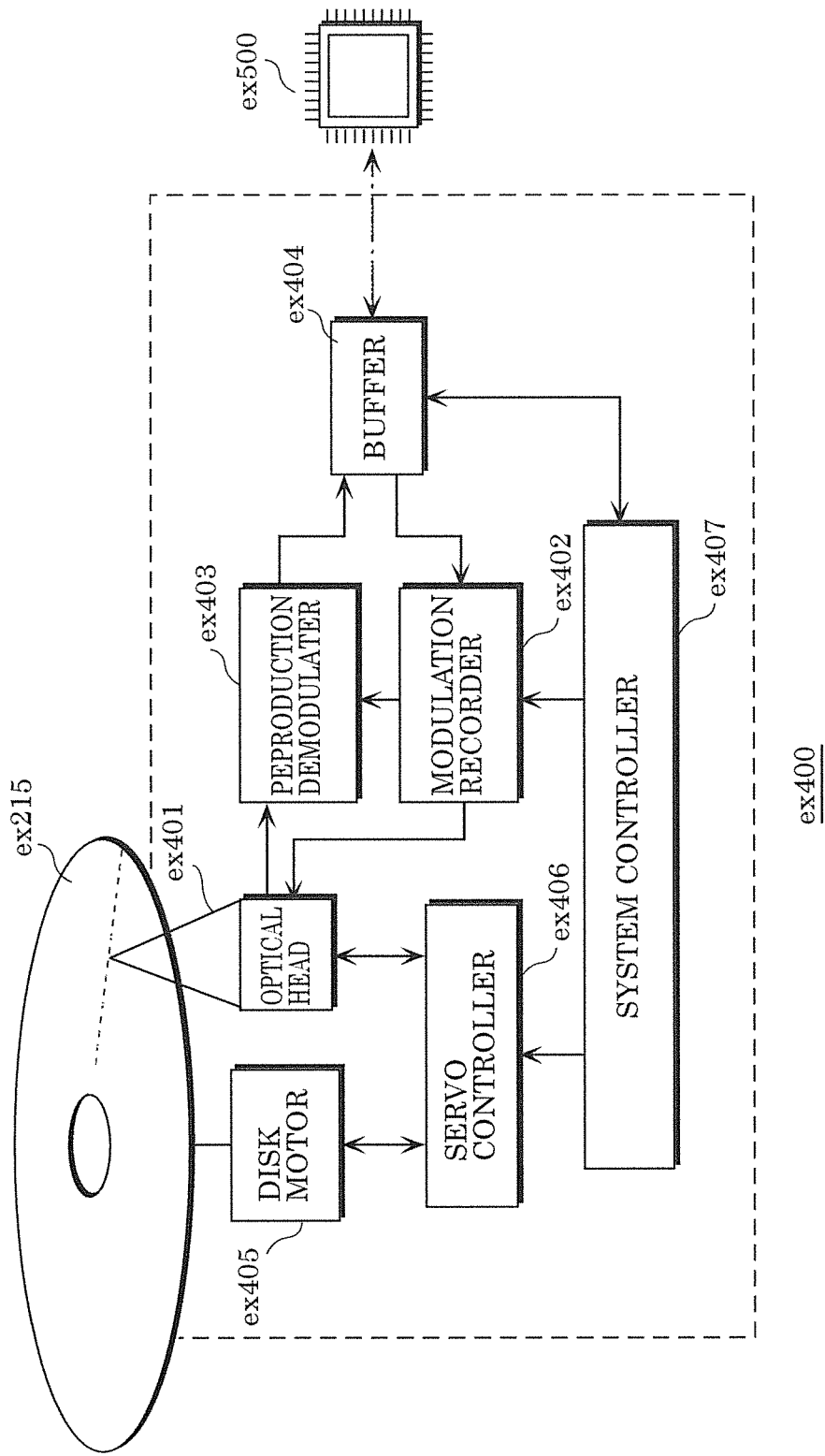
FIG. 74 shows a block diagram illustrating an example of a configuration of an information reproducer/recorder that reads and writes information from and on a recording medium that is an optical disk.

As an example, FIG. 74 illustrates a configuration of information reproducer/recorder ex400 when data is read or written from or on an optical disk. Information reproducer/recorder ex400 includes constituent elements ex401, ex402, ex403, ex404, ex405, ex406, and ex407 to be described hereinafter. Optical head ex401 irradiates a laser spot in a recording surface of recording medium ex215 that is an optical disk to write information, and detects reflected light from the recording surface of recording medium ex215 to read the information. Modulation recorder ex402 electrically drives a semiconductor laser included in optical head ex401, and modulates the laser light according to recorded data. Reproduction demodulater ex403 amplifies a reproduction signal obtained by electrically detecting the reflected light from the recording surface using a photo detector included in optical head ex401, and demodulates the reproduction signal by separating a signal component recorded on recording medium ex215 to reproduce the necessary information. Buffer ex404 temporarily holds the information to be recorded on recording medium ex215 and the information reproduced from recording medium ex215. Disk motor ex405 rotates recording medium ex215. Servo controller ex406 moves optical head ex401 to a predetermined information track while controlling the rotation drive of disk motor ex405 so as to follow the laser spot. System controller ex407 controls overall information reproducer/recorder ex400. The reading and writing processes can be implemented by system controller ex407 using various information stored in buffer ex404 and generating and adding new information as necessary, and by modulation recorder ex402, reproduction demodulater ex403, and servo controller ex406 that record and reproduce information through optical head ex401 while being operated in a coordinated manner. System controller ex407 includes, for example, a microprocessor, and executes processing by causing a computer to execute a program for read and write.

Although optical head ex401 irradiates a laser spot in the description, it may perform high-density recording using near field light.

Figure 75:
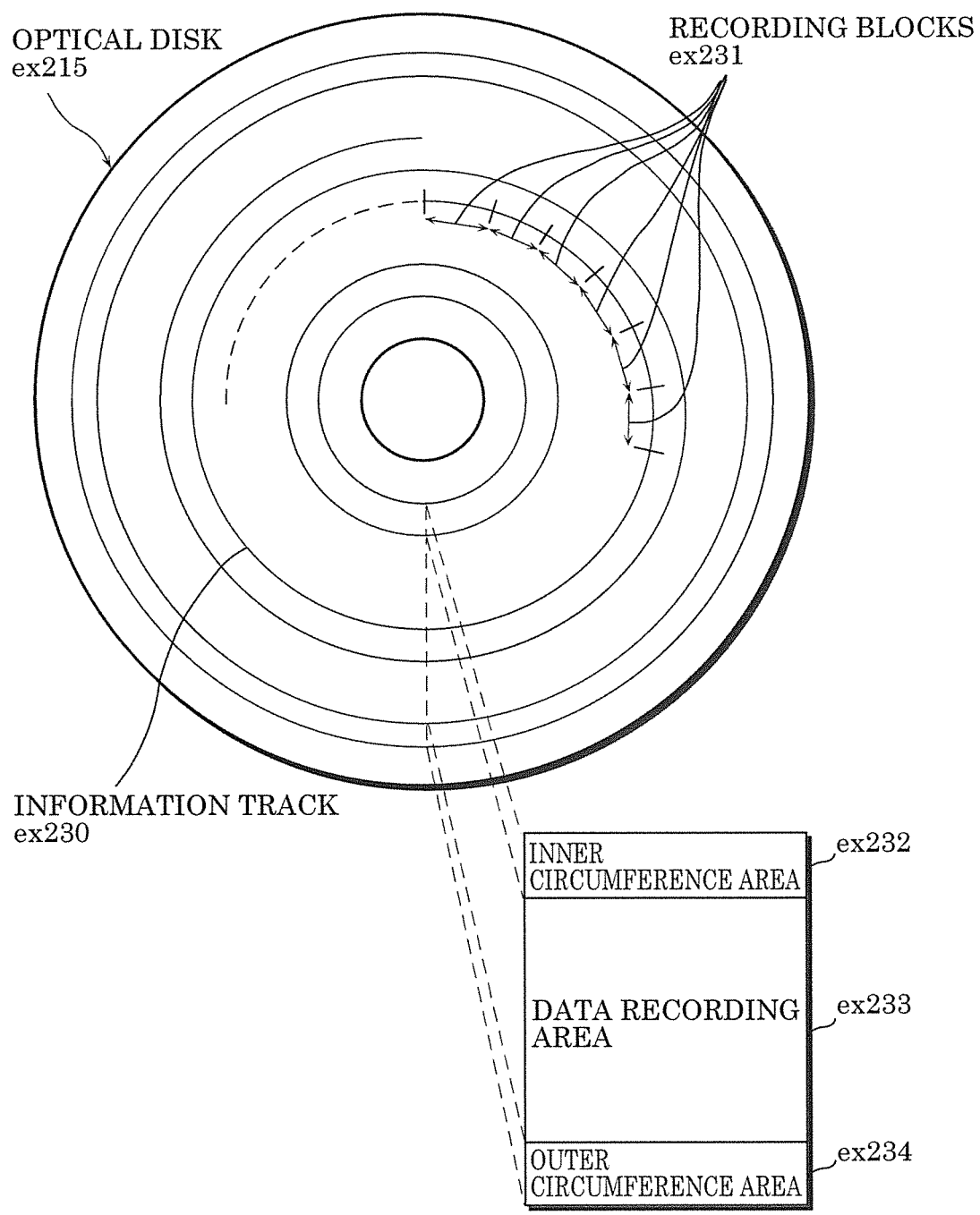
FIG. 75 shows an example of a configuration of a recording medium that is an optical disk.

FIG. 75 illustrates recording medium ex215 that is the optical disk. On the recording surface of recording medium ex215, guide grooves are spirally formed, and information track ex230 records, in advance, address information indicating an absolute position on the disk according to change in a shape of the guide grooves. The address information includes information for determining positions of recording blocks ex231 that are a unit for recording data. Reproducing information track ex230 and reading the address information in an apparatus that records and reproduces data can lead to determination of the positions of the recording blocks. Furthermore, recording medium ex215 includes data recording area ex233, inner circumference area ex232, and outer circumference area ex234. Data recording area ex233 is an area for use in recording the user data. Inner circumference area ex232 and outer circumference area ex234 that are inside and outside of data recording area ex233, respectively are for specific use except for recording the user data. The information reproducer/recorder 400 reads and writes encoded audio, encoded video data, or multiplexed data obtained by multiplexing the encoded audio and video data, from and on data recording area ex233 of recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, car ex210 having antenna ex205 can receive data from satellite ex202 and others, and reproduce video on a display device such as car navigation system ex211 set in car ex210, in digital broadcasting system ex200. Here, a configuration of car navigation system ex211 will be a configuration, for example, including a GPS receiver from the configuration illustrated in FIG. 73. The same will be true for the configuration of computer ex111, cellular phone ex114, and others.

Figure 76A:
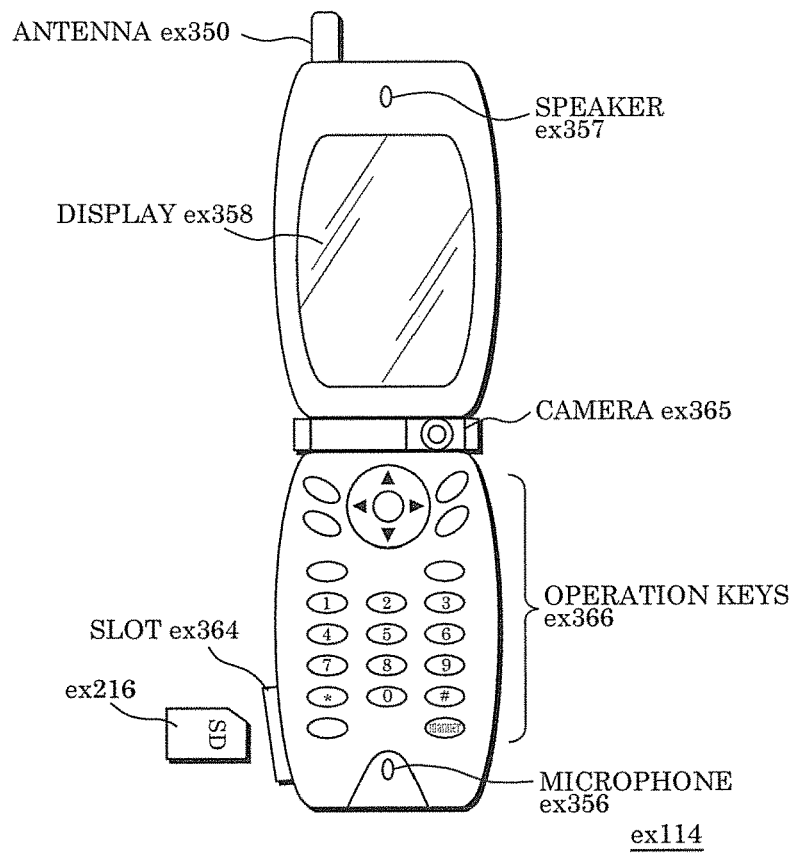
FIG. 76A shows an example of a cellular phone.

FIG. 76A illustrates cellular phone ex114 that uses the moving picture coding method described in embodiments. Cellular phone ex114 includes: antenna ex350 for transmitting and receiving radio waves through base station ex110; camera ex365 capable of capturing moving and still images; and display ex358 such as a liquid crystal display for displaying the data such as decoded video captured by camera ex365 or received by antenna ex350. Cellular phone ex114 further includes: a main body including operation keys ex366; speaker ex357 such as a speaker for output of audio; microphone ex356 such as a microphone for input of audio; memory ex367 for storing captured video or still pictures, recorded audio, coded data of the received video, the still pictures, e-mails, or others; and slot ex364 that is an interface for a recording medium that stores data in the same manner as memory ex367.

Figure 76B:
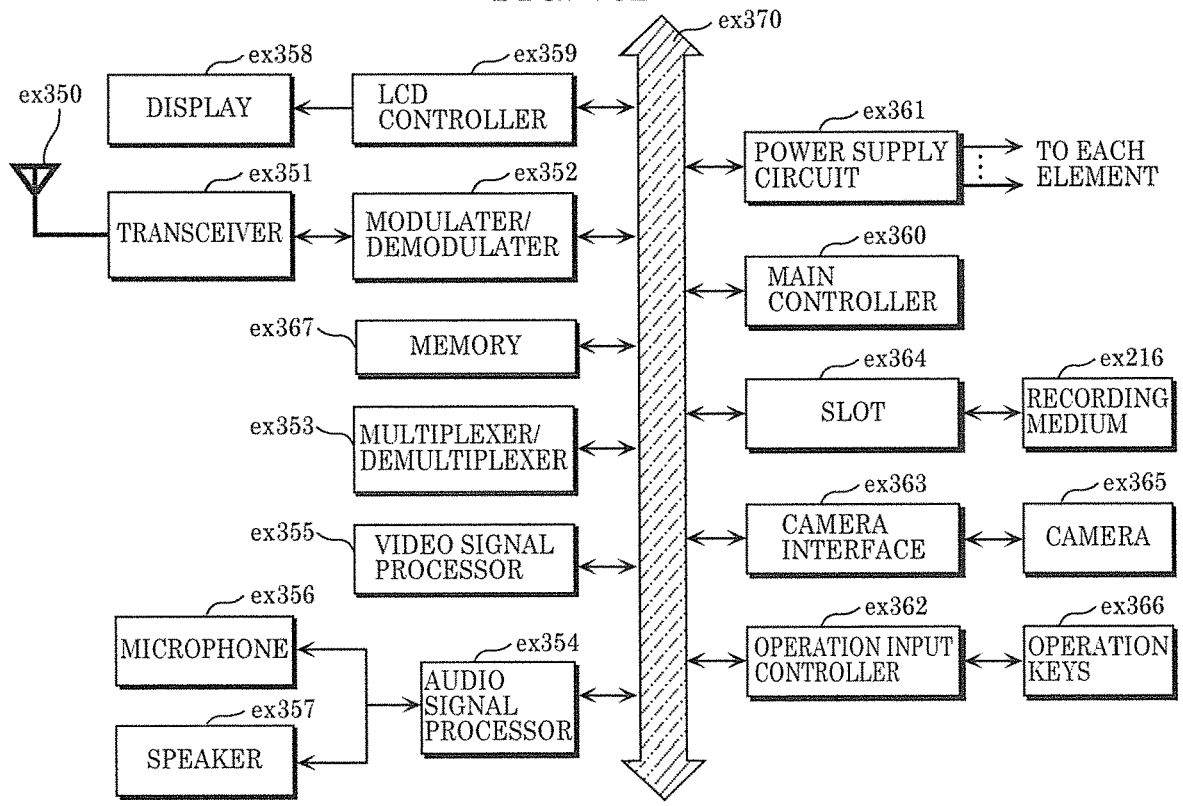
FIG. 76B is a block diagram showing an example of a configuration of a cellular phone.

Next, an example of a configuration of cellular phone ex114 will be described with reference to FIG. 76B. In cellular phone ex114, main controller ex360 designed to control overall each unit of the main body including display ex358 as well as operation keys ex366 is connected mutually, via synchronous bus ex370, to power supply circuit ex361, operation input controller ex362, video signal processor ex355, camera interface ex363, liquid crystal display (LCD) controller ex359, modulater/demodulater ex352, multiplexer/demultiplexer ex353, audio signal processor ex354, slot ex364, and memory ex367.

When a call-end key or a power key is turned ON by a user's operation, power supply circuit ex361 supplies the respective elements with power from a battery pack so as to activate cell phone ex114.

In cellular phone ex114, audio signal processor ex354 converts the audio signals collected by microphone ex356 in voice conversation mode into digital audio signals under the control of main controller ex360 including a CPU, ROM, and RAM. Then, modulater/demodulater ex352 performs spread spectrum processing on the digital audio signals, and transceiver ex351 performs digital-to-analog conversion and frequency conversion on the data, so as to transmit the resulting data via antenna ex350. Also, in cellular phone ex114, transceiver ex351 amplifies the data received by antenna ex350 in voice conversation mode and performs frequency conversion and the analog-to-digital conversion on the data. Then, modulator/demodulater ex352 performs inverse spread spectrum processing on the data, and audio signal processor ex354 converts it into analog audio signals, so as to output them via speaker ex357.

Furthermore, when an e-mail in data communication mode is transmitted, text data of the e-mail inputted by operating operation keys ex366 and others of the main body is sent out to main controller ex360 via operation input controller ex362. Main controller ex360 causes modulater/demodulater ex352 to perform spread spectrum processing on the text data, and transceiver ex351 performs the digital-to-analog conversion and the frequency conversion on the resulting data to transmit the data to base station ex110 via antenna ex350. When an e-mail is received, processing that is approximately inverse to the processing for transmitting an e-mail is performed on the received data, and the resulting data is provided to display ex358.

When video, still images, or video and audio in data communication mode is or are transmitted, video signal processor ex355 compresses and encodes video signals supplied from camera ex365 using the moving picture encoding method shown in each of embodiments (i.e., functions as the image encoding apparatus according to the aspect of the present disclosure), and transmits the encoded video data to multiplexer/demultiplexer ex353. In contrast, during when camera ex365 captures video, still images, and others, audio signal processor ex354 encodes audio signals collected by microphone ex356, and transmits the encoded audio data to multiplexer/demultiplexer ex353.

Multiplexer/demultiplexer ex353 multiplexes the encoded video data supplied from video signal processor ex355 and the encoded audio data supplied from audio signal processor ex354, using a predetermined method. Then, modulater/demodulater (modulation/demodulation circuit) ex352 performs spread spectrum processing on the multiplexed data, and transceiver ex351 performs digital-to-analog conversion and frequency conversion on the data so as to transmit the resulting data via antenna ex350.

When receiving data of a video file which is linked to a Web page and others in data communication mode or when receiving an e-mail with video and/or audio attached, in order to decode the multiplexed data received via antenna ex350, multiplexer/demultiplexer ex353 demultiplexes the multiplexed data into a video data bit stream and an audio data bit stream, and supplies video signal processor ex355 with the encoded video data and audio signal processor ex354 with the encoded audio data, through synchronous bus ex370. Video signal processor ex355 decodes the video signal using a moving picture decoding method corresponding to the moving picture encoding method shown in each of embodiments (i.e., functions as the image decoding apparatus according to the aspect of the present disclosure), and then display ex358 displays, for instance, the video and still images included in the video file linked to the Web page via LCD controller ex359. Furthermore, audio signal processor ex354 decodes the audio signal, and speaker ex357 provides the audio.

Furthermore, similarly to television ex300, a terminal such as cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 8

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 77 illustrates a structure of the multiplexed data. As illustrated in FIG. 77, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 78:
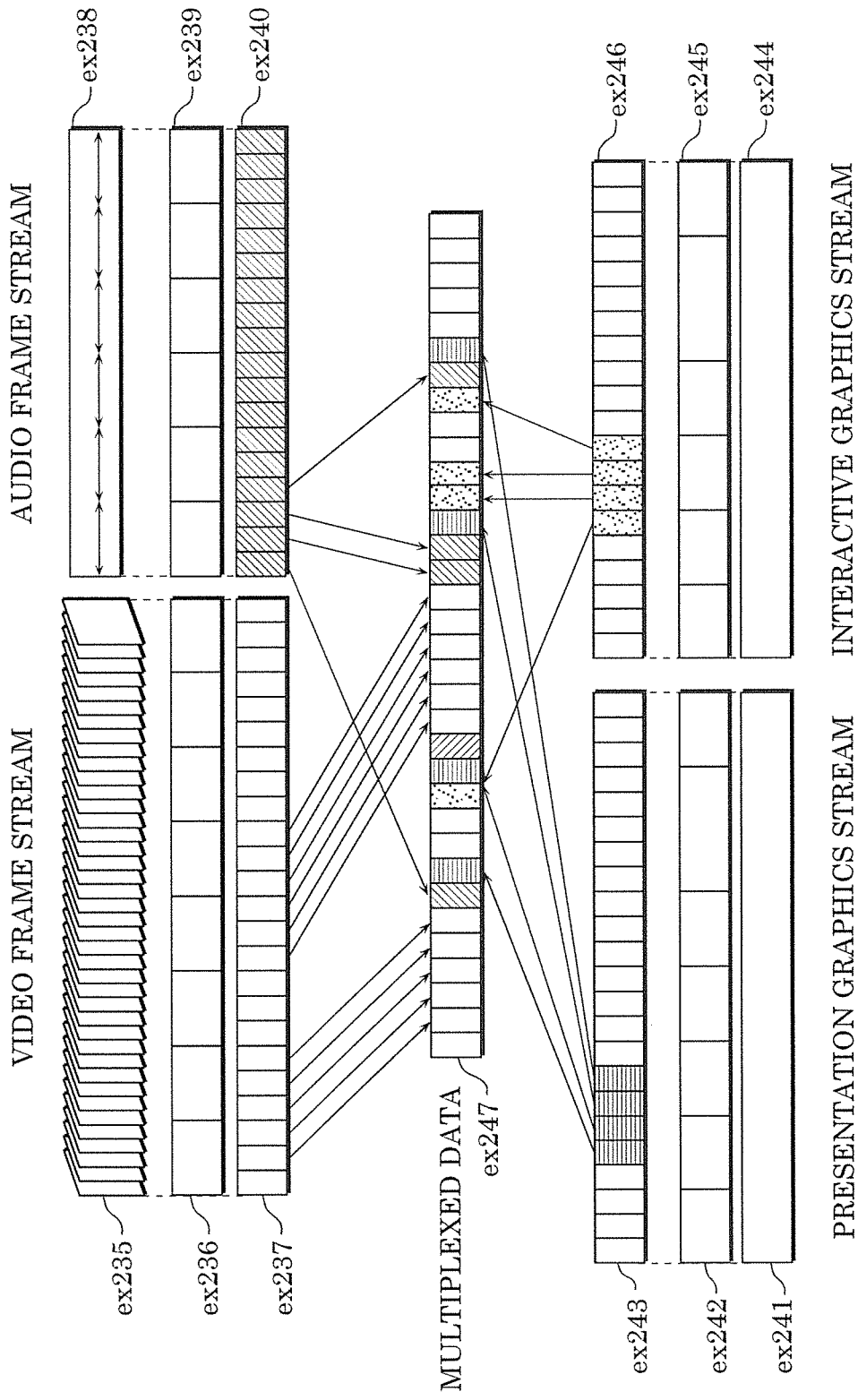
FIG. 78 schematically shows how each stream is multiplexed in multiplexed data.

FIG. 78 schematically illustrates how data is multiplexed. First, video stream ex235 composed of video frames and audio stream ex238 composed of audio frames are transformed into a stream of PES packets ex236 and a stream of PES packets ex239, and further into TS packets ex237 and TS packets ex240, respectively. Similarly, data of presentation graphics stream ex241 and data of interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 79:
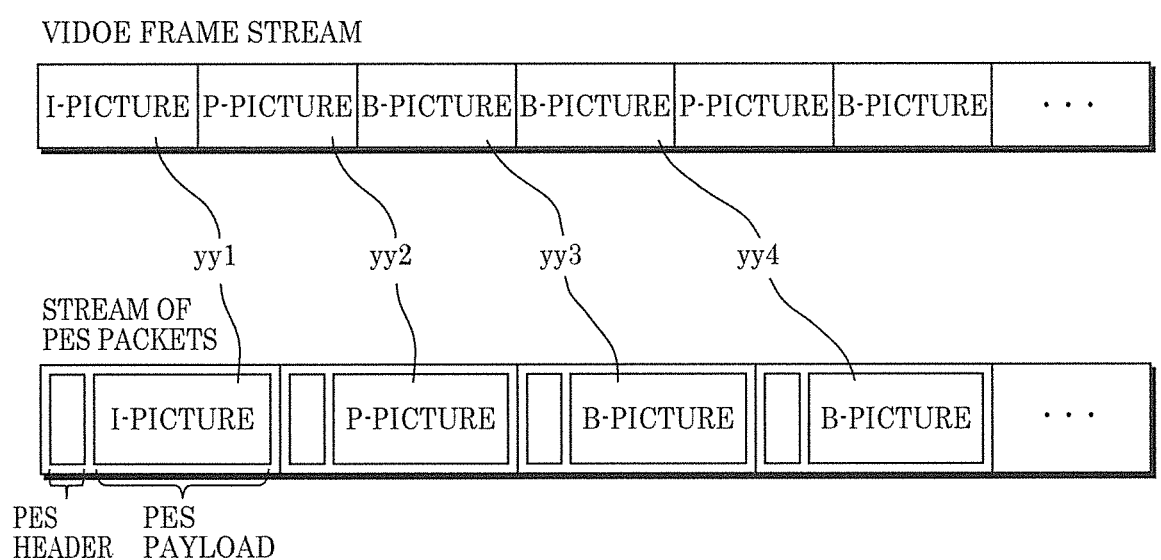
FIG. 79 shows how a video stream is stored in a stream of PES packets in more detail.

FIG. 79 illustrates how a video stream is stored in a stream of PES packets in more detail. The first bar in FIG. 79 shows a video frame stream in a video stream. The second bar shows the stream of PES packets. As indicated by arrows denoted as yy1, yy2, yy3, and yy4 in FIG. 79, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 80:
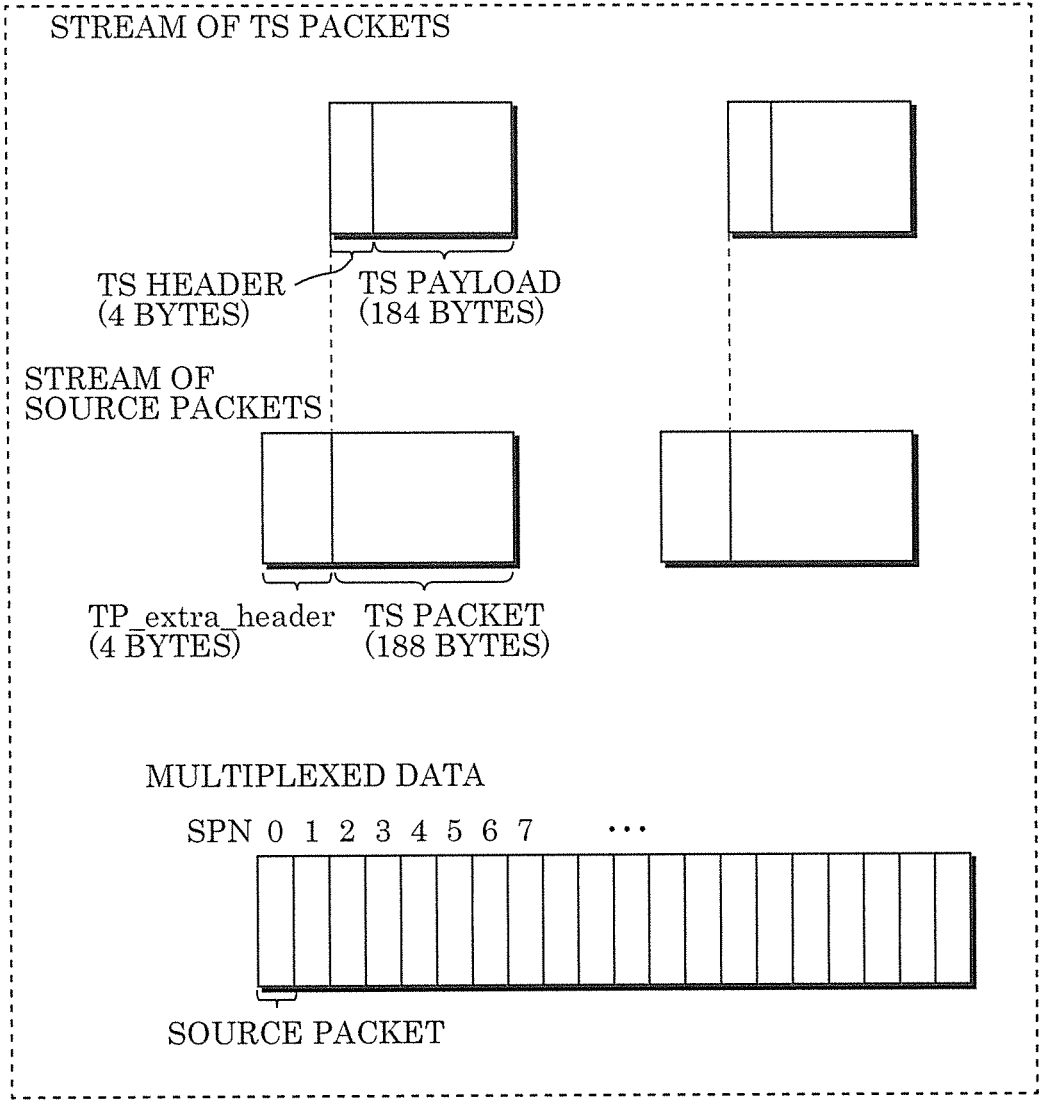
FIG. 80 shows a structure of TS packets and source packets in the multiplexed data.

FIG. 80 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 80. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 81:
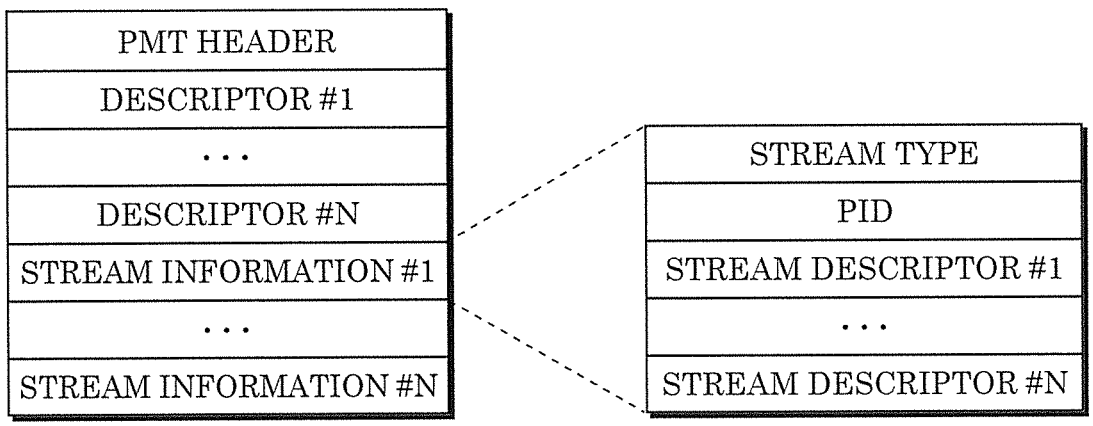
FIG. 81 shows a data structure of a PMT.

FIG. 81 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 82:
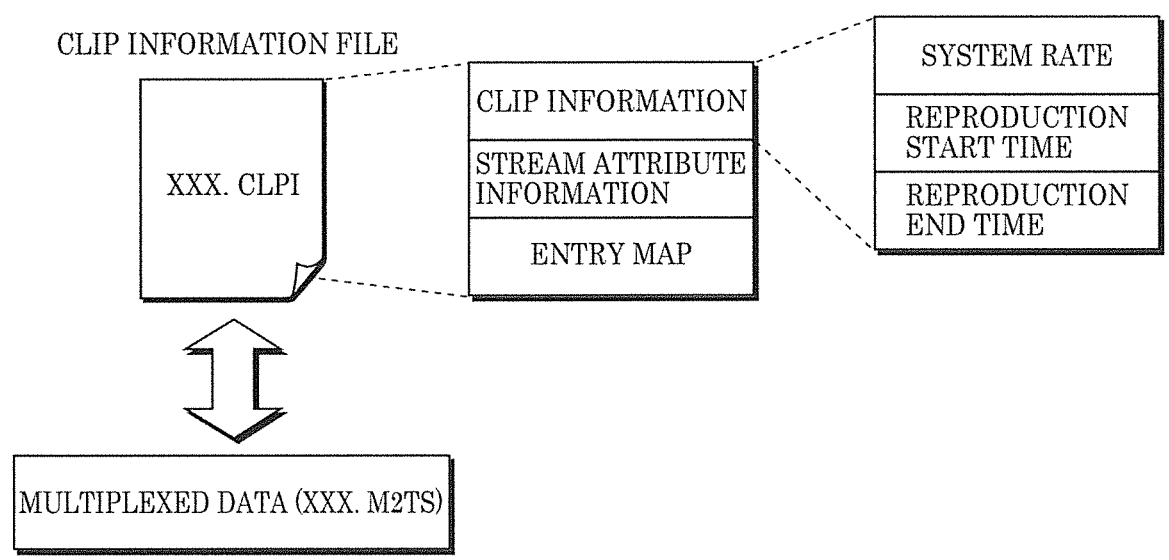
FIG. 82 shows an internal structure of multiplexed data information.

Each of the multiplexed data information files is management information of the multiplexed data as shown in FIG. 82. The multiplexed data information files are in one to one correspondence with the multiplexed data, and each of the files includes multiplexed data information, stream attribute information, and an entry map.

As illustrated in FIG. 82, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 83:
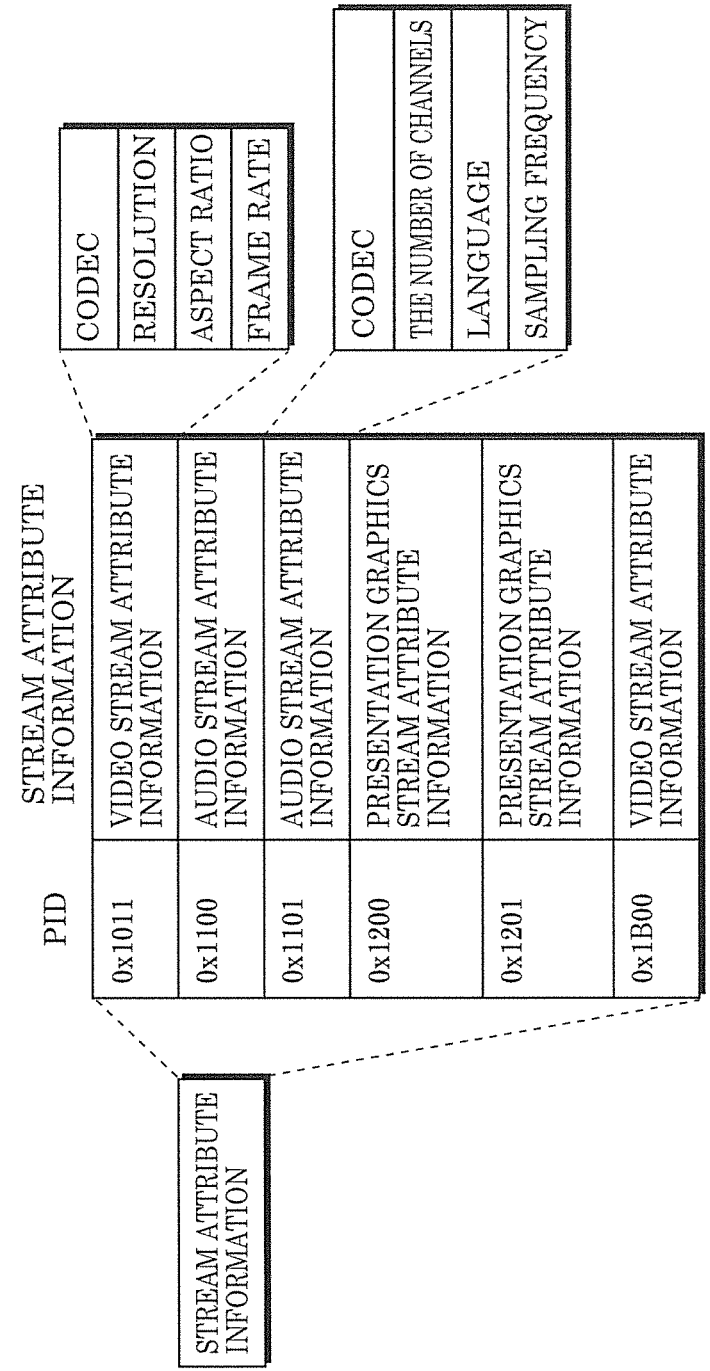
FIG. 83 shows an internal structure of stream attribute information.

As shown in FIG. 83, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or an element for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 84:
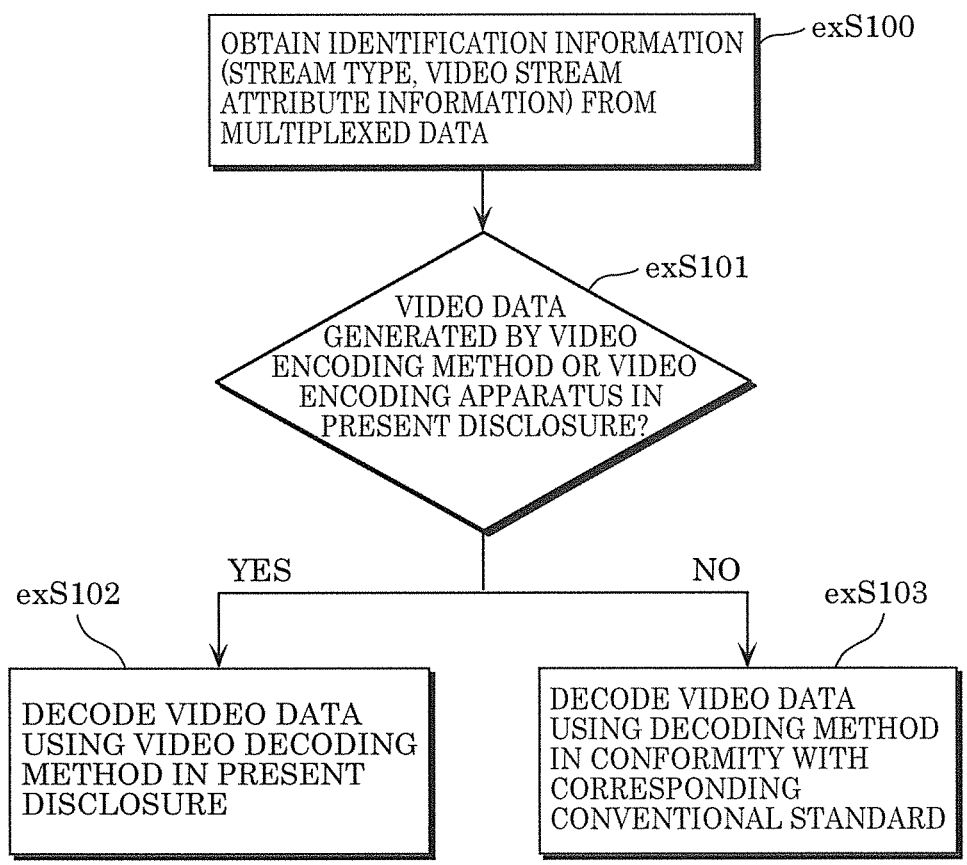
FIG. 84 shows steps for identifying video data.

Furthermore, FIG. 84 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 9

Figure 85:
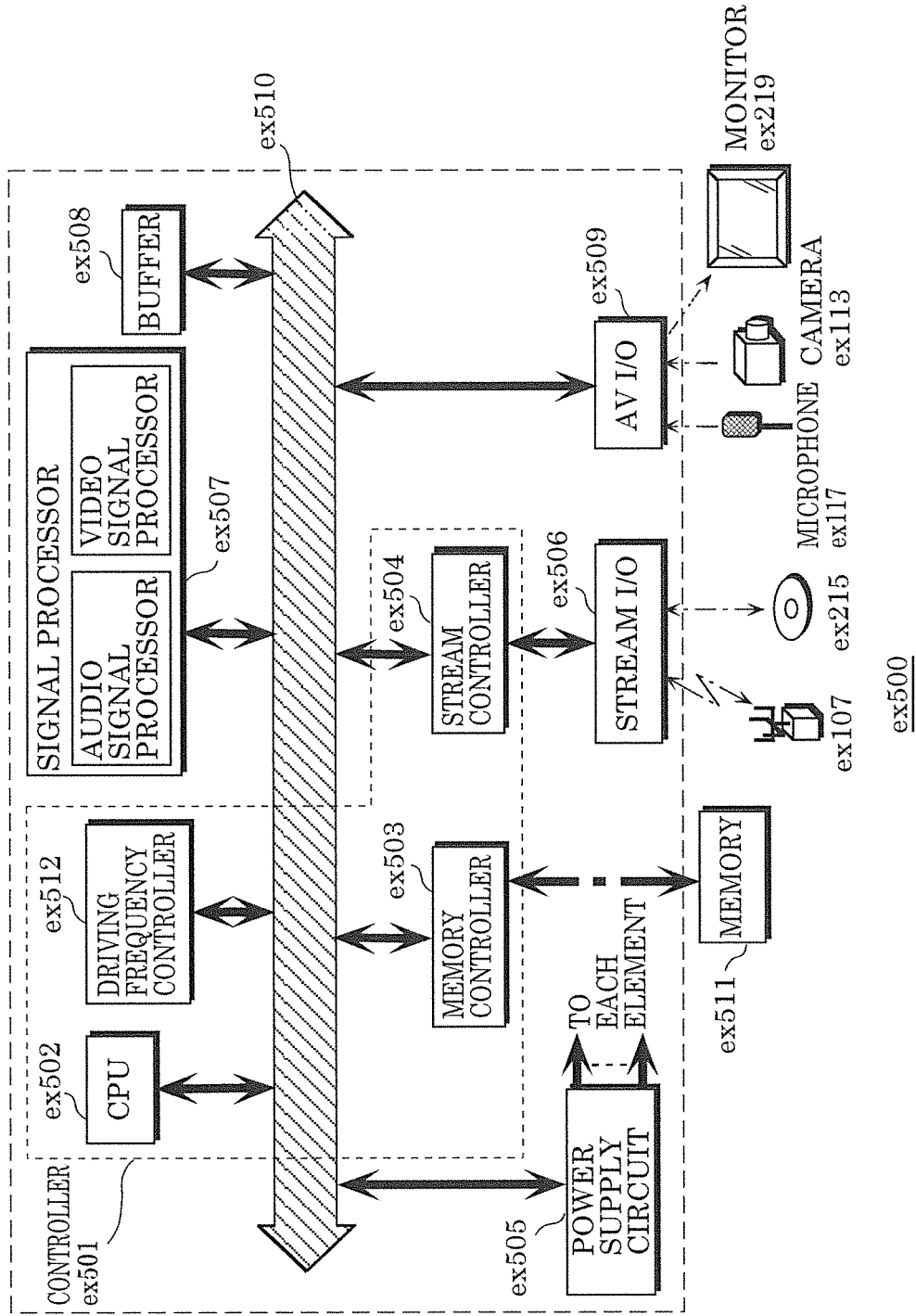
FIG. 85 is a block diagram showing an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 85 illustrates a configuration of LSI ex500 that is made into one chip. LSI ex500 includes elements ex501, ex502, ex503, ex504, ex505, ex506, ex507, ex508, and ex509 to be described below, and the elements are connected to each other through bus ex510. Power supply circuit ex505 is activated by supplying each of the elements with power when power supply circuit ex505 is turned on.

For example, when encoding is performed, LSI ex500 receives an AV signal from microphone ex117, camera ex113, and others through AV IO ex509 under control of controller ex501 including CPU ex502, memory controller ex503, stream controller ex504, and driving frequency controller ex512. The received AV signal is temporarily stored in external memory ex511, such as an SDRAM. Under control of controller ex501, the stored data is segmented into data portions according to the processing amount and speed to be transmitted to signal processor ex507. Then, signal processor ex507 encodes an audio signal and/or a video signal. Here, the encoding of the video signal is the encoding described in each of embodiments. Furthermore, signal processor ex507 sometimes multiplexes the encoded audio data and the encoded video data, and stream IO ex506 provides the multiplexed data outside. The provided multiplexed data is transmitted to base station ex107, or written on recording medium ex215. When data sets are multiplexed, the data should be temporarily stored in buffer ex508 so that the data sets are synchronized with each other.

Although memory ex511 is an element outside LSI ex500, it may be included in LSI ex500. Buffer ex508 is not limited to one buffer, but may be composed of buffers. Furthermore, LSI ex500 may be made into one chip or a plurality of chips.

Furthermore, although controller ex501 includes CPU ex502, memory controller ex503, stream controller ex504, driving frequency controller ex512, configuration of controller ex501 is not limited to such. For example, signal processor ex507 may further include a CPU. Inclusion of another CPU in signal processor ex507 can improve the processing speed. Furthermore, as another example, CPU ex502 may serve as or be a part of signal processor ex507, and, for example, may include an audio signal processor. In such a case, controller ex501 includes signal processor ex507 or CPU ex502 including a part of signal processor ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 10

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, LSI ex500 needs to be set to a driving frequency higher than that of CPU ex502 to be used when video data in conformity with the conventional standard is decoded. However, there is a problem that the power consumption increases when the driving frequency is set higher.

Figure 86:
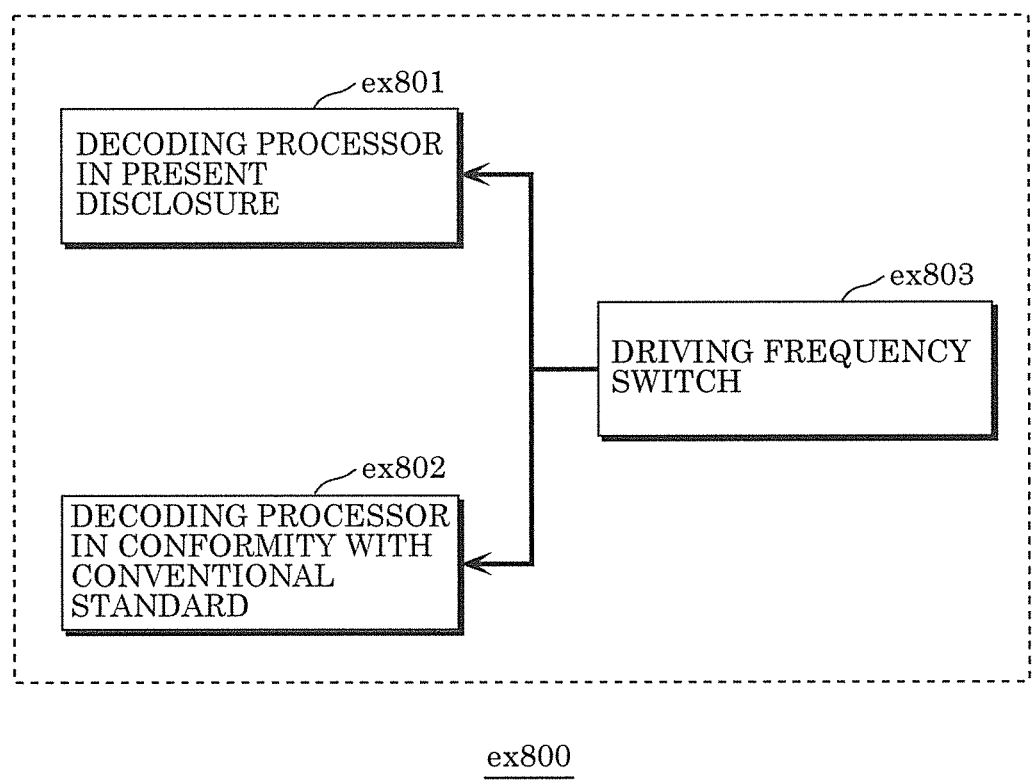
FIG. 86 shows a configuration for switching between driving frequencies.

In order to solve the problem, the moving picture decoding apparatus, such as television ex300 and LSI ex500 is configured to determine to which standard the video data conforms, and switch between the driving frequencies according to the determined standard. FIG. 86 illustrates configuration ex800 in the present embodiment. Driving frequency switch ex803 sets a driving frequency to a higher driving frequency when video data is generated by the moving picture encoding method or the moving picture encoding apparatus described in each of embodiments. Then, driving frequency switch ex803 instructs decoding processor ex801 that executes the moving picture decoding method described in each of embodiments to decode the video data. When the video data conforms to the conventional standard, driving frequency switch ex803 sets a driving frequency to a lower driving frequency than that of the video data generated by the moving picture encoding method or the moving picture encoding apparatus described in each of embodiments. Then, driving frequency switch ex803 instructs decoding processor ex802 that conforms to the conventional standard to decode the video data.

More specifically, driving frequency switch ex803 includes CPU ex502 and driving frequency controller ex512 in FIG. 85. Here, each of decoding processor ex801 that executes the moving picture decoding method described in each of embodiments and decoding processor ex802 that conforms to the conventional standard corresponds to signal processor ex507 in FIG. 85. CPU ex502 determines to which standard the video data conforms. Then, driving frequency controller ex512 determines a driving frequency based on a signal from CPU ex502. Furthermore, signal processor ex507 decodes the video data based on the signal from CPU ex502. For example, the identification information described in Embodiment 8 is probably used for identifying the video data. The identification information is not limited to the one described in Embodiment 8 but may be any information as long as the information indicates to which standard the video data conforms. For example, when which standard video data conforms to can be determined based on an external signal for determining that the video data is used for a television or a disk, etc., the determination may be made based on such an external signal. Furthermore, CPU ex502 selects a driving frequency based on, for example, a look-up table in which the standards of the video data are associated with the driving frequencies as shown in FIG. 88. The driving frequency can be selected by storing the look-up table in buffer ex508 and in an internal memory of an LSI, and with reference to the look-up table by CPU ex502.

Figure 87:
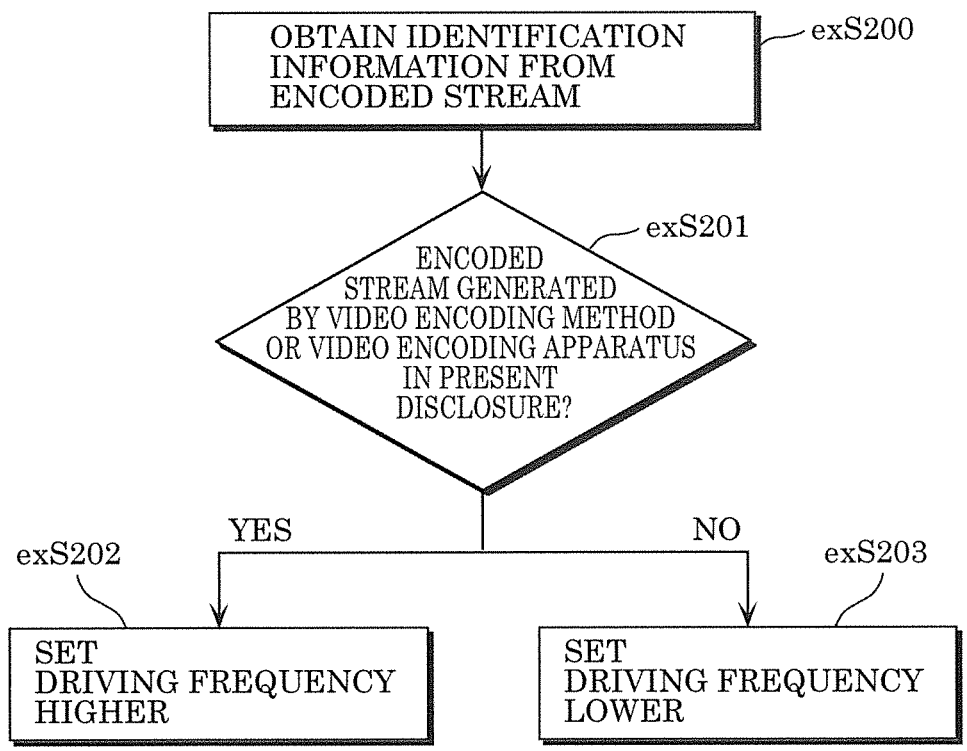
FIG. 87 shows steps for identifying video data and switching between driving frequencies.

FIG. 87 illustrates steps for executing a method in the present embodiment. First, in Step exS200, signal processor ex507 obtains identification information from the multiplexed data. Next, in Step exS201, CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, CPU ex502 transmits a signal for setting the driving frequency to a higher driving frequency to driving frequency controller ex512. Then, driving frequency controller ex512 sets the driving frequency to the higher driving frequency. On the other hand, when the identification information indicates that the video data conforms to the conventional standard, such as MPEG-2, MPEG-4 AVC, and VC-1, in Step exS203, CPU ex502 transmits a signal for setting the driving frequency to a lower driving frequency to driving frequency controller ex512. Then, driving frequency controller ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to LSI ex500 or an apparatus including LSI ex500. For example, when the driving frequency is set lower, the voltage to be applied to LSI ex500 or the apparatus including LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to LSI ex500 or the apparatus including LSI ex500 is probably set higher. When the identification information indicates that the video data conforms to the conventional standard, such as MPEG-2, MPEG-4 AVC, and VC-1, the voltage to be applied to LSI ex500 or the apparatus including LSI ex500 is probably set lower. As another example, when the identification information indicates that the video data is generated by the moving picture encoding method and the moving picture encoding apparatus described in each of embodiments, the driving of CPU ex502 does not probably have to be suspended. When the identification information indicates that the video data conforms to the conventional standard, such as MPEG-2, MPEG-4 AVC, and VC-1, the driving of CPU ex502 is probably suspended at a given time because CPU ex502 has extra processing capacity. Even when the identification information indicates that the video data is generated by the moving picture encoding method and the moving picture encoding apparatus described in each of embodiments, in the case where CPU ex502 has extra processing capacity, the driving of CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when LSI ex500 or the apparatus including LSI ex500 is driven using a battery, the battery life can be extended with the power conservation effect.

Embodiment 11

There are cases where a plurality of video data that conforms to different standards, is provided to the devices and systems, such as a television and a cellular phone. In order to enable decoding the plurality of video data that conforms to the different standards, signal processor ex507 of LSI ex500 needs to conform to the different standards. However, the problems of increase in the scale of the circuit of LSI ex500 and increase in the cost arise with the individual use of signal processors ex507 that conform to the respective standards.

In order to solve the problem, what is conceived is a configuration in which the decoding processor for implementing the moving picture decoding method described in each of embodiments and the decoding processor that conforms to the conventional standard, such as MPEG-2, MPEG-4 AVC, and VC-1 are partly common. Ex900 in FIG. 89A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be common probably include use of decoding processor ex902 that conforms to MPEG-4 AVC. In contrast, unique decoding processor ex901 is probably used for other processing which is unique to an aspect of the present disclosure and does not conform to MPEG-4 AVC. The decoding processor for implementing the moving picture decoding method described in each of embodiments may be common for the processing to be common, and a dedicated decoding processor may be used for processing unique to that of MPEG-4 AVC.

Furthermore, ex1000 in FIG. 89B shows another example in that processing is partly common. This example uses a configuration including unique decoding processor ex1001 that supports the processing unique to an aspect of the present disclosure, unique decoding processor ex1002 that supports the processing unique to another conventional standard, and decoding processor ex1003 that supports processing to be common between the moving picture decoding method according to the aspect of the present disclosure and the conventional moving picture decoding method. Here, unique decoding processors ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by LSI ex500.

As such, reducing the scale of the circuit of an LSI and reducing the cost are possible by sharing the decoding processor for the processing to be common between the moving picture decoding method according to the aspect of the present disclosure and the moving picture decoding method in conformity with the conventional standard.

INDUSTRIAL APPLICABILITY

The present disclosure produces an advantageous effect of efficiently encoding an image, and can be used, for example, in information display devices or imaging devices such as a television, a digital video recorder, a car navigation system, a cellular phone, a digital camera, and a digital video camera, and thus is useful.

REFERENCE MARKS IN THE DRAWINGS

100, 300, 500 image encoding apparatus
101 block divider
102 subtractor
103, 103A transformer
103Aa KL transformer
103Ab fixed transformer
104 quantizer
105 variable-length encoder
106 inverse transformer
107 inverse quantizer
108 adder
109, 109A NN parameter determiner
109a, 109Aa NN intra prediction parameter determiner
109b, 109Ab NN inter prediction parameter determiner
109c, 109Ac NN in-loop filter parameter determiner
110 intra predictor
110a NN intra predictor
110b fixed intra predictor
111 inter predictor
111a NN inter predictor
111b fixed inter predictor
112 frame memory
113 in-loop filter
113a NN in-loop filter
113b fixed in-loop filter
115 NN processing switcher
120 NN parameter encoder
200, 400, 600 image decoding apparatus
201 variable-length decoder
202 inverse quantizer
203, 203A inverse transformer
203Aa inverse KL transformer
203Ab inverse fixed transformer
204 adder
205 intra compensator
205a NN intra compensator
205b fixed intra compensator
206 inter compensator
206a NN inter compensator
206b fixed inter compensator
207 frame memory
208 in-loop filter
208a NN in-loop filter
208b fixed in-loop filter
210 NN processing switcher
220 NN parameter decoder

The invention claimed is:

1. An image encoding method, comprising:
transforming a picture on a block basis;
reconstructing, using an in-loop filter, the block transformed;
predicting the block reconstructed, using intra prediction in which a pixel in the picture is used or inter prediction in which a pixel in another picture is used;
encoding an image including the block by performing, in at least one of the intra prediction, the inter prediction, and the in-loop filter, a filter process that includes a neural network;
encoding switch information indicating, as a filter to be used, one of a linear filter having a fixed parameter and a non-linear filter; and
encoding enabled/disabled information indicating whether the non-linear filter is enabled or disabled,
wherein in the encoding of the image,
a process to be used for encoding the image is switched, according to the switch information, between a non-linear process using the non-linear filter and a linear process using the linear filter in at least one of the intra prediction, the inter prediction, and the in-loop filter, and
the non-linear process is performed when the enabled/disabled information indicates that the non-linear filter is enabled.

2. The image encoding method according to claim 1, wherein the non-linear process is a process by which an input-output relationship becomes non-linear, and information indicating an operation parameter of the non-linear filter to be used in the non-linear process is encoded.

3. The image encoding method according to claim 2,
wherein in the encoding of the operation parameter,
a weighting factor between nodes included in the neural network is encoded as the operation parameter.

4. The image encoding method according to claim 3,
wherein the encoding of the operation parameter further includes
encoding a total number of layers or a total number of nodes in the neural network as the operation parameter.

5. The image encoding method according to claim 4,
wherein in the encoding of the image,
a maximum number of layers or a maximum number of nodes in the neural network is defined according to a profile of the image to be encoded, and the non-linear process is performed using the neural network that has no more than the maximum number of layers or no more than the maximum number of nodes.

6. The image encoding method according to claim 2, further comprising
switching the operation parameter for each image unit which is a block, a slice, a tile, a picture, or a group of pictures (GOP) included in the image,
wherein in the encoding of the image,
the image unit is encoded by performing, on the image unit, the non-linear process using the non-linear filter having the operation parameter switched.

7. The image encoding method according to claim 2, further comprising:
classifying each block included in the image as one of a plurality of classes according to a feature of the block; and
determining the operation parameter for each class through learning using, as training data, at least one block classified as the class and a neighboring pixel of the at least one block.

8. The image encoding method according to claim 7,
wherein in the determining of the operation parameter,
the operation parameter is determined through learning using only a region of the image that is more complex than a predetermined criterion.

9. The image encoding method according to claim 2,
wherein in the transforming, the image is transformed from a spatial domain into a frequency domain, and
when the intra prediction using the non-linear filter is performed, a method for the transformation is switched to a method using a variable transformation matrix, and the transformation is performed according to the method using the variable transformation matrix.

10. The image encoding method according to claim 2,
wherein in the encoding of the image,
when the block included in the image is of a size equal to or less than a predetermined size, the intra prediction using the non-linear filter is performed on the block as the non-linear process, and
when the block is of a size greater than the predetermined size, the intra prediction using a linear filter having a fixed parameter is performed on the block.

11. The image encoding method according to claim 2,
wherein in the encoding of the image,
the non-linear process is performed on a luminance component of the image, and a linear process by which an input-output relationship becomes linear is performed on a chrominance component of the image in at least one of the intra prediction, the inter prediction, and the in-loop filter.

12. The image encoding method according to claim 2,
wherein in the encoding of the operation parameter,
a current operation parameter to be encoded is encoded by referring to a defined parameter which is defined in advance.

13. The image encoding method according to claim 1,
wherein the non-linear process is associated with a mode among a plurality of modes, and
in the encoding of the image,
the image is encoded by performing the non-linear process when the mode is specified.

14. An image decoding method, comprising:
inversely transforming an encoded picture on a block basis;
reconstructing, using an in-loop filter, the block inversely transformed;
predicting the block reconstructed, using intra prediction in which a previously decoded pixel in the encoded picture is used or inter prediction in which a previously decoded pixel in another encoded picture is used;
decoding an image including the block by performing, in at least one of the intra prediction, the inter prediction, and the in-loop filter, a filter process that includes a neural network;
decoding switch information indicating, as a filter to be used, one of a linear filter having a fixed parameter and a non-linear filter; and
decoding enabled/disabled information indicating whether the non-linear filter is enabled or disabled,
wherein in the decoding of the image,
a process to be used for decoding the image is switched, according to the switch information, between a non-linear process using the non-linear filter and a linear process using the linear filter in at least one of the intra prediction, the inter prediction, and the in-loop filter, and
the non-linear process is performed when the enabled/disabled information indicates that the non-linear filter is enabled.

15. The image decoding method according to claim 14,
wherein information indicating an operation parameter of the non-linear filter is decoded, and
the image including the block is decoded by performing the non-linear process in which the non-linear filter having the operation parameter decoded is used and by which an input-output relationship becomes non-linear.

16. The image decoding method according to claim 15,
wherein in the decoding of the operation parameter,
a weighting factor between nodes included in the neural network is decoded as the operation parameter.

17. The image decoding method according to claim 16,
wherein the decoding of the operation parameter further includes
decoding a total number of layers or a total number of nodes in the neural network as the operation parameter.

18. The image decoding method according to claim 15, further comprising
switching the operation parameter for each image unit which is a block, a slice, a tile, a picture, or a group of pictures (GOP) included in the image,
wherein in the decoding of the image,
the image unit is decoded by performing, on the image unit, the non-linear process using the non-linear filter having the operation parameter switched.

19. The image decoding method according to claim 15,
wherein in the inversely transforming,
when the intra prediction using the non-linear filter is performed, a method for the inverse transformation is switched to a method using a variable transformation matrix, and the inverse transformation is performed according to the method using the variable transformation matrix.

20. The image decoding method according to claim 15, wherein in the decoding of the image,
when the block included in the image is of a size equal to or less than a predetermined size, the intra prediction using the non-linear filter is performed on the block as the non-linear process, and
when the block is of a size greater than the predetermined size, the intra prediction using a linear filter having a fixed parameter is performed on the block.

21. The image decoding method according to claim 15, wherein in the decoding of the image,
the non-linear process is performed on a luminance component of the image, and a linear process by which an input-output relationship becomes linear is performed on a chrominance component of the image in at least one of the intra prediction, the inter prediction, and the in-loop filter.

22. The image decoding method according to claim 15, wherein in the decoding of the operation parameter,
a current operation parameter to be decoded is decoded by referring to a defined parameter which is defined in advance.

23. The image decoding method according to claim 14, wherein the non-linear process is associated with a mode among a plurality of modes, and
in the decoding of the image,
the image is decoded by performing the non-linear process when the mode is specified.

24. An image encoding apparatus configured to:
transform a picture on a block basis;
reconstruct, using an in-loop filter, the block transformed; and
predict the block reconstructed, using intra prediction in which a pixel in the picture is used or inter prediction in which a pixel in another picture is used,
the image encoding apparatus comprising
an image encoder configured to:
    encode an image including the block by performing, in at least one of the intra prediction, the inter prediction, and the in-loop filter, a filter process that includes a neural network;
    encode switch information indicating, as a filter to be used, one of a linear filter having a fixed parameter and a non-linear filter; and
    encode enabled/disabled information indicating whether the non-linear filter is enabled or disabled,
wherein a process to be used by the image encoder for encoding the image is switched, according to the switch information, between a non-linear process using the non-linear filter and a linear process using the linear filter in at least one of the intra prediction, the inter prediction, and the in-loop filter, and
the non-linear process is performed when the enabled/disabled information indicates that the non-linear filter is enabled.

25. An image decoding apparatus configured to:
inversely transform an encoded picture on a block basis;
reconstruct, using an in-loop filter, the block inversely transformed; and
predict the block reconstructed, using intra prediction in which a previously decoded pixel in the encoded picture is used or inter prediction in which a previously decoded pixel in another encoded picture is used,
the image decoding apparatus comprising
an image decoder configured to:
    decode an image including the block by performing, in at least one of the intra prediction, the inter prediction, and the in-loop filter, a filter process that includes a neural network;
    decode switch information indicating, as a filter to be used, one of a linear filter having a fixed parameter and a non-linear filter; and
    decode enabled/disabled information indicating whether the non-linear filter is enabled or disabled,
wherein a process to be used by the image decoder for decoding the image is switched, according to the switch information, between a non-linear process using the non-linear filter and a linear process using the linear filter in at least one of the intra prediction, the inter prediction, and the in-loop filter, and
the non-linear process is performed when the enabled/disabled information indicates that the non-linear filter is enabled.

* * * * *